United States Patent [19]

Nadir

[11] 4,011,545
[45] Mar. 8, 1977

[54] COMPUTER AND COMMUNICATIONS SYSTEMS EMPLOYING NEW ARCHITECTURES

[75] Inventor: Mark T. Nadir, Warren, N.J.

[73] Assignee: Ridan Computers, Inc., White Plains, N.Y.

[22] Filed: Apr. 28, 1975

[21] Appl. No.: 569,651

[52] U.S. Cl. .......................................... 340/172.5
[51] Int. Cl.² ........................................ G06F 15/16
[58] Field of Search ................................ 340/172.5

[56] References Cited
UNITED STATES PATENTS

| | | | |
|---|---|---|---|
| 3,768,074 | 10/1973 | Sharp et al. | 340/172.5 |
| 3,879,710 | 4/1975 | Maxemchuk | 340/172.5 |
| 3,913,070 | 10/1975 | Malcolm et al. | 340/172.5 |

*Primary Examiner*—Mark E. Nusbaum
*Assistant Examiner*—C. T. Bartz
*Attorney, Agent, or Firm*—Kenneth E. Macklin

[57] ABSTRACT

Communications and computer systems are described utilizing an architecture which makes possible the transmission and storage of data in an efficient and rapid manner. The system architecture embodies a plurality of communication sites and computer sites which interact with each other by means of matrices having special properties which permit the control, transmission and storage of data in many time and space saving ways. The matrices also serve as a means of governing the activities of the system. A plurality of computer sites act upon the data in the matrices by transforming, processing and transferring data for the communications network and processing loops. The processing loops provide the basic processing for the system and contain processing units which act independently and respond to the matrices. The matrices contain both the data which is to be operated upon and tutors (instructions) for directing the activities of the processing units. The system provides simultaneous services to a large number of users. The system does not contain a central processing unit (CPU) and its associated programs and does not require fetch, put and interrupt actions inherent in CPU programs. The system architecture, by virtue of the hardware and its special configuration, the matrices and their operation, and the response of the hardware to the matrices, confers great flexibility on the system's operations from both the communications and the computer standpoints.

60 Claims, 45 Drawing Figures

STORAGE MATRIX FORMAT

| | GENERAL DATA 16 | | | | | | | | ARRAY SECTION 12 | | | | | POST SCRIPT 14 | | | | |
|---|---|---|---|---|---|---|---|---|---|---|---|---|---|---|---|---|---|---|
| | SYNC 18 | ROUTE 20 | MLC 22 | TIME CODE 24 | MIC 26 | M C 28 | FORMAT CODE 30 | NEST CODE 54 | | | | | | CHECKS 72A | DELETES 74A | OVERFLOW 76A | INFO 78A | OTHER 80A |
| SPECIFIC DATA 32 | PNO 34A | RNO 36A | UIC 38A | GNO 40A | TI 42A | NAMCO 44A | QNO 46A | 56 A | 58 A | 60 A | | | | | | | | |
| | PNO 34B | RNO 36B | UIC 38B | GNO 40B | TI 42B | NAMCO 44B | QNO 46B | 56 B | 58 B | 60 B | | | | | | | | |
| | QNO + TI 62A | NAMCO 64A | QNO + TI 62B | NAMCO 64B | QNO + TI 62C | NAMCO 64C | QNO + TI 62D | NAMCO 64D | QNO + TI 62E | NAMCO 64E | | | | | | | | |
| | | | | | 52 | | | | | | | | | 72B | 74B | 76B | 78B | 80B |
| DETERMINATOR 10 | | | | | | | | | | | | | | 72C | 74C | 76C | 78C | 80C |

FIGURE I

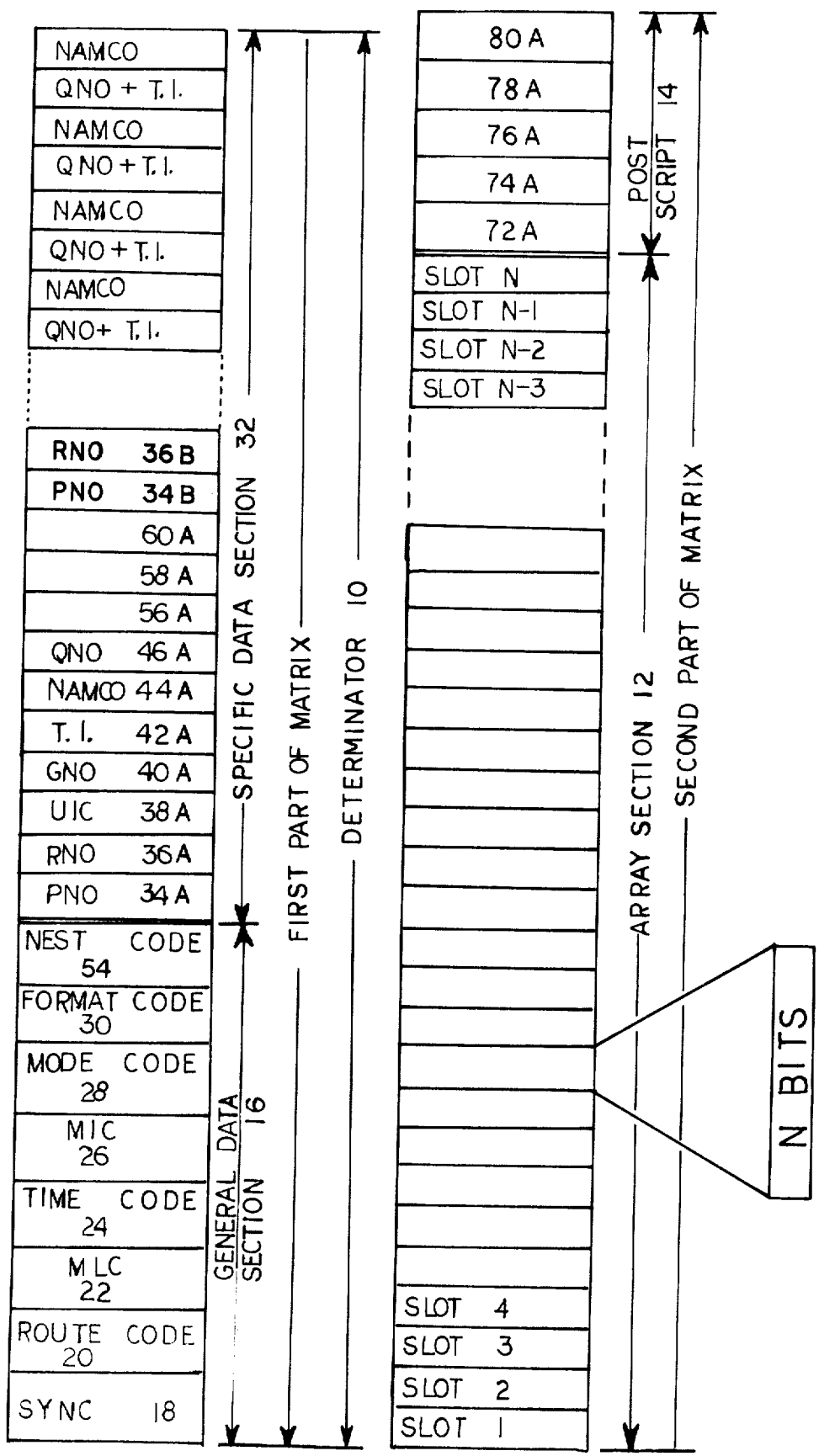
FIGURE 2    MATRIX SHOWN IN TWO PARTS

SITE CONTROL -248-

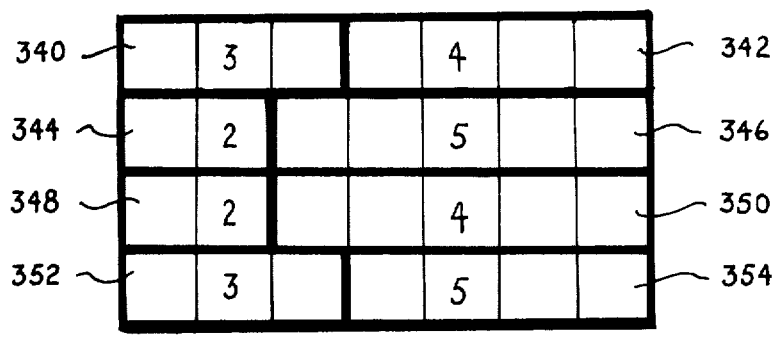
FIGURE 7     NEST-GROUP
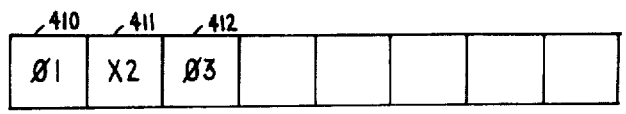
FIGURE 9     NEST WITH CHARACTERS IN A ROW
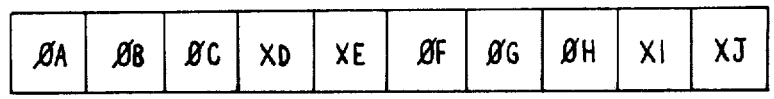
FIGURE 10    NEST WITH CO-SHARED BITS
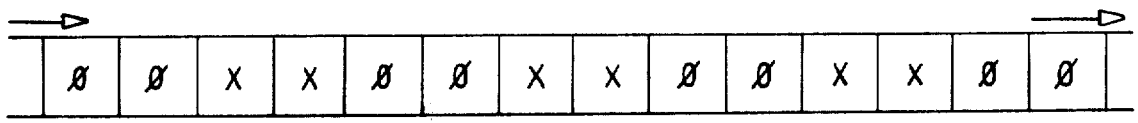
FIGURE 11    LONG NEST USING CO-SHARED BITS
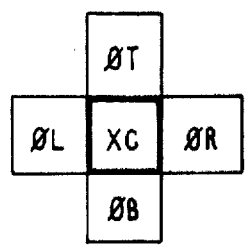
FIGURE 12
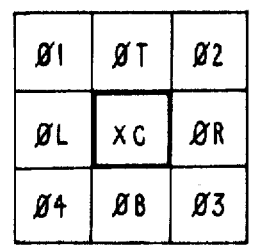
FIGURE 13
TWO DIMENSIONAL NEST
USING CO-SHARED BITS

A 5ND NEST GROUP
WITH EMPTY CENTRAL
AREA

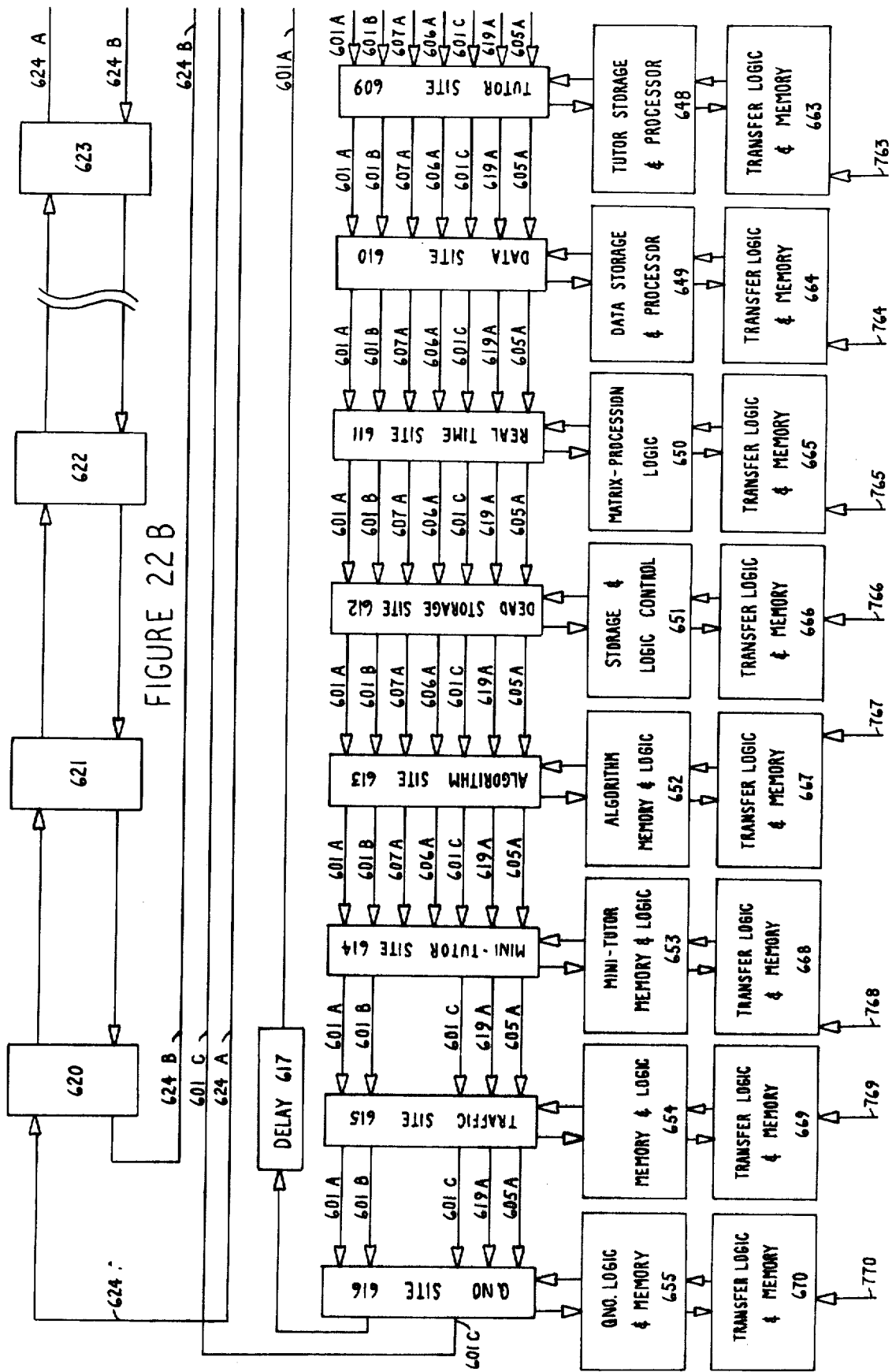

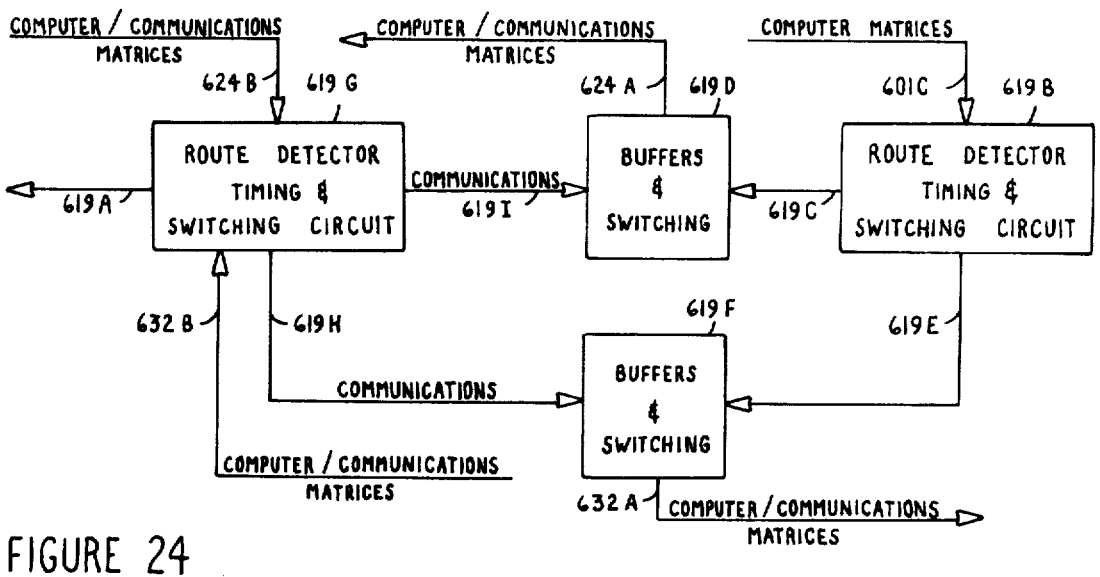
FIGURE 24
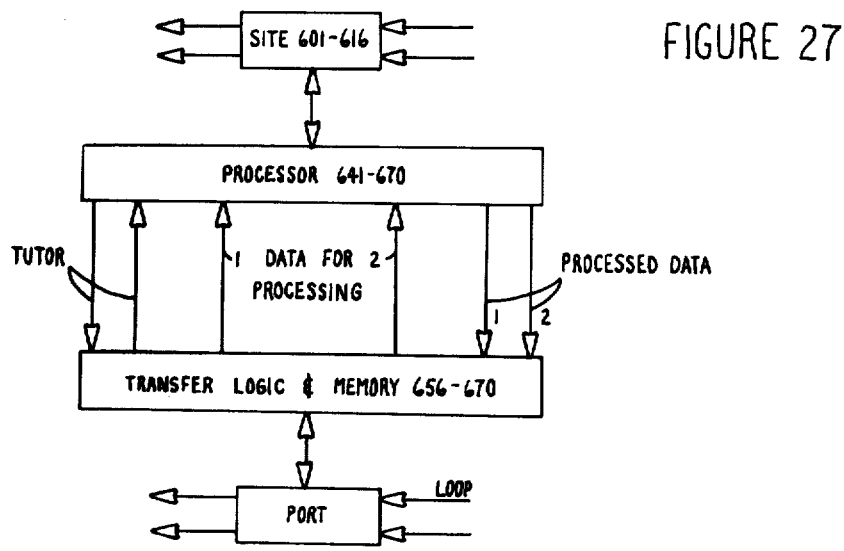
FIGURE 27
FIGURE 23
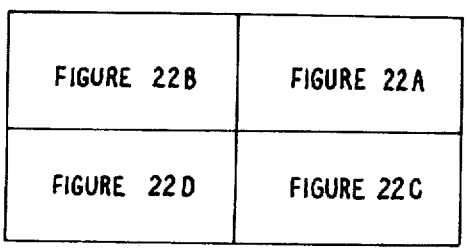
FIGURE 28
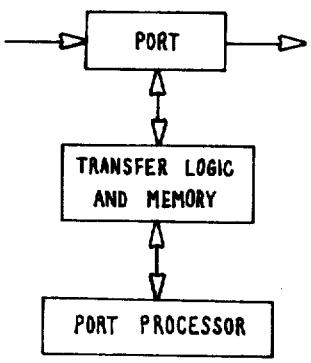

-601-(602, 603, 604)

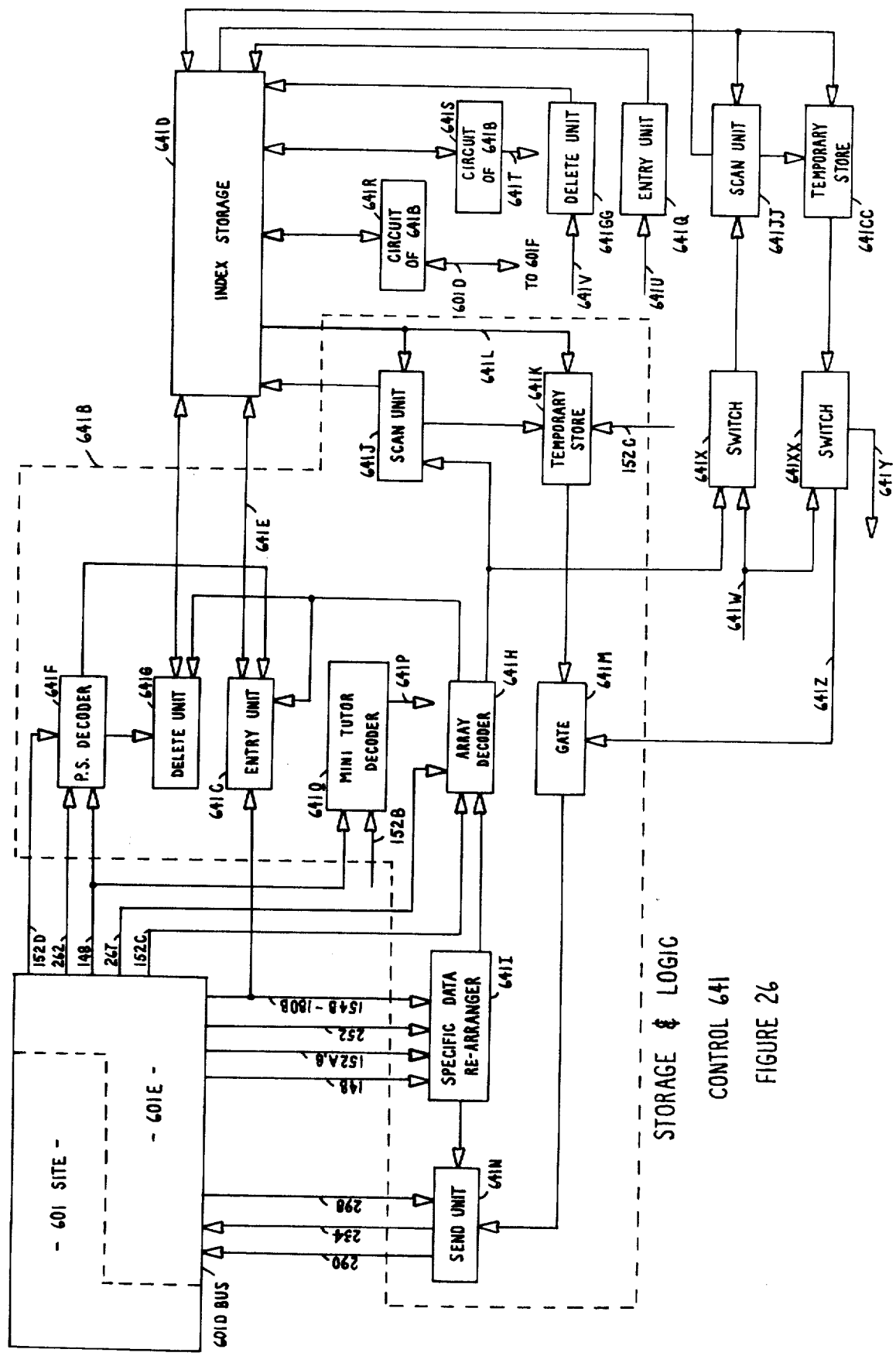

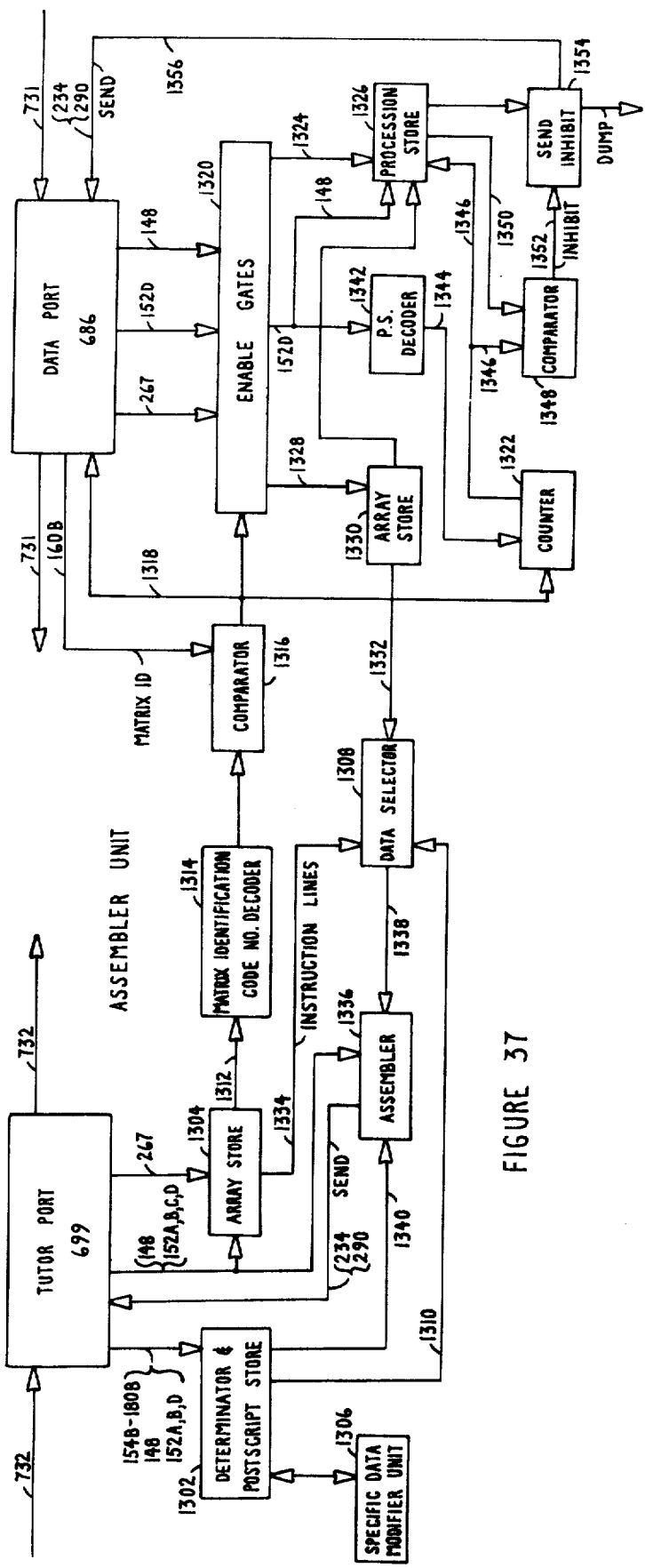

STORAGE & PROCESSOR
-642-

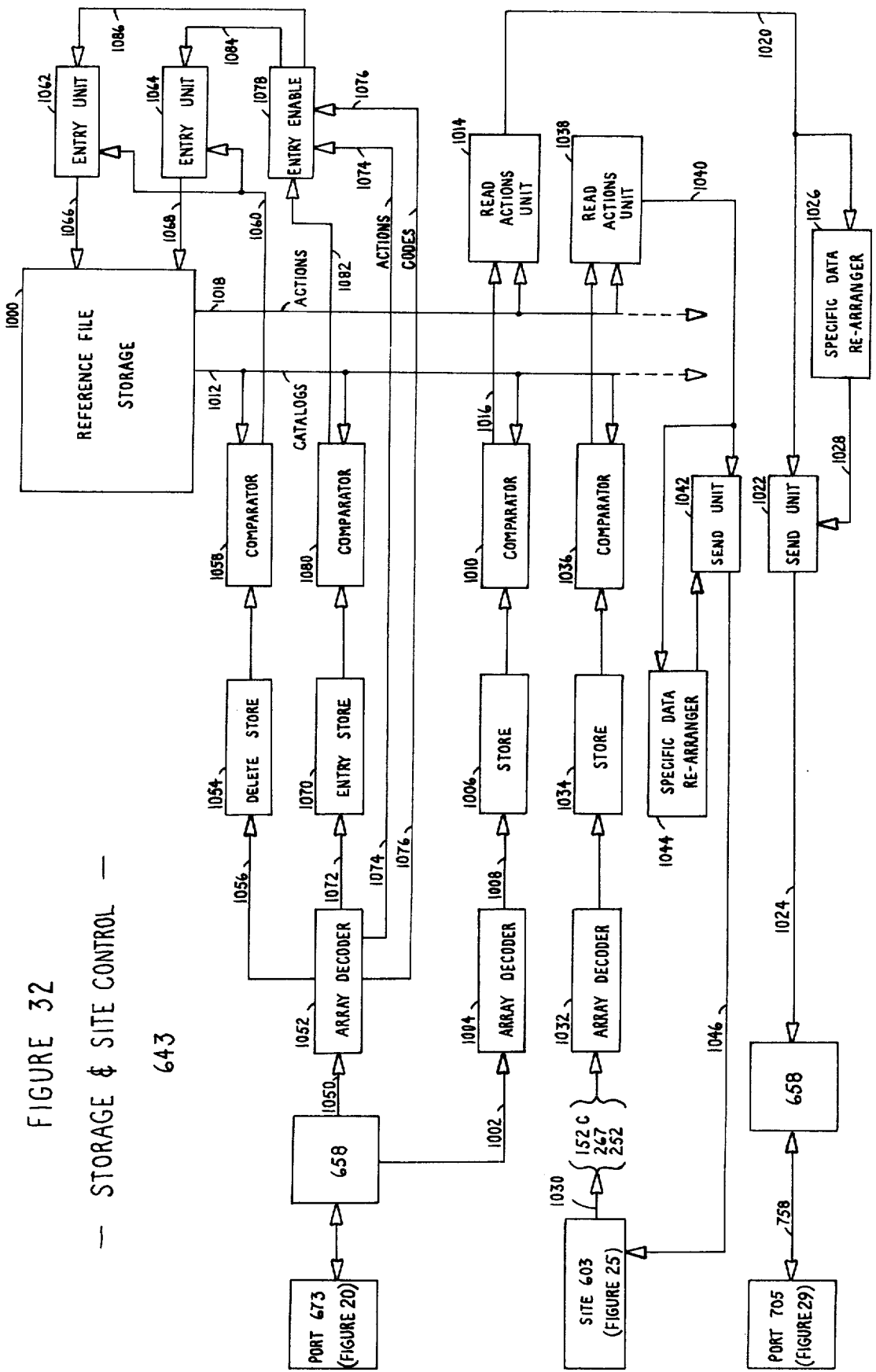

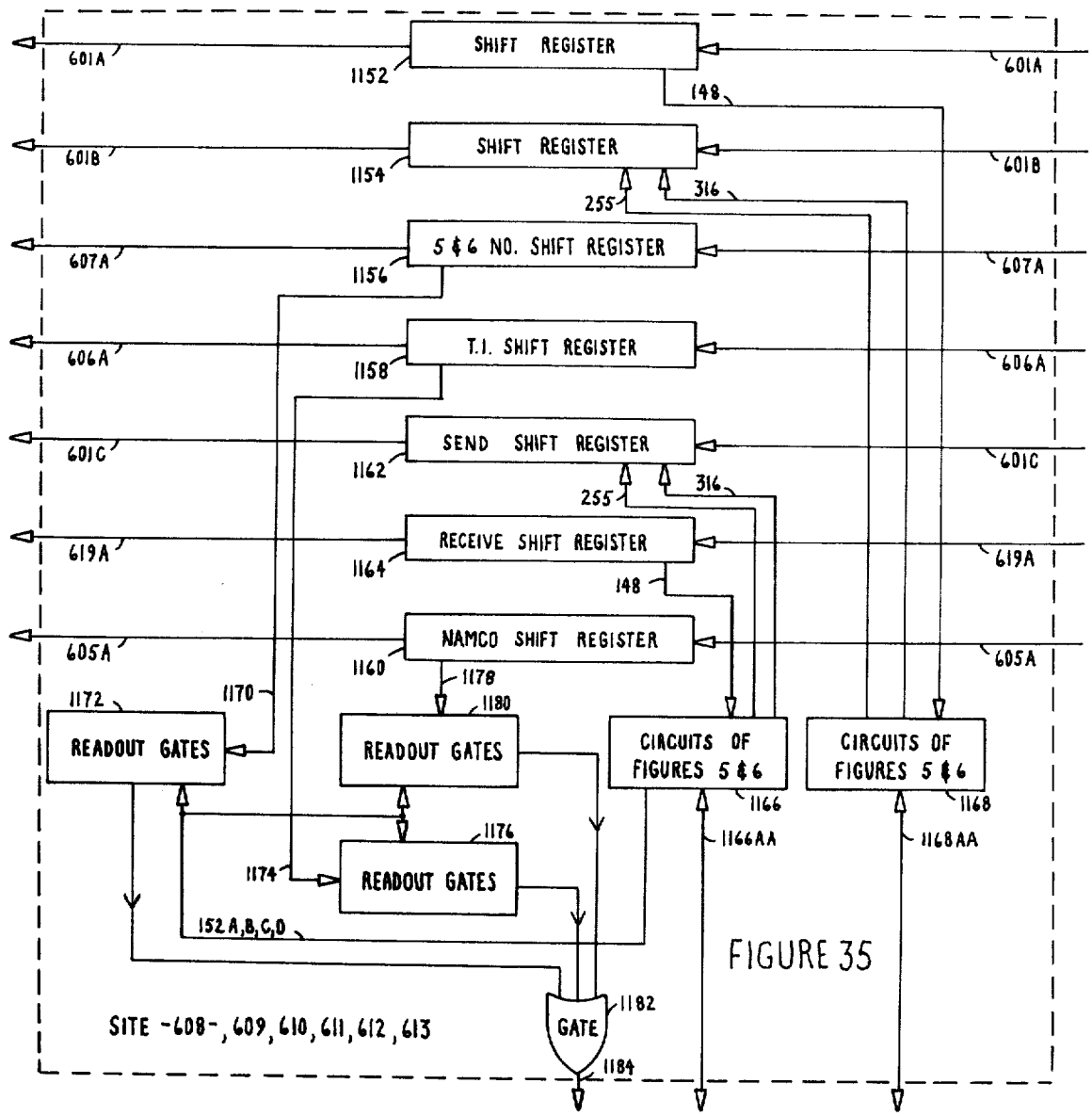
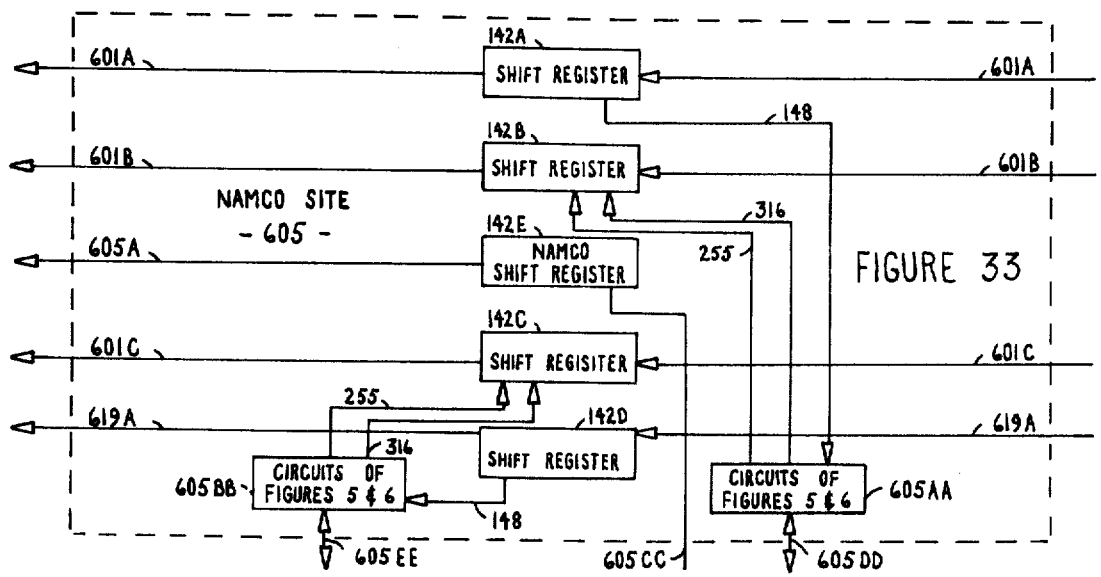

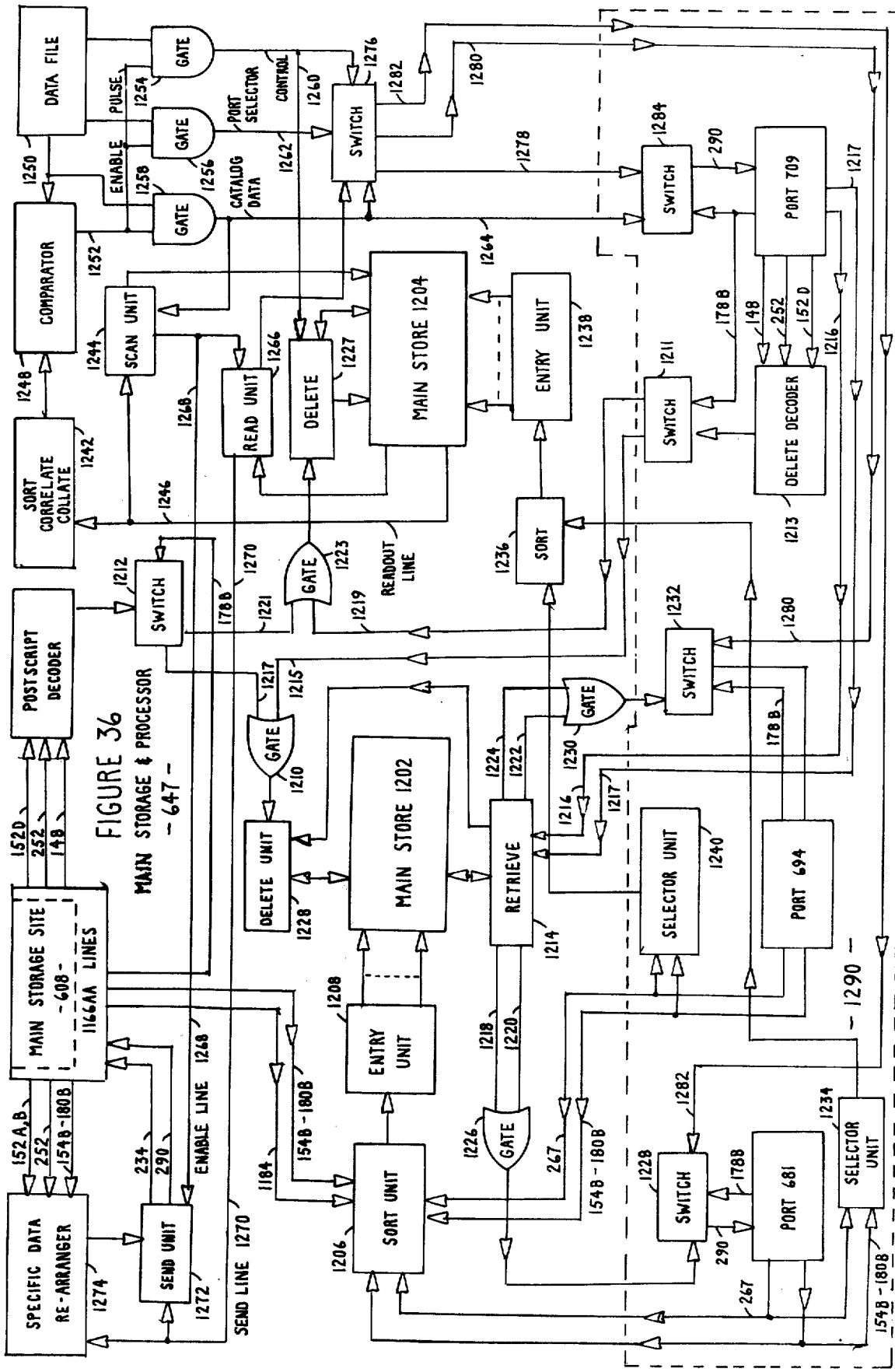

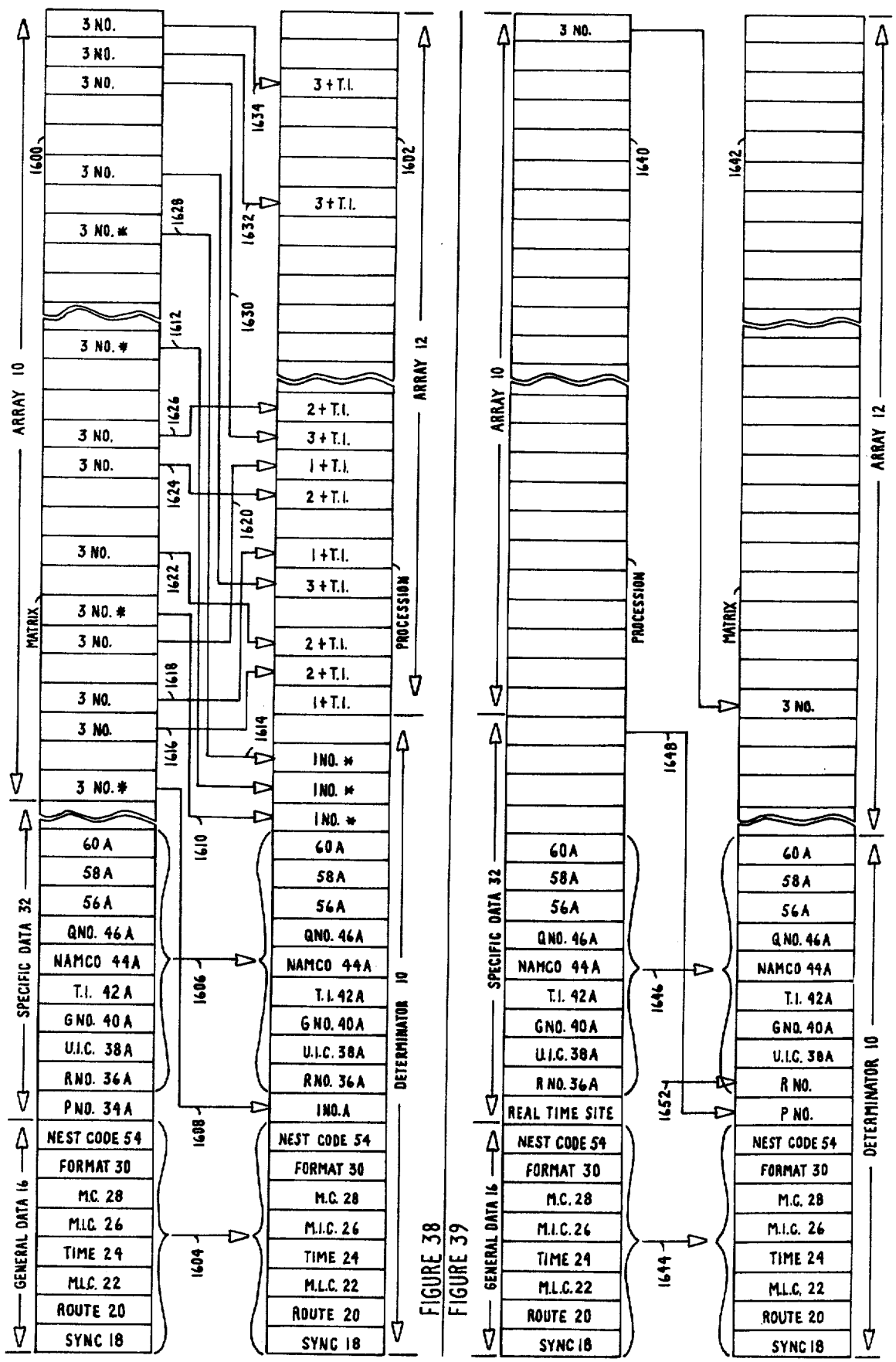

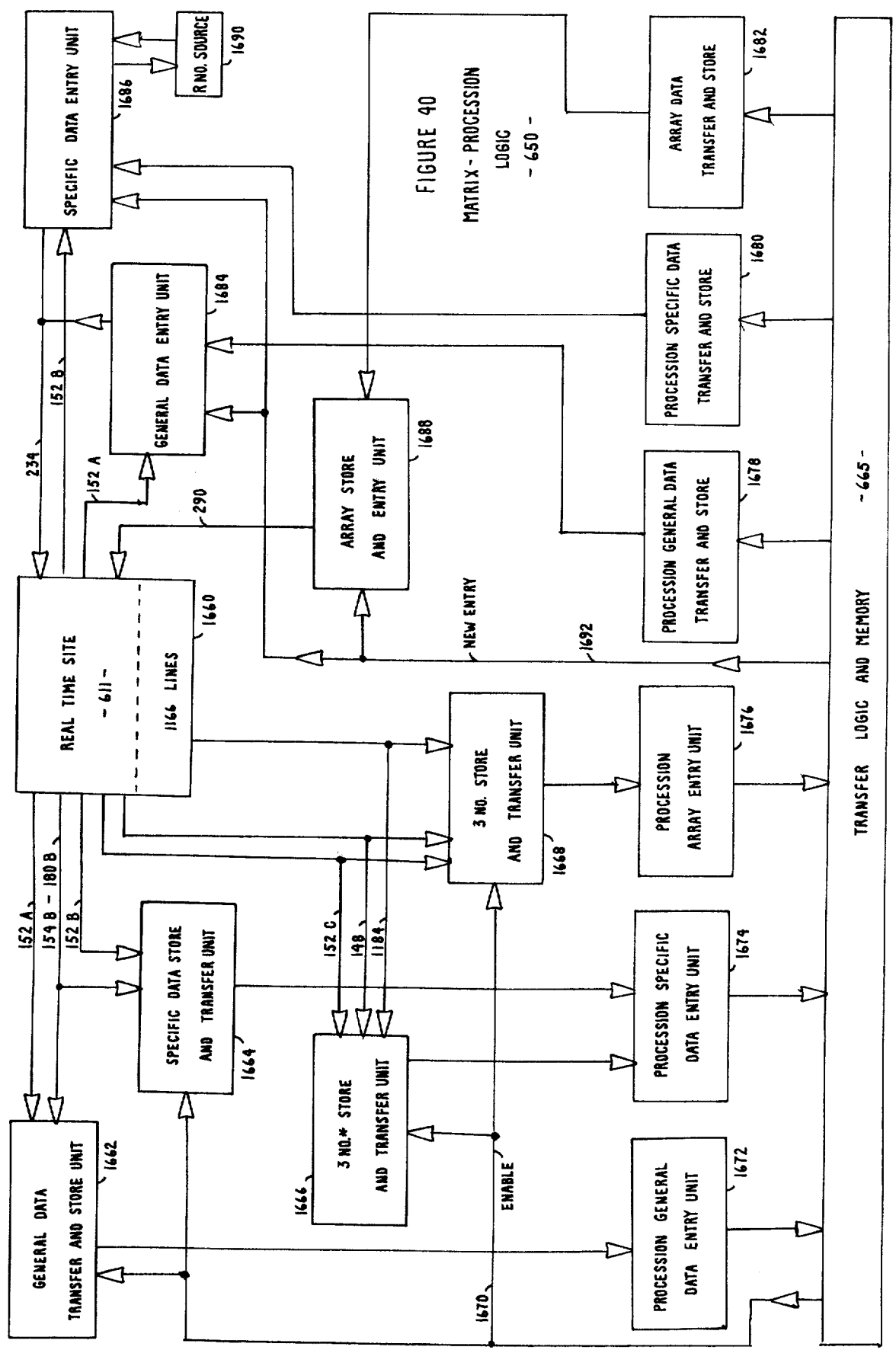

COMPUTER AND COMMUNICATIONS SYSTEMS EMPLOYING NEW ARCHITECTURES

BACKGROUND OF THE INVENTION

1. Field of the Invention

The present invention relates to communications and computer systems, and more particularly to system architectures which provide a broad spectrum of services simultaneously to a large number of users.

2. Description of the Prior Art

Present day communications and computer systems employ codes for the transmission and storage of data, such as ASCII. Transmission techniques frequently include various forms of multiplexing of the information. The storage of information is generally in the form of the standard codes wherein the number of bits in a character generally determine the size of the character set. Many techniques are known for increasing the amount of data which can be transmitted with a given number of bits, such as the use of shift, i.e. upper and lower case. Generally, a site receives and/or transmits data to one other site at a given time, since simultaneous communication by a site with a plurality of other sites is generally not economical as it involves allocation of several channels, increase of bandwidth or additional hardware at the switching centers, and, the receiving and sending sites. Communications normally occur over frequency division multiplexed (FDM) channels even when the transmitted data is digital. Such FDM channels have guard bands to protect against interchannel interaction. Such guard band wastes spectrum but are a necessity and require the use of many costly filters. The data sent over an FDM channel might be digital data from either a modem or a digital gate. Digital channels, when time shared by the use of time division multiplex (TDM) signals, tend to have unfilled areas further contributing to the waste of spectrum. The use of the full wire bandwidth and use of unassigned TDM slots are desirable to obtain increased efficiency.

The computer has grown from a simple bulk processor using mechanical relays to a time sharing device, to a multiprocessor, mini-computer, and micro-computer on a single chip. But the basic form of computer architecture generally still employs a central processing unit (CPU). The CPU has become a more complex machine in order to handle the additional requirements imposed by competition. Nevertheless, the present day CPU operates on the same basic principles as used in the original machines. The CPU is still a major throughout path since it performs and controls most operations. Multiprocessing represents one effort to increase the throughput of computers by permitting several processing operations to occur simultaneously.

In the conventional computer, interface terminal units and other software or hardware are required to permit access to the computer by the external user. Techniques such as polling are used to permit access by the user at an aloted time. Polling requires spectrum and adds to the complexity of both the sending and receivng sites. Where the computer must dial the user through a switching center, further complexity results. Also, intelligent terminals have increasingly been used with computers and serve to reduce the load on the main computer and, consequently, reduce the cost to the consumer for computer time. The intelligent terminal performs many operations formerly alloted to the main machine, frequently under the direction of mini or micro-computers. Still, the intelligent terminal adds its own complexity to that of the main computer system.

It is an object of the present invention to provide a communications and/or computer system which can service a very large number of on-line users simultaneously and in an effective, efficient and economic manner. It is another object to increase the amount of data which can be transferred or stored with a given number of bits. It is another object to provide a communications system which permits immediate service to the users without going through switching centers. It is another object to provide a communications system which permits a station to be accessed by a plurality of users at a given time. It is another object to provide a computer which simultaneously services a large number of users. It is another object to provide a computer with high throughput and which can execute a multiplicity of different operations or processes simultaneously. It is another object to provide a communications and/or computer system which can increase in size and capability by the addition of processors and other sites.

SUMMARY OF THE INVENTION

These and other objects are achieved by the present invention which provides both a communications and a computer system utilizing an architecture which makes possible the transmission and storage of data in an efficient and rapid manner. The system architecture embodies a plurality of communication sites and computer sites which interact with each other by means of matrices having special properties which permit the control, transmission and storage of data in many time and space saving ways. The matrices also serve as a means of governing the activities of the system. The computer system includes a plurality of computer sites which generally act independently, and upon the data in the matrices. The computer sites generally act as intermediaries between the communications system and processing loops. The processing loops provide the basic processing for the system and contain processing units which act independently and respond to the matrices. The matrices contain both the data which is to be operated upon and tutors (instructions) for directing the activities of the processing units. The system does not contain a central processing unit (CPU) which operates off a program and does not require fetch, put and interrupt actions inherent in CPU programs. This is true even though the subject system provides simultaneous service to a large number of users. The system architecture, by virtue of the hardware and its special configuration, the matrices and their operation, and the response of the hardware to the matrices, confers great flexibility on the systems' operations from both the communications and the computer standpoints.

It is to be understood that as used herein, the term "software" is not the same in definition as the "software" associated with conventional CPU programs. Rather, the term "software" used herein is intended to define in a general manner such data and tutors which evoke various responses from the system hardware.

Specifically, the matrix is a repeating interval of time (when sending) or space (when storing) wherein a cyclic set of events occur. The purpose of the matrix is to convey information for a number of users. The information contained in the matrix is of two general classes; (1) information common to all users (general data) and (2) information specific to each user. The user's specific information is of three types, (1) tutors which occur in areas of the matrix called the "determinator", (2) the transmitted or stored data or messages occurring in an array section and (3) postscript data which is sent after the other data has occurred. A user enters a matrix in locations in the specific data section of the determinator. A user, upon receiving data from a matrix, deletes all data received to leave space which other users can employ. Any site can establish communications with any other sites in the system by direct dialing. Each matrix consists of three sections, the determinator which is subdivided into general data and specific data sections, the array section which is subdivided into nests or nest groups, and the postscript section. Each of these sections serves a very definite set of functions. The matrix serves as the bookkeeping delivery mechanism for the entire system, a software type of instruction/guidance mechanism (tutor/tutorial) for the system, a data and/or message delivery mechanism, and an error checking and handshaking mechanism for the system.

The matrix interacts in many ways with other parts of the system causing some of these parts to be governed either directly or indirectly by the matrix contents. Also, the matrix delivers data such as raw data, bookkeeping and tutors to other parts of the system which cause such parts to react in specific ways to the matrix contents. Therefore, the matrix is an essential part of the software of the system.

The determinator consists of data and tutors which in one way or another govern each site's reaction to those matrices which are directed to that site. These matrices frequently also determine the reaction of other sites. These other sites may then issue tutors or processions for action by other sites which govern the system's response to the matrix.

The array is comprised of a set of nests or nest groups. The data in the array is generally data or messages although the array may also contain tutors and tutorials. The data in the array may consist of common codes such as ASCII, tutor codes such as 2 Nos., tutorial (strings of tutors) codes such as 3 Nos. and/or combinations of these. Tutor codes are codes which reference a user by his accidental location in the determinator. Tutorial codes reference a character or symbol set(s) known to the communicating sites. These codes are described and referred to herein as the 2 No., 2½ No., 3 No., 3½ No., 4 No., 5 No., 6 No., and 7 No. These codes may be combined with each other and with common codes in a variety of ways. The system can convey matrices using any of these codes. A template index code in the determinator states which of these codes are being sent by each user in the matrix.

The 2 No. is a number referencing a position in the specific data section of the determinator. A use wishing to send enters the prime number (P No.) of the receptor, his own prime number (R No.) and other tutorial data in the first available position in the determinator. This position is referred to by a number called the secondary number and abbreviated 2 No. The 2 No. is used in the array section and sometimes also in the postscript section. It is generally not used in the determinator. The 2 No. is a tutor which is invariably associated with a position in the determinator of the matrix. It makes no difference to the system as to which user's data occupies a 2 No. position in the array, the determinator or postscript sections of the matrix, since the 2 No. only references a position internal to the matrix. The system only responds to addresses, such as the P No. and R No., and does not respond to the 2 No. which is not an address. The 2 No. has no address function since it does not direct the matrix to any specific site or location. The P No., R No. and Q No. are the addresses to which the sites respond to the matrices containing such addresses.

The array section consists of nests or slots or nest groups. The 2 No. position in the specific data section of the determinator indicates the locations in the array where data for that position occurs. Such data is identified in the array by the same number as the position, which number is called the 2 No. For example data occupying a given location in the array has a 2 No. which indicates that this 2 No. number and the corresponding position in the determinator relate directly to each other, i.e. 2 No. =6 and position =6 are cross referenced to each other.

According to one method of array use, each nest or slot and location in a nest group has a meaning assigned to it. This meaning is not fixed and can vary from user to user, and from one matrix to another for the same users as well as others. The meaning a nest, slot or each member of a nest group location has is given by the nest assigned meaning code (NAMCO). There are many NAMCO character sets available in the system, but the particular NAMCO set a user elects to use in a given matrix is stated as a code in the user's NAMCO position in the specific data section of the determinator. In a like manner a template index (T.I.) is entered into the user's T.I. position in the determinator. One purpose of the template index (T.I) is to indicate which type of code the user is employing, such as Baudot or ASCII. The 2 No., the NAMCO and T.I. together indicate how data is to be entered and extracted from the array section and, sometimes, also the postscript section. For example, the NAMCO states the meaning a nest will have for a user in addition X (X=2 No.) and the T.I. states the type of code being employed. These statements apply only to the particular matrix wherein they appear. When a 2 No. appears in a slot or nest, it indicates that the character assigned to that nest by the NAMCO of the user, in the position indicated by the 2 No., is sending the character so indicated. In this case, the template index (T.I.) code would indicate that the 2 No. mode of data transmission is being used.

If code is to be sent in the common code mode in the array, the template index (T.I.) code indicates that common code is used and that the code is Baudot, ASCII or whatever. In this case, the code will be entered into nest numbered 2 No., and $XN^{th}$ nest thereafter, where N is the number of users and X is an integer.

The 3 No. code is a displacement tutorial code. In its first form, one user uses the entire matrix. The NAMCO code is entered into the NAMCO section. The T.I. indicates that 3 No. is being sent. The data that goes into a given array slot or nest states how far away the character being sent is from the slot which has the NAMCO assigned meaning of the given slot or nest. For example if the character A is to be sent and the NAMCO slot which means A is ten slots or nests away, then 10 is entered into the first slot if the character B is to be sent and the slot having the NAMCO assigned meaning of B is 13 slots away then the number 13 is entered into the second slot, and so on. In this form of code, the number sent is a tutorial which indicates how far away the NAMCO character is with respect to the character being sent.

The 2½ No. code combines the 2 No. form with the 3 No. code. Data is entered into the determinator as previously described. The data entered into the nest is a 2 No. with a displacement tutor added to it. Thus, a 2½ No. consists of two parts: a 2 No. and a displacement tutor. The 2 No. states the position of the originator in the determinator, while the tutor states how many slots away the NAMCO character is found.

The 3½ No. code makes use of the fact that the same 2 No. can be used by 2 or more users. The positions the users enter in the determinator, instead of being numbered as 1, 2, 3, 4 ... can be numbered a 1 odd, 1 even, 2 odd, 2 even, 3 odd, 3 even .... The 2 No. can then enter either odd or even slots in the array to indicate that the data is related to an odd or even position in the determinator while the 2 No. numerical value would still indicate the numerical position taken by the user in the determinator. This technique reduces the number of bits required to store or send data.

The 4 No. code makes use of the fact that under known conditions, bits can be shared by two or more characters. This technique is further extended by the 5 No. technique. The 5 No. converts the 4 No. concept of co-sharing bits from a linear form to a two dimensional form. The 5 No. further develops the 4 No. technique so that the co-shared bits are completely omitted and can be regenerated from a code stored as T.I. code in the determinator. The 6 No. takes this 5 No. concept into 3 dimensional space. The 7 No. is a partial code which combines the 2 No. with common codes. The 2 No. part of the code indicates the position of the user in the determinator while the slot in which it occurs indicates the NAMCO character, which is a binary number, assigned to that slot. The second half of the character is a common code. Thus if 001,010 is found in a slot with a NAMCO number of 15, then the 2 No.=1=001 which indicates that the value 15+010 is being sent by the user in position 1. Since 15+010 is being sent, this becomes 1111010 (1111=15).

The use of the 2No. through the 7 No. leads to characters or symbols which may consist of 1 to 6 bits where the number of bits is independent of the size of the characters. The average character in a well designed system might be 1 to 4 bits in size. Consequentially, there exists the ability to either send more data over a given bandwidth or to store more data in a given space. Both lead to new and more efficient hardware and transmision link usage.

The matrices can convey data from one site to another without switching centers. The determinator of the matrix has tutors (route, P No., etc.) which make it possible for a site to detect, receive and erase data directed to it. While there is direct dialing between any two subscribers there is no switching, nor need, therefore, in the communication network. The subject system is free of switching centers and the bottlenecks and time delays associated with their operation.

Overloads caused by excessive users on the system likewise cannot occur in the subject system due to the fact that such users wishing to enter a matrix must first find a vacant matrix position therein, or else locally store his data until a matrix vacancy occurs. Since system overloads cannot occur, catastrophic failure due to overloads is not possible. The worst situation will be a gradual degradation in the service as the attempted load increases.

Handshaking items, in addition to error checking items, are located in the postscript section. Items, such as end-of-message and busy, are located in the postscript secton. A user may also send a delete Q No. in this section. The Q No. is a code that is borrowed for temporary use, and notification that it is no longer required is given by the delete Q No. signal in the postscript section.

The matrices start with a sync signal which is detected by the sites to lock the system into synchronism. At fixed locations in the matrices, addresses referred to as prime numbers (P No.) are inserted for detection by the addressed sites which in turn seize the relevant information for its use and deletes the data from the line. Because of the P No. mechanism employed, each site can detect messages directed to it. As each P No. is associated with an R No., or the initiating site's address, each site can recognize the originating site and, by storing this R No., can reply. As mentioned above, the template index (T.I.) is a tutor which identifies the type of code being sent to enable the receptor of the data to translate it into a suitable form. Other tutors are provided in the determinator to cause various reactions, such as a guide number (G No.) which is generally used on the communications network to steer the received signal to a specific place or ancillary unit.

Each site can simultaneously be communicating with a number of other sites via each matrix. The received and transmitted data can be distinguished independently for each user by virtue of the R No., P No. and 2 No. sent and received in the matrix so there is no ambiguity occurring, even though a multiplicity of messages from a variety of sources are sent to any given site. An R No., P No. and other tutors can be replaced by a single Q No. for a given user.

The internal arrangement of the matrix is such that even though many users are sending data to a common receptor, such data can be detected and delivered without confusion.

Generally, each site in the system can communicate with any other computer or communications site. In the system described herein two types of sites are discussed, the computer/communications (CC) sites and the computer sites. Both types of sites are used for communications with each other. An interface between the subject system and standard telephone lines consists of a communications/computer site which can interface a number of telephone channels with the system. Such computer/communications sites can be located at any convenient place(s) in the system. The path of the data transmitted between the telephone channels and the system or through the system can be made completely transparent to either system. The computer/communications (C/C) sites, when used for communicating with the computer sites, become part of the computer. They originate software in the form of matrices and data/tutors (D/T) and receive the processed results. Much of the hardware needed to send, receive and store the software exists at these computer/communications sites. Additionally, many C/C sites can be entirely devoted to software related functions, such as providing master tutorials on request from other C/C sites. Some C/C sites may also be peripherals which exist on the communication network for the convenience of the other users.

Data/tutors (D/T) are combinations of data with tutors (instructions) which can be stored in this form by the system's hardware or transmitted in this form by the matrices and processions. Data/tutors can be formed into processions (a form of matrix) and sent on the processing loop where they can be operated on by various processors. The results of the processing can be stored elsewhere until needed, or returned to the user for local storage or immediate use.

The C/C sites communicate directly with the particular computer site which performs the general function which it needs accomplished. For example, a C/C site may require immediate response to the data and tutors it is sending and, in this case, it addresses itself to a real time computer site. The computer site is addressed by its prime number (P No..), which P No. is also its general function. The C/C sites have many computer sites and other C/C sites upon which to call to perform the functions they require.

In the case of the real time computer site, many of the instructions and data (data/tutors) are originated directly by the user which sends out data/tutor matrices addressed to the real time computer site. The results of the processing are placed on the communication network and sent to the originating site using its prime number (R No.). This result is received by the user for his further action.

In addition to the above manner whereby data/tutors are originated at a C/C site by the user, the requested data/tutors can originate in a memory located within the C/C site. The results of processing could also be locally stored. In this fashion, master tutorials can be sent for execution to the computer sites on a piecemeal basis and the resulting material also received and stored on a piecemeal basis via the matrices.

The C/C sites can request various materials from other C/C sites and the computer sites. The material can vary from index data, master tutorials, algorithms, mini- tutors, to assembled data/tutors. For example, a C/C site can request a master tutorial from either another C/C site which acts as a peripheral or from a dead storage computer site. This data can be sent from the originating C/C site for assembly into data/tutors, or to other computer sites such as the tutor site and the data site for assembly into data/tutors. Upon instruction from the C/C site, the data at these two computer sites is transferred to the processing loops and assembled into data/tutor processions. The resulting data/tutor procession can either be processed, or the unprocessed data/tutors can be returned to the originating C/C site.

The system architecture including the matrix generally helps to simplify the user's writing of their own master tutorials. The assembled data/tutors can be entered into matrices and addressed with the P No. of the real time computer site. The data/tutor is then immediately processed, i.e., the raw data is operated on as instructed by the tutors. The results of this operation are immediately returned to the user at the originating C/C site.

The computer sites comprise storage and processing units of various forms. Transfer logic and memory units connect the storage and processing sites to one or more ports connected together by communications paths called processing loops. Four processing loops comprise a main process control loop, a data loop, a tutor loop, and an index/reference loop. There are two basic types of ports, those associated with a computer site and those connected with a processor through a transfer logic and memory unit. Processing units each perform specialized operations, such as arithmetic operations, chemical logic, compiling and assembly, associative logic and troubleshooting logics. A processing loop consists of a multiplicity of ports closed by a retiming unit. Each port has a shift-register through which the processions on the transmission line are passing. Since the ports are in series and the loop is closed, the processions circulate around the loop which also acts as a storage element. The processing loop operates at a very high speed so that processions addressed to the ports arrive with the least delay. This permits maximum utilization of the processors. The procession is removed from the loop to permit other processions to circulate and reach their destination ports with the least interference and minimum delay.

Processions are addressed to given ports where they are taken off line and relevant data is used for processing by the port processor. For example the address in the specific data section might designate an adder, in which case the procession goes to the adder, the data in the array section is read into the adder and the resultant addition placed in the procession at a location specified by a tutor. The procession is then put back on line and goes to another port to have another function performed. If the port to which it is addressed is busy, the procession is not removed from the loop but is permitted to circulate around the loop.

Ports can be added to a processing loop as they are needed. A system with only a few mathematical ports can be expanded to any size by the simple addition of other desired ports and subsequently become a fully developed computer. The usual change required for expansions is the adjustment of the retimer unit on the loop. Furthermore, the addition of ports to the loops does not alter the previously existing tutorials or master tutorials. A system which starts off as a simple machine can grow to any size by the addition of more types of ports.

The subject system can be made to perform any operation for which man can build ports and processors. New logics, such as associative, optical, and chemical, can be added to this machine with no loss of other functions. Hybrid machines can be easily assembled into the system. New C/C sites, computer sites, ports, peripherals, etc. can be added essentially limited only by the maximum speed of the circuitry. Each computer site has a processor and memory which receive data from other processors and memories, and from the ports. In some cases, control data is sent to these processors and memories over both the communication network and the processing loops. The system architecture minimizes external control of the processors and memories in the computer sites so that such processors and memories tend to be self-governed by the matrices and their own internal logic.

When a C/C site sends data to a computer part of the system, the matrix is read by an index site of the computer. The determinator data of all matrices is read into an index memory and stored there for later use. The index also maintains a catalog of algorithms and mini-tutors. The catalog data is available, on request, to all sites in the system. The algorithm, mini-tutor, and other tutors are available from the sites where they are stored, i.e. at the mini-tutor and algorithm sites.

The determinator section of the matrix contains all the information relating to the data contained in the array section. There is also tutor data in the determinator section relating to the types, kind and usage of the data in the matrix. The determinator thus supplies bookkeeping data to the index and other computer sites. The index site can call on ports in the index/reference loop for assistance. For example it can call on a port with a processor which sorts data to help it maintain the required catalogues.

The matrix also goes to a cross-index computer site. Raw data for the cross-index storage and processor is received from the matrix and also from the index site. At the cross-index storage and processor, data is catalogued into selected catagories and is cross-referenced. The catalogued and cross-referenced data is stored and made available to requesting users. Selected catalog combinations of data in the cross-index storage are detected and sent to a reference file via the associated ports or the related sites. As a result of the manner whereby data is brought to the index and cross-index in the matrices, and the manner whereby data is catalogued in the cross-index, it is possible to use the cross-index as a rapid data retrieval device. That is, the catalogues enable the cross-index to readily locate data and pinpoint the particular matrix or matrices having the desired data. Thus, rapid data retrieval is a normal characteristic of the system. The retrieved data is made available to parts of the system and the users.

Selected data which is sent from the cross-index to the reference file may consist of certain combinations of tutor matrices and data matrices. These may arrive at different times and be stored in different places, but can be combined to form a part of a master tutorial. This data, along with other relevant data such as priority of action, is sent to the reference file. This data from the cross-index is most generally received by the reference file storage and site control via the ports of the index/reference loop. The reference file storage and site control compares this data with selected data held in its storage. When a comparison occurs, the reference file supplies the necessary actions, held in its storage. The required actions or directives are formed into processions and addressed to the proper sites. These processions are sent out over the main process and control loop and contain tutors which are received by the addressed site and used to govern the actions of that site.

Most of the computer sites operate simultaneously most of the time. There is an occasional need for a tutor from the reference file to make the sites function as a coherent entity.

The index and cross-index computer sites are not addressed unless some information in their storage is required. The reference file site is not ordinarily directly addressed by users. These three sites with their associated computer sites and ports work to govern the system. The computer sites which are commonly addressed are the main torge, tutor site, data site, real time site, NAMCO site, 5 and 6 No. site, T.I. site, dead storage site, algorithm site, mini-tutor site and the Q No. site. The NAMCO, 5 and 6 No., T.I., and Q No. site are addressed to obtain the specialized data they contain. The mini-tutor and algorithm sites are addressed to obtain the tutorials required to execute some designated mini-tutor or algorithm. Data in the form of raw data and tutors are addressed to the main storage via the matrix. The reference file, using correlated data from the cross-index, orders the main storage and its processor to issue the stored raw data and tutors in the form of data processions and tutor processions which appear on the data and tutor processing loops. On these loops, the aforesaid processions are assembled into data/tutors (D/T) processions by those ports having assembler processors. The assembled data in the data/tutor processions is returned to the main storage and processor via its associated ports. The data/tutors are stored here either for further processing or returned to the originating C/C site. Alternatively, the data/tutor processions are sent out for final processing. After processing, data in the procession is refreshed by the addition of new data from other processions in the assemblers. The completed results of processing are returned by the processions to the main storage and processors or to another designated computer site. They are stored for further use or returned to the originating C/C site over the communications network.

The assemblers are ports on the processing loop which have the hardware for taking a tutor type procession and a data type procession with mutually relevant contents, and forming a single new procession from the pair. This new data/tutor procession includes determinator data such as tutors from the tutor procession, and array data from the data procession. Assemblers are used for many types of data compilation and refreshing. Refreshing involves the transfer of a data/tutor from on procession to another procession, the latter of which has been processed and generally contains only a resultant.

The dead storage site stores data for non-immediate use. The algorithm and mini-tutor site store and supply algorithms and mini-tutors to requesting sites. The traffic control site controls the flow of traffic by inhibiting entry of low priority matrice data into the system. The Q No. is site issues new Q Nos. and keeps track of released Q Nos.

There are many ports on the processing loops, these being of many types and kind. The most usual kinds are processors that perform arithmetics, logics, and sort. Ports performing the same function can have the same address.

The subject system can handle the large volumes of data which the matrices are capable of bringing from the many users. Because this data is fed to the processing loops where a large number of processing ports operate on the data in the processing independently, the throughput of this system is both fast and efficient. In a well designed system, the ports operate almost continuously.

Since any desired processor can be added to the subject system at any time, the system can grow in any desired direction. Thus, the system can operate as a highly specialized machine without loss of any general purpose ability. Also, ancillary ports and C/C sites can function as peripherals of the system. The freedom from limitations on the number and types of processing ports and C/C sites make possible a machine which essentially can perform any function or set of functions which can be embodied in the form of hardware.

The ability to add ports, computer sites and C/C sites almost without limitation makes possible a computer which can operate fast and efficiently and service a large number of users. Proper design of the matrix, the index sites, cross-index site and reference file site make possible a machine which is self-governing. The system architecture, including the matrix, inherently simplifies the software for the majority of users. The software exists largely in the form of the matrices, and the lists of catalogues and actions in the cross-index and reference file. Furthermore, the addition of new hardware to a system does not leave the old software useless. Rather, the old software remains in use along with the new and possibly more efficient software.

BRIEF DESCRIPTION OF THE DRAWINGS

FIG. 1 shows the matrix used with the system for the transfer and storage of data, illustrative of the present invention;

FIG. 2 shows another form of the matrix shown in FIG. 1;

FIG. 7 shows a nest group in one possible configuration;

FIG. 9 shows a nest group with characters in a row;

FIG. 10 shows a nest group with co-shared bits;

FIG. 11 shows a section of a long nest group using co-shared bits;

FIG. 12 shows the basic 5 No. configuration;

FIG. 13 shows an expanded 5 No. configuration;

FIG. 17 is an expanded nest group configuration of FIG. 15 which makes use of the corner areas;

FIG. 19 shows another form of the 5 No. nest group;

FIG. 23 shows the interrelationships between FIGS. 22A, B, C and D;

FIG. 24 shows a functional block diagram of the interface buffer 619;

FIG. 26 shows a block diagram of the storage and logic control 641;

FIG. 27 shows a block diagram of the relationships between the transfer logic and memory 656 and the processor;

FIG. 28 shows a general function block diagram of the operations of the port and processor;

FIG. 30 shows a typical specific data section 32 of a procession;

FIG. 32 shows a functional block diagram for the storage and site control 643;

FIG. 33 shows a block diagram of the NAMCO site 605;

FIG. 35 shows a block diagram of any one of the computers sites 608–613;

FIG. 36 shows a function block diagram of the main NAMCO storage and processor 647;

FIG. 37 shows a function block diagram of an assembler unit.

FIG. 38 shows the relationships involved in data transfer from a matrix to a procession;

FIG. 39 shows the relationships involved in data transfer from a procession to a matrix; and FIG. 40 is a block diagram of the matrix procession logic for the real time site.

DESCRIPTION OF THE PREFERRED EMBODIMENTS

Matrix

Figure 4:
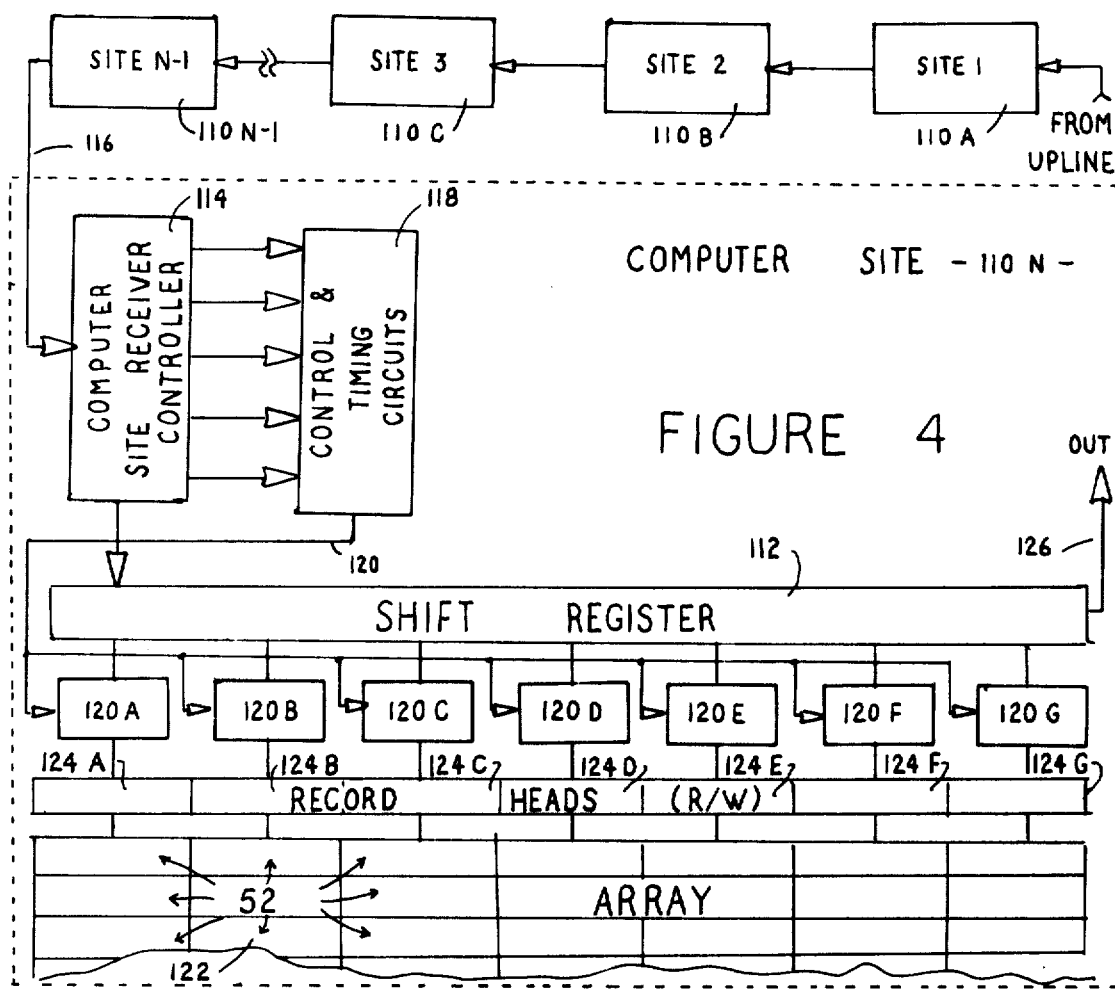
FIG. 4 shows a generalized system for entering data into a storage array.

FIG. 1 shows a single matrix according to the present invention, it being understood that the matrix is a repeating interval of time or space wherein a set of events are cyclically repeated. Each matrix basically consists of three sections, a data entry or determinator (DT) area 10, a nest array area 12 and a postscript area 14. The determinator area 10 provides both bookkeeping and software functions for the matrix, keeping track of all entries into the matrix and containing tutor information for enabling the use of and instructions for dealing with and interpreting the matrix information. The determinator area 10 includes a general data entry section 16 containing information used by all of the matrix users in common, such as a sync code 18 for maintaining synchronism of the matrices and a route code 20 for stating the route or path that a signal will follow through the system, a matrix length code 22 for defining whether the matrix is of a fixed length, a variable length or variable in discrete amounts as specified by the code 22. The general data entry section 16 may also include a time code 24 for specifying the time when an even occurs, either in terms of time or space, a matrix identification code 26 for identifying the particular matrix in current use by a permanently or temporarily assigned code, a mode code 28 for identifying the manner or mode in which the matrix is entered into the system, such as by computer mode or communication mode. Also included in the general data entry section 16 is a format code 30 which states which modes of use (template indexes to be described hereinafter) are permissible in the matrix. A nest code 54 is included in the general data section 16 which states the manner in which the nests or nest groups are to be used. As should already be apparent, the matrix is simultaneously used by a large number of users as well as being used in several different ways. In actual use of the system, some of these many users will use only a few of the matrices and none of others. The above-discussed codes in the general data entry section 16 of the matrix apply to all users entering data into a given matrix. There exist, however, additional codes which might apply to only a few select conditions, and therefore additional space can be provided in the general data section 16 for this purpose.

Following the general data entry section 16 is a specific data entry section 32 containing data which is of interest to a particular user of that section. For example, if there are ten users of the specific data entry section 32, there will be ten specific subsections contained in section 32 with one subsection devoted to each user.

The specific data entry section 32 consists of tables containing data which applies to specific users, as specified in the data or as conveyed in other ways as will be described in later portions of the specification. More specifically, section 32 includes several locations for conveying user handshaking information, including a prime number (P.No.) section 34a containing the user's fundamental address or location for identifying the site of the system. The P. Number identifies the specific user, a specific function associated with the user, or a specific location associated with such user. The P. Number is entered into a plurality of P. Number sections shown as 34a, 34b, etc. as is selected for a given matrix, and the P. Numbers can be assigned to a user on either a permanent or temporary basis. The section 32 also includes several locations 36A, 36B, etc. for conveying a receptor number (R Number) which enables data, which has been received, to be identified by a specific site or user as noted by the R Number.

The specific data entry section 32 also includes a plurality of user identification code (U.I.C.) sections 38A, 38B, etc. which contain code numbers assigned to identify a function or a set of functions that are performed by or for a matrix user under a specified set of conditions. The number of codes (U.I.C.) in a matrix is generally equal to the number of matrix users, i.e. 31, in such matrix. Section 32 also includes a plurality of guide number (G Number) sections 40A, 40B, etc. for identifying the manner and location of specific types of data which states where a specified item such as a file or a type of machinery is to be found. The G Number defines a class of several items rather than a single item, and the number of G Numbers entered into a specific data entry section 32 is generally the same as the number of P Numbers and also U.I.C. Numbers. As an example the user's G Number may state if the data is to be sent or stored, if the data is to be sent to storage, teletype, or other terminal. The G Number can select the tpe of terminal at the site which is to receive the data.

Template Index (T.I.)

A template index (T.I.) section 42A, 42B, etc. is included in the specific data entry section 32 and such template index provides a code which indicates the mode by which the data in the array section is to be interpreted or used. For example, the template index codes can indicate a Baudot code, or a displacement character to be described hereinafter as a 3 No., or a positional number described hereinafter as a 2 No. Each user has one T. I. entry in the matrix to express the manner by which the data in the array section 12 is to be interpreted. According to the subject system, the template index code numbers are assigned to each of a multiplicity of steps of entering, extracting and interpreting data within the nests, and nest groups. For example, a template index code number may indicate that 2 No. codes appear in the array section 12 for one or more users.

(NAMCO) Nest Assigned Meaning Codes

Nest assigned meaning codes (NAMCO) are code numbers selected by each user to define any of large set of meanings for the entry of data into the array section. These assigned meanings are stored in a portion of the system's memory, such as on a tape or a NAMCO generator and such memory must be referenced when data is entered or removed in the system. The meanings associated with the NAMCO can be selected for each new matrix by a code in the determinator section 10. The meaning of the array section 12 may be unique for each user such that a nest group in the array section 12 having 10 users can have 10 separate meanings derived from each NAMCO. The nest assigned meaning codes (NAMCO) are stated in the data entry section 10 in the NAMCO sections 44a, 44b, etc. Two or more users can set up their own NAMCO's which can be entered into their memories or the NAMCO generator.

Q Number

The data entered into the specific data section 32 is either in the form of codes or abbreviations for code sets as will be described hereinafter. Abbreviations for code sets are called Q Numbers. These Q Numbers are intended to stand for all the times $a, b, c, d, e$, etc. associated with each user. Thus, with each user, Q Numbers are assigned on a temporary basis for as long as needed. Q Numbers are taken from the Q Number sections 46a, 46b, etc. of the matrix by each user as he initially enters determinator data into the specific data section 32, and a Q Number is thereby seized by the user for storage at his site. Thus, a Q Number represents all of the data initially entered by a user, except possibly for the template index (T.I.) in section 42a, b, etc. and the NAMCO in sections 44a, 44b, etc. which a user may vary from matrix to matrix. In future matrices, the user therefore need not enter all of the specific data section of the determinator in the data entry section 32 but simply enters the Q Number and possibly the T.I. in any available sections 62a to 62e and possibly the NAMCO in sections 64a to 64 e, which both the sending and receiving users have stored at their sites together with the specific data represented by the Q Number. Also when the NAMCO number is received, the user is informed of the manner of translation of data in the nests. When this Q Number is received, the user knows who sent it and for whom it is sent, as well as the other data asociated with the Q Number. If there is conversation between two or more users, the same Q Number is sent by the receiver(s) back to the other originating station.

The Two Number (2 No.)

Users enter a matrix of the system in random or unpredeterminable order and, in doing so, seize positions in the specific data section 32 of the matrix determinator 10 on a first come, first serve basis. A preferred manner of entry is for each user to seize the first available data position in section 32 for entry of its data or Q Number. According to this invention, a secondary number, referred to as 2 Number (2 No.) is associated with each such position in section 32 containing a group of data for each user. The 2 Numbers are numbers which are known only by the groups of data they are associated with. These numbers are part of the sequence of numbers which denote the users by their seized positions. As an example, group 1 data consists of items in sections 34a, 36a, 38a, 40a, 42a, 44a, 46a 56, 58, 60 assigned to user A, group 2 data consists of items in sections 34b, 36b, 38b, 40b, 42b, 44b and 46b 56, 58, 60 assigned to user B, etc. Thus user A has the first position on the list, user B has the second position, user C has the third position, etc. The groups have positions which result from the order or sequence in which they occur.

As mentioned above, each group of data in the determinator section 32 has associated with it a secondary number (2 No.) which expresses the data position in section 32. A first user entering a matrix might, for example place its data into a first position in the specific data section 32 and thereby acquire a 2 Number of 1, a second user entering the matrix will then acquire a 2 Number of 2, a third user entering the matrix will acquire a 2 Number of 3, and so on. These 2 Numbers are generally implicit on the acquired positions in the specific data section 32 and in numerical order. However, the 2 No. can be explicitly stated in the determinator section 10, while the 2 Number is a number which is implicitly taken or understood by the user in the specific data section 32, such 2 Number may be employed in array section 12 as an explicit number as will be described hereinafter.

The Array

The "array" is that section 12 of the matrix which contains the data to be stored, processed, transmitted or otherwise operated on. The array is comprised of sections such as subarrays, nests, and/or nest groups. The array gets its name from the manner in which it is organized. The array is fundamentally a two dimensional structure which is organized into rows and columns. For some purposes, the array can be made to look like a one dimensional structure. The array can be subdivided into smaller parts called subarrays, not shown, comprising segments having members which repeat themselves many times in the array. A nest 52 consists of a space in the array for storing or transmitting a number of bits arranged in some configuration or configurations as expressed by the nest code in section 54 of the general data entry section 16.

According to one embodiment, the nests 52 convey, either explicitly or implicitly the secondary numbers (2 Nos.) with the configuration of data bits being fixed for an explicit given 2 Number for the duration of one matrix. Here, the 2 Number provides information as to the user's position in the specific data entry section 32 of the matrix and thus the identifier of the souce or recipient of the message or information. The data or message to be conveyed by a nest is provided either by inserting a character or data code in the nest(s) which has the 2 Number used by a given user in which case the information content is derived by the particular nest position. In the latter case, each user may have a different set of meanings assigned to the nests. In addition to the simple form of nest associated with a given user, there is a nest group wherein several users co-share a single nest as a group. The nest-group contains means for a multiplicity of users to enter data into the nest group simultaneously. The number of users that can co-share a nest is governed by the manner in which the nest is employed. The nest group can take on many forms and is subject to many variations which change with the type of nest group employed. In the section 54 of the general data entry section 16 there is a nest code (NC) which states the manner by which the nest group is to function. The nests or nest groups in the array are arranged in rows and columns. The layout permits a two dimensional array to be formed. Such an array makes it possible to operate, i.e. write/read, on all the elements of a row (or a column) simultaneously, a feature which may be necessary part and operation of the system. The nest codes may also define the sizes and structure of the nests.

In the matrix shown in FIG. 1, additional sections are provided in the data entry section or determinator section 10 at locations 56, 58 and 60 for purposes of providing tutorial information when the system has either or both computer and communications functions. At location 56, a code is provided for indicating the nature of the information in the array nests, such as whether such information is data or tutorial or a combination of both. At location 58, a code is provided for indicating what step or section of the software is being referred to by the contents in the array nests, for each user of the matrix. At location 60, a code is provided for indicating what functions are to be performed by the system for each user of the matrix. The information contained in locations 56, 58 and 60 is most frequently used in computer systems by the index, the cross-index and the reference file, to be described hereinafter.

One common form of array consists of a number of subarrays, each of which includes a number of character or data symbols occurring once in each subarray group. The nest, which is the smallest unit in the array and subarray, consists of a configuration of bits which is fixed for each user for the duration of each matrix. The length and organization of the arrays can be determined by the format code section 30 in the general data entry section 10. The sequence in which data and/or users occur in a matrix and array is not fixed and is subject to dynamic variation. Users enter on an accidental first come, first served basis. The information stored or transmitted may be shared by a large number of users. The system efficiency increases as the number of users gets large. The high system efficiency is achieved by a mass action approach to storage, transmission and processing which permits a very large number of subscribers to simultaneously use the system. The total number of users is essentially limited only by the bandwidth and the operational speed of the circuit logic.

FIG. 2 shows the "linear" or "short form" of the matrix as shown in FIG. 1, with the same numerals used to indicate identical parts. The layout is linear to correspond with the manner data is treated when this form is used. The short form is generally used for the reception and transmission of communications data because it permits the transmission of serial data. In simple systems, the short form of matrix may have a smaller determinator section 10.

Postscript Section of Matrix

The array section 12 is followed by a postscript (PS) section 14 of the matrix. This section 14 is relatively small. The data that is entered in postscript 14 cannot be entered earlier due to the fact that such data cannot be known until the preceding data is completed. Information, such as the number of symbols sent in the array section 12 to a given user, belong to this class of information. Other types of information entered in the postscript section 14 includes checks of the matrix for errors, and checks for faulty storage, transmission and/or processing. In the postscript section 14, sections 72a, 72b, 72c, etc. may be used for error checks, sections 74a, 74b and 74c, etc. may be used for deleting instructions and/or codes from the matrix, sections 76a, 76b, and 76c, etc. may be used to catch data overflows, sections 78a, 78b, 78c, etc. may be used to provide information on the following matrix, and sections 80a, 80b, 80c, etc. may provide other information regarding the matrix. The determinator 10 and the postscript 14 are also used for handshaking and signing off.

The Matrix — A Tutorial Function

Up to now, the matrix has been discussed as if it were a type of format. The matrix is also a software-data source referred to as a tutorial, i.e. a string of instructions for various sites in the system. At the same time, the matrix is also a data source.

Many parts of the system use the data and tutorials contained in the matrix. The index, cross-index and reference file use it directly while many parts of the system use it indirectly. While many of the tutorials may be used in their direct form, many tutorials are used less directly, i.e. are assembled into new tutors or tutorials and into data/tutors by the hardware.

The term "program" is not used because it refers to specific methods of using data, instructions and software. Herein, the term "tutor" is used to define the types of instruction the system requires. The term "tutorials" is used to define a string of tutors. In general, the term "tutorial" can be considered as a rough equivalent to the term "program" but the differences between tutorials as used in the subject invention and programs used in conventional systems are significant as will become apparent from the specification. Tutorials are sent directly to the processing part of the computer site by entry into the array section of the matrix. The form in which data/tutorials exist in the array enable direct entry into the matrices, without using a CPU which the subject system does not require. Thus the D/T (data/tutor) is sent in the matrix so as to be ready for immediate processing after which the results are returned to the sender.

Figure 3:
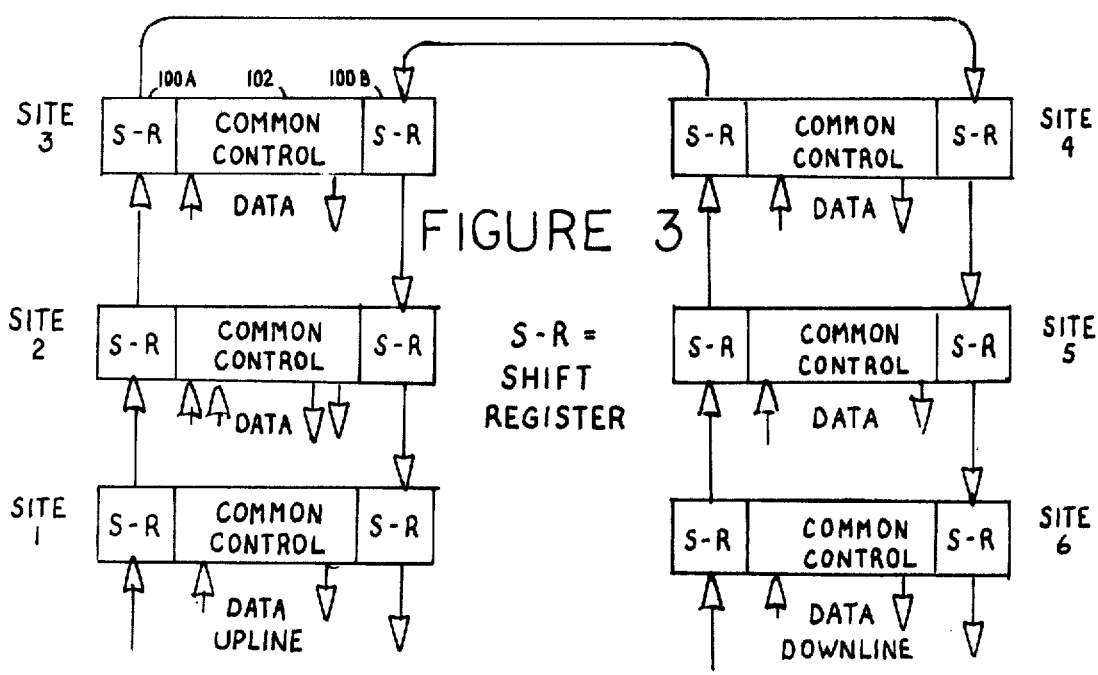
FIG. 3 shows a two way data transmission system.

FIGS. 3 and 4 show two ways for transmitting signals over a transmission path. The sites in FIG. 3 are basically the same as those in FIG. 4. The main difference is that two shift-register 100a and 100b are used for the two way transmission system of FIG. 3, one for the upline signal and the other for the downline signal. A common control section 102 provides timng and control or both shift-registers 100a and 100b and their associated hardware. The common control 102 monitors both directions for signals entered and directed to its local site. It also controls the sending operation and asures that the transmitted signals go in the correct direction, upline or downline. The hardware used for the two way transmission system including the common control 102 for shift registers 100a and 100b are known in the art and therefore will not be described in detail herein.

FIG. 4 shows a generalized system used for entering data into the nests of the array. A two way version is used to both enter and extract data from the array. While the network is illustrated as a two wire network where data flows in one direction only, it is to be understood that bi-directional systems can also be employed. Each site 110a-110n can receive data from upline and send data downline. In order to and/receive, each site contains a shift register 112 which holds the data momentarily so data can be parallel decoded or encoded.

In FIG. 4, the computer site 110n includes a receiver controller 114 for receiving data from the transmission line 116 and decoding the data into the appropriate bit form. A control and timing circuits 118 are provided for decoding and analyzing of the data in the data entry section 10, the array section 12 and the postscript section 14 of the matrix shown and described with reference to the FIGS. 1 and 2. For example, all of the code data in code sections 20, 22, 24, 26 and 28 of the general data entry section 16 are examined by the control and timing circuits 118 to determine that the information for entry by the site 110n is compatable with each matrix examined. The control and timing circuits 118 also include decoding circuits for examining the data in the specific data entry section 32 to determine if data in the particular matrix is for such site. As mentioned previously, a site initially examines the P No. sections 34a, 34b, 34b, etc. for its own address. After initial communications are set up, the site then operates with its assigned Q No. which represents the data in the specific data entry section 32 after its stored in memory. Similarly, the site includes circuits for decoding the assigned Q No., the NAMCO, the 2 No. as well as other codes described in this specification. Similarly, control and timing circuits are provided at the sending end of the site 110n for placing code data in the matrix described and shown in FIGS. 1 and 2.

The control and timing circuits 118 provides signals via lines 120 to a plurality of decoders/encoders 120a–120g which are designed to receive data from the transmission line 116 via the shift register 112 and store it in the appropriate nest positions of the array in memory 122. Memory 122 can be a multihead disc having a plurality of record and play-back heads 124a–124g for receiving the decoded data in the appropriate columns and thereafter writing such data into the appropriate columns and rows in memory 122. The memory 122 is designed to represent the row and column arrangement of the data in the array section of the data received on the line 116. The data received on the line 116 which is not intended for the particular site 110n will pass through the shift register 112 and send out on the transmission line 126. It is noted that the shift register 112 can be separate sending shift register and receiving shift register.

When the computer site 110n is sending data in a matrix, it employs its control and timing circuits 118 for examining each matrix to find the appropriate general data in section 16 of the matrix. The site sends data in the specific data entry section 32 by seizing an empty matrix position, taking a Q No. assigned to that matrix position and also storing the NAMCO the 2 No. and other pertinent data for use and interpretation of the matrix. The circuits 118 enable data to be read out of the memory 122 through the decoder/encoder circuits 120a–120g and placed on the line 126 in the appropriate nest positions.

The users equipment (i.e. terminal equipment) such as teletypewriters, telephones, facsimile, CRT displays, I/O units, etc. are not shown. The hardware at each site is equipped to receive, regenerate, and transmit signals in both directions. In order to function as either a receiver or a transmitter, the site must always perform certain functions, such as, synchronize the equipment to the sync signal, derive or supply timing, identify and remember the route, matrix length time, matrix identification, mode format, and other codes described and shown in reference to FIG. 1 enter and remove or recognize data and codes, and finally set the rest of the equipment into a receiving, transmitting or standby condition as the result of the received data.

Figure 5:
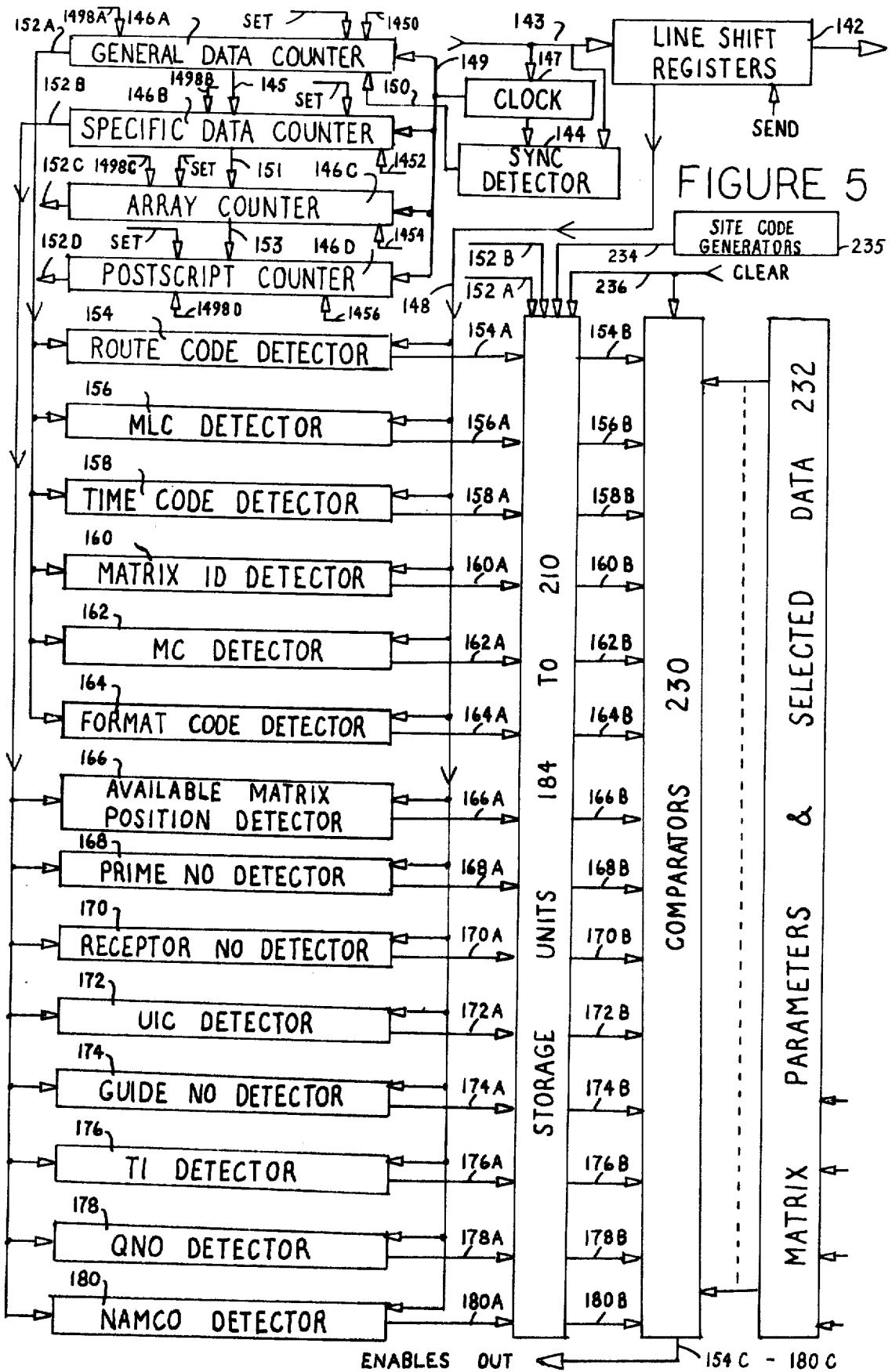
FIGS. 5, 5A and 5B are functional block diagrams generally representative of each site in the system, with FIG. 5 showing mainly the determinator detectors and stores, FIG. 5A showing matrix generators and detectors, and FIG. 5B showing the site control.
Figure 5A:
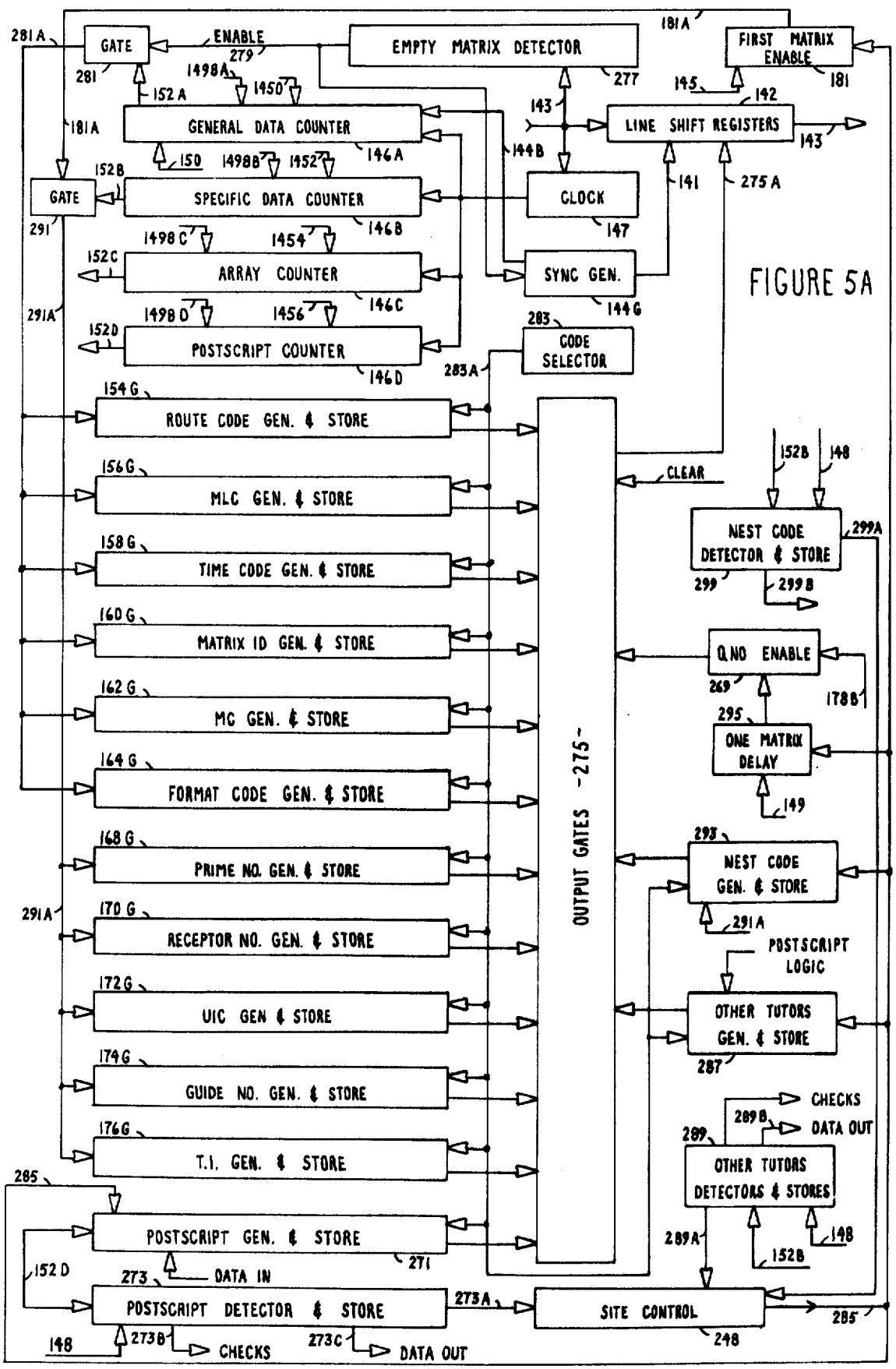
Figure 5B:
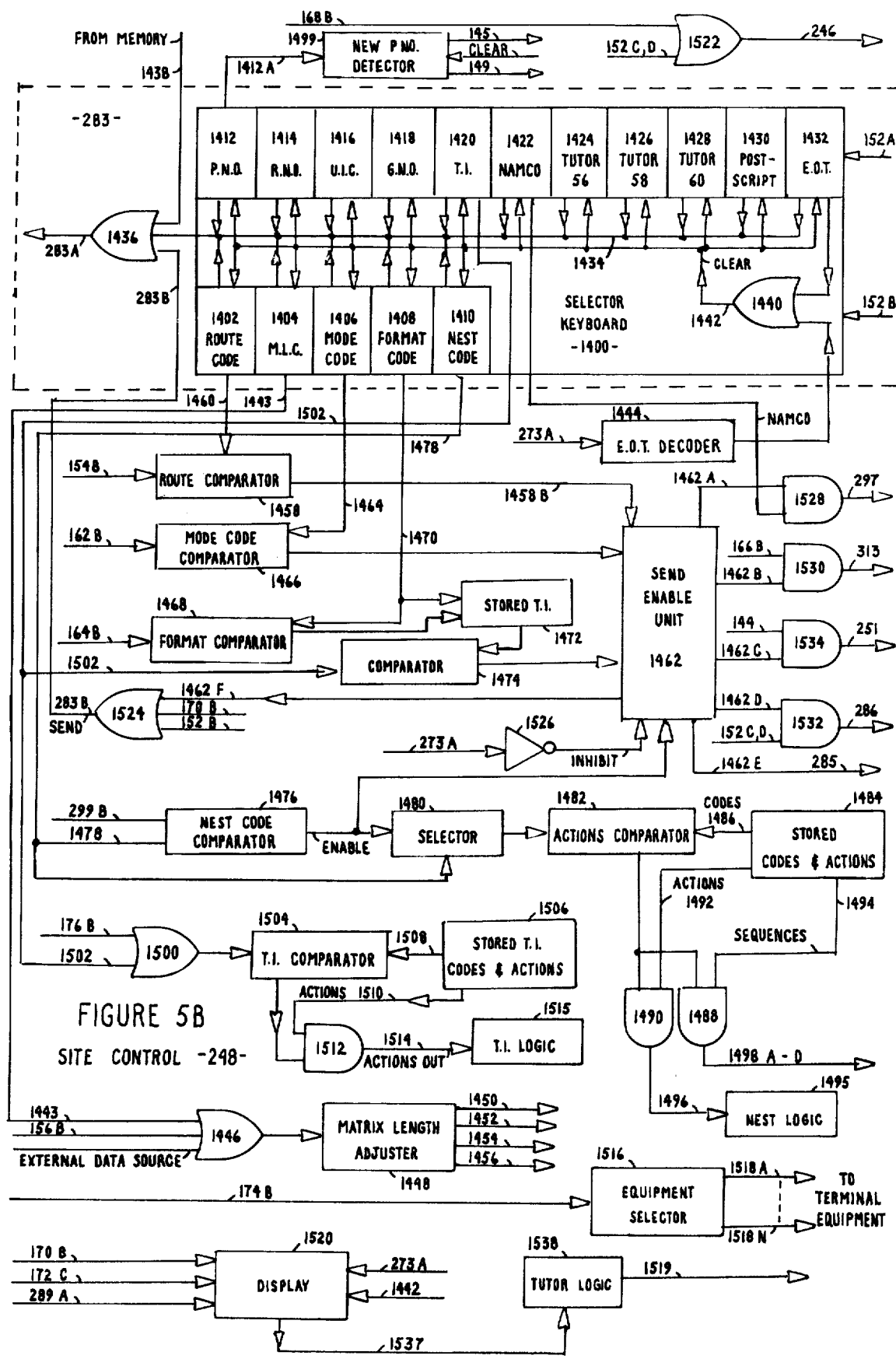

Each site of the system is shown in FIGS. 5, 5A, 5B and 6, inclusive. FIG. 5 generally shows the site detection and storage means, FIG. 5A shows generally the generators and stores for the data entered into the determinator section and the postscript section, and FIG. 5B shows a block diagram of the site control shown in FIGS. 5A and 6. It is to be understood that any reference herein to the site circuitry shown in FIG. 5 is intended to include FIGS. 5, 5A and 5B.

Referring to FIG. 5, there is a functional block diagram of each site in the system according to the present invention. Data is sent and received on transmission line 143 through line shift registers 142. A sync detector 144 recognizes the sync code located in a known position in each matrix and provides the initiating timing pulse on line 150 to a general data counter 146A. A clock 147 derives timing signals from the transmission line 143 and supplies timing information to sync detector 144 as well as on line 149 to all parts of the system at the site including the general data counter 146A, a specific data counter 146B, an array counter 146C, and a postscript counter 146D. The length of the count in 146A-D is controlled by signals received over lines 1450, 1452, 1454, and 1456, respectively. Also, lines 1498A-D from site control 248 control the sequence of groups of bits within each counter. The sync signal on line 150 enables the general data counter 146A to start counting out the predetermined code positions in the general data section 16 of the matrix in order to enable via its output timing 152A a route code detector 154, a matrix length code detector 156, a time code detector 158, a matrix identification code detector 160, a mode code detector 162, and a format code detector 164.

The final count of the general data counter 146A initiates via line 145 the specific data counter 146B and also resets such counter 146A to zero. The specific data counter 146B provides on its output lines 152B the timing of the predetermined code positions in the specific data section 32 of the matrix in order to enable an available matrix position (2 No.) detector 166, a prime No. detector 168, a receptor No. detector 170, a user identification code detector 172, a guide No. detector 174, a template index detector 176, a Q No. detector 178, and a nest assigned meaning code detector 180. Each of such detectors 154-180 receive the respective detected codes via the data line 148 and enter such detected codes in their respective storage units 184-210 via the detector output lines 154A, 156A, 158A, 160A, 162A, 164A, 166A, 168A, 170A, 172A, 174A, 176A, 178A and 180A. It is noted that while the storage units 184-210 is shown in FIG. 5 as a single box, it includes individual elements for storing each of the general and specific data codes from detectors 154-180. The outputs of the storage units 184-210 are provided on lines 154B, 156B, 158B, 160B, 162B, 164B, 166B, 168B, 170B, 172B, 174B, 176B, 178B and 180B having the number prefix designations corresponding to their corresponding code detector numbers. Data codes can also be entered directly on lines 234 by the site into the storage units 184-210.

The final count of the specific data counter 146B initiates via line 151 the array counter 146C and also resets such counter 146B to zero. Array counter 146C provides on lines 152C timing to the detection devices of the nest data and will be discussed at a later section of specification. The final count of array counter 146C initiates via line 153 the postscript counter 146D, and also resets such counter 146C. Postscript counter 146D provides timing for the predetermined sections in the postscript 70 on lines 152D.

Ones of the storage units 184-210 can be selectively cleared via lines 236. Storage units 184-210 can store the code data received by the site from the transmission line or can store those codes provided by the site on lines 234 for later sending by the site to another remote site. The same storage units are used by the site for sending data in determinator section 10 with the aid of timing on lines 152A and B.

When a user desires to send data, it first verifies that the matrix is to be entered and then enters into the specific data section in the first available or empty location. The the sender's own number is entered as an R No. and the destination or receptor's (P No) is entered. The P No and R No are respectfully on lines 168b and 170b of the storage units 184 to 210. The user identification code on line 172b, guide No. on line 174b, template index in line 176b and NAMCO on line 180b are sent on the transmission line in their prearranged positions in the matrix. All of the code data in code sections 20, 22, 24, 26, and 28 and 30 of the general data entry section 16 are examined by comparators and logic gating circuits 230 which compares the data in storage units 184, 186, 188, 190, 192 and 194 with matrix parameters and selected data in unit 232 to determine that the information for entry by the site is compatible with each matrix examined.

When a site is to receive data from the transmisson line, either the receptor No. detector 170 or the Q No detector 178 is used to examine the data in their respective positions in the specific data entry section 32 to determine if data in the particular matrix is for the site. As mentioned previously, a site initially examines the P No. sections 34a, 34b, etc. for its own address. After initial communications are set up, the site then operates with its assigned Q No. which represents the data in the specific data entry section 32 which is stored in the appropriate storage units 184-210 or in another memory. It is again noted that the available matrix position detector 166 also detects an available or empty position in the specific data entry section 32. The seized position is derived as a 2 No. on line 166a in storage units 184-210 for entry into the nests of the array 12.

As a result of entering the specific data section with the above information, he user becomes the first, second, third, fourth, etc. user to enter and seizes the first, second, third, fourth, etc. position accordingly. From the position, the user occupies in the specific data section, the user acquires the secondary number or 2 No. with a numerical value which is the same as the position occupied, i.e. if the user occupies the 13th position, it has a 2 No. of 13. A particular user may or may not enter successive matrixes. If the user enters successive matrixes, it need not occupy the same position in matrix section 32 as it entered previously. For this reason a 2 No. has the duration of one matrix and is then renewed.

The user generally does not enter data into a matrix unless it has enough in its storage to fill its share of the array. An exception to this occurs when the user ends its message and has nothing more to send to that receptor. Each user is generally allowed a fixed percentage of the slots, nests or nest-groups. The percentage is determined by the maximum permitted number of users. Each user uses its closk 147, sync detector 144, and counters 146a, b, c, and d to determine when each matrix section is completed. From the matrix length code 22, the length of the matrix can be derived. The length of each section within the matrix can be prefixed in each counter 146a, b, c, and d or can be set by lines 1498A-D, 1450, 1452, 1454 and 1456 to the counters which set the counts in accordance with received or derived data. Referring again to FIG. 5, the comparators 230 include a plurality of individual gates which compare each code on lines 154b through 180b with the site data codes in unit 232 and provides comparator enable signals on the corresponding output lines 154C through 180C.

FIG. 5A is a function block diagram of site circuitry of the system according to the present invention. Whereas FIG. 5 shows mostly receive functions FIG. 5A is largely concerned with sending functions. Data is sent and received over transmission line 143 by the line shift register 142. The operation of the general data counter 146A, the specific data counter 146B, the array counter 146C, the postscript counter 146D, the clock 147, and the sync detector 144 is described above. Control for such counters is supplied by lines 1450, 1452, 1454, 1456 and 1498A to D as will be described below.

When the site is the first unit on the transmission line, or when a break in the line occurs, the site must generate the matrix or more specifically, the general data section 16 of the matrix. If general data is arriving at a site, then there is no need for that site to generate the general data section 16. An empty matrix detector 277 detects empty matrices on the transmisson line 143. When empty matrices are detected, an enable signal then appears on line 279 which opens gate 281 and permits the signals on line 152A from the general data counter 146A to pass through gate 281. The enable signal on line 279 causes a sync generator 144G to generate a sync signal on line 141. The output of gate 281 appears on line 281A which drives generators and stores 154G-164G. Route code generator and store 154G, matrix length code generator and store 156G, time code generator and store 158G, matrix identification generator and store 160G, mode code generator and store 162G, format code generator and store 164G, and the sync signal on line 141 are used to generate the general data section 16 of the matrix. The sync generator 144G becomes active when an enable signal from the empty matrix detector 277 on line 279 appears. The sync generator supplies the sync signal on line 141 and an initiating signal on line 144B which triggers the general data counter 146A. The general data counter 146A can receive no signals from the sync detector 144 on line 150 when no matrix appears on the transmission line 143. The output of all generators of FIG. 5A are fed into the output gates 275. All the generators of FIG. 5B receive code selecting signals from a code selector 283 over lines 283A. The code selector 283 is part of the site control 248. The output of the output gates 275 appears on line 275A and goes into the line shift register 142 for transmission on transmission line 143.

In order to send, the site control 148 must provide initiating signals to the generators of the specific data section 32 data and the postscript section 14 data. An enable signal from the site control 248 on line 285 enables a postscript generator and store 271, other tutor generators and store 287, and a nest code generator and store 293. The signal on line 285 from the site control 248 also goes to a first matrix enable gate 181 which enables the generators 168G-176G for the duration only of the first matrix of a set of matrices sent to a given site. A signal on line 145 from the site control 248 inhibits the first matrix enable unit 181. The site control 248 signal on line 285 also goes to a one matrix delay unit 295 which delays this signal for one matrix and then goes to a Q No. enable gate 269 which then anables entry of the Q No. from line 278B into the ouput gate 275. The one matrix delay unit 295 is bypassed when Q No. are being sent exclusively. A signal on line 149 from the site control causes the delay activity of the unit 295 to be bypassed. LIne 285 enables gate 291 via gate 181 to cause the signal from the specific data counter to appear on line 291A. The prime number generator and store 168G, the receptor number generator and store 170G, the user identification code generator and store 172G, the guide number generator and store 174G, the T.I. generator and store 176G, the nest code generator and store 293, the other tutor generators and stores 287, and the Q No. enable 297 are therefore activated directly or indirectly by the site control over line 285.

FIG. 5A also shows a postscript detector and store 273, the other tutors detectors and stores 289, and the nest code detector and store 299. These detectors receive timing data on lines 152D, 152B, and 152B respectively. Some outputs of the postscript detector and store 273 go to the site control over line 273A, the other outputs being checks on line 273B and data out on line 273C. The checks and data in lines 273B and 273C go to the site user or the terminal equipment at the site. The output line 299B of the nest code detector and store 299, and the output line 289B of the tutor detectors and stores 289 go to the site control 248. Some outputs of the tutor detectors and stores 289, such as data received in matrix sections 56, 58 and 60, go to the user or his equipment at the site.

FIG. 5B is a block diagram of the site control 248. A code selector keyboard 1400 comprises sets of selector keys arranged in groups for manual entry of data into the system. These key groups are the route code 1402, matrix length code 1404, the mode code 1406, the format code 1408, and the nest code 1410 used for entry of data into the general data section 16 of the determinator 10. The other groups of keys, the P No. 1412, R No. 1414, user identification code 1416, guide number 1418, template index 1420, NAMCO 1422, and the keys for tutor sections 56, 58 and 60 represented by 1424, 1426, and 1428 respectively, are used to manually enter data into the specific data section 32 of the determinator 10. A postscript 1430 set of keys for sending postscript data and end of transmission (EOT) keys 1432 are shown. The outputs of the keys go out on lines 1434 to an OR-gate 1436 where they are gated with memory output lines 1438 used when automatic entry is desired and send line 283B. The output of the gate 1436 is the lines 283A shown also in FIG. 5A. The code selector keyboard 1400 and the gates 1436 and 1440 comprise the code selector 283 shown in FIG. 5A. The output of the end of transmission (EOT) keys 1432 is gated with an EOT decoder 1444 in gate 1440. The output of gate 1440 is used to clear the other keys over line 1442. The EOT decoder 1444 receives data from postscript decoder and store 273 and/or from an external postscript data input. Timing for the selector keyboard 1400 is supplied on lines 152A and 152B.

The output of the matrix length code selector keys 1404 goes to gate 1446 over line 1443. The stored output line 156B of the matrix length code detector 156 also goes to the input to gate 1446. The output of the gate 1446 goes to the matrix length adjuster unit 1448 which sends signals over lines 1450, 1452, 1454, and 1456 for controlling the length of the counts in the counters 146A, B, C, and D respectively.

The output of the route selector keys 1402 is applied to the route comparator 1458 over line 1460. Another input to the route comparator 1458 appears on line 154B from the route code detector and its store. If the detected incoming matrix route agrees with the desired route on line 1460, then an output from the comparator 1458 goes to the send enable unit 1462.

The mode code selector keys 1406 goes over line 1464 to the mode code comparator 1466. The other input to the comparator 1466 arrives on mode code detector line 162B. When a comparison occurs an enable signal is applied to the send enable unit 1462.

The format code comparator 1468 receives data from the format code selector keys 1408 over line 1470 and the format code detector 164 and its store over line 164B. When a comparison occurs, a signal appears on the output which is applied as an enable signal to the stored template index (T.I.) unit 1472. The signal on line 1470 is also applied to the stored T.I. unit 1472. This causes the set of template indices permitted by the format code on line 1470 to be applied to comparator 1474. The code selected by the T.I. key selector 1420 also appears on line 1502 to comparator 1474. If the T.I. selected is a permissable T.I., then an enable signal is applied to the send enable unit 1462 by the comparator 1474.

A nest code comparator 1476 receives signal from the nest code selector keys 1410 over line 1478 and from the nest code detector store 299 over line 299B. The output of the comparator 1476 goes to the send enable unit 1462 and also to selector unit 1480 which enable transfer of the signal on line 1478 to the comparator 1482 when a comparison occurs in comparator 1476. Comparator 1482 also receives signals from the stored codes and actions unit 1484. The stored codes and actions unit 1484 generates codes and actions which appear synchronously at its outputs and are codes, actions, and sequences. The codes are fed into an action comparator 1482 on line 1486. When a comparison occurs, gates 1488 and 1490 are enabled, which permits the actions on line 1492 and the sequences on line 1494 to appear at the outputs 1496 and 1498 respectively. The output on lines 1496 is used by nest logic circuit 1495 to locate data in the nest groups, and the output on lines 1498 is used to control the bit size sequence of the counters 146A-D over lines 1498A-D.

A gate 1500 data from the T.I. code selector 1420 on line 1502 and from the T.I. detector 176 and its store on line 176B. The gate's 1500 output goes to a T.I. comparator 1504. A stored T.I. codes and actions unit 1506 presents codes on line 1508 to the T.I. comparator 1504 and simultaneously presents actions on line 1510 to a gate 1512. When the gate 1512 receives an enable signal from the T.I. comparator 1504, the actions on line 1510 from the stored T.I. codes and actions unit 1506 are gated on to lines 1514. The lines 1514 connect with a T.I. logic unit 1515, for controlling the response of the site to a received template index (T.I.) code.

The guide number on line 174B goes to an equipment selector 1516 which selects the terminal unit which is to receive data at the site. An enable signal on one or more of the lines 1518A-N from the ouput of the equipment selector unit 1516 selects the terminal units to receive data.

The display unit 1520 receives data for display on lines 172B, 170B, and 289A, respectively, for the display of user identification codes, address of the sender (R NO.), and tutors such as in sections 56, 58, and 60. Data from lines 1442 and 273A from the T.I. selector keys 1420 and the postscript detector and store 173 are used to clear the display unit 1520.

Timing data from the counters 146C and D on lines 152C and D, and the output of the prime number detector 168 and its store on line 168B, are the inputs to a receive time gate 1522. The output of gate 1522 appears on line 246 to enable receiving. Gate 1524 receives inputs on lines 170B i.e. from the R No. (the senders address) detector 170 and its store, and on line 152B from the timing unit. The gate 1524 also receives a send enable signal from the send enable unit 1462. The output of the gate 1524 goes to the ouput P No. generator and store 168G via lines 283B, gate 1436 and lines 283A.

The send enable unit 1462 enables its outputs after all its inputs have been enabled and no inhibit signal appears from an inverter 1526, driven by the postscript detector and store 273 over line 273A. An enable 1642A output from unit 1462 and the NAMCO selector keys 1422 together enable the gate 1528 out of which appears a signal on line 297 for the NAMCO generator 296. The output 1462B and the available matrix position detector 166 output on line 166B are applied to gate 1530. The output of 1530 goes to output gate 314 over line 313. The output 1462C and a signal from sync detector 144 enable gate 1534. The output of gate 1534 goes out on line 251 to the send enable gates 253. Signals from the ouput 1462D and timing on lines 152C and D enable gate 1532. The ouput of gate 1532 appears on line 286. The ouput 1642E of the unit 1462 appears directly on line 285.

A new P No. detector 1499 detects the presence of a new P No. signal from the P No. code selector 1412 on line 1412A. The unit 1499 puts out an inhibit signal on line 145 and an enable signal on line 149 except for the one matrix time when a new P No. is detected.

The output of the display unit 1520 appears on line 1537. The line 1537 goes to the tutor logic unit 1538. The output of the tutor logic unit appears on line 1519. Line 1519 is used to control the response of the site to tutor 56, 58 and 60. The output 1519 can also be used by the terminal equipment at the site.

Figure 6:
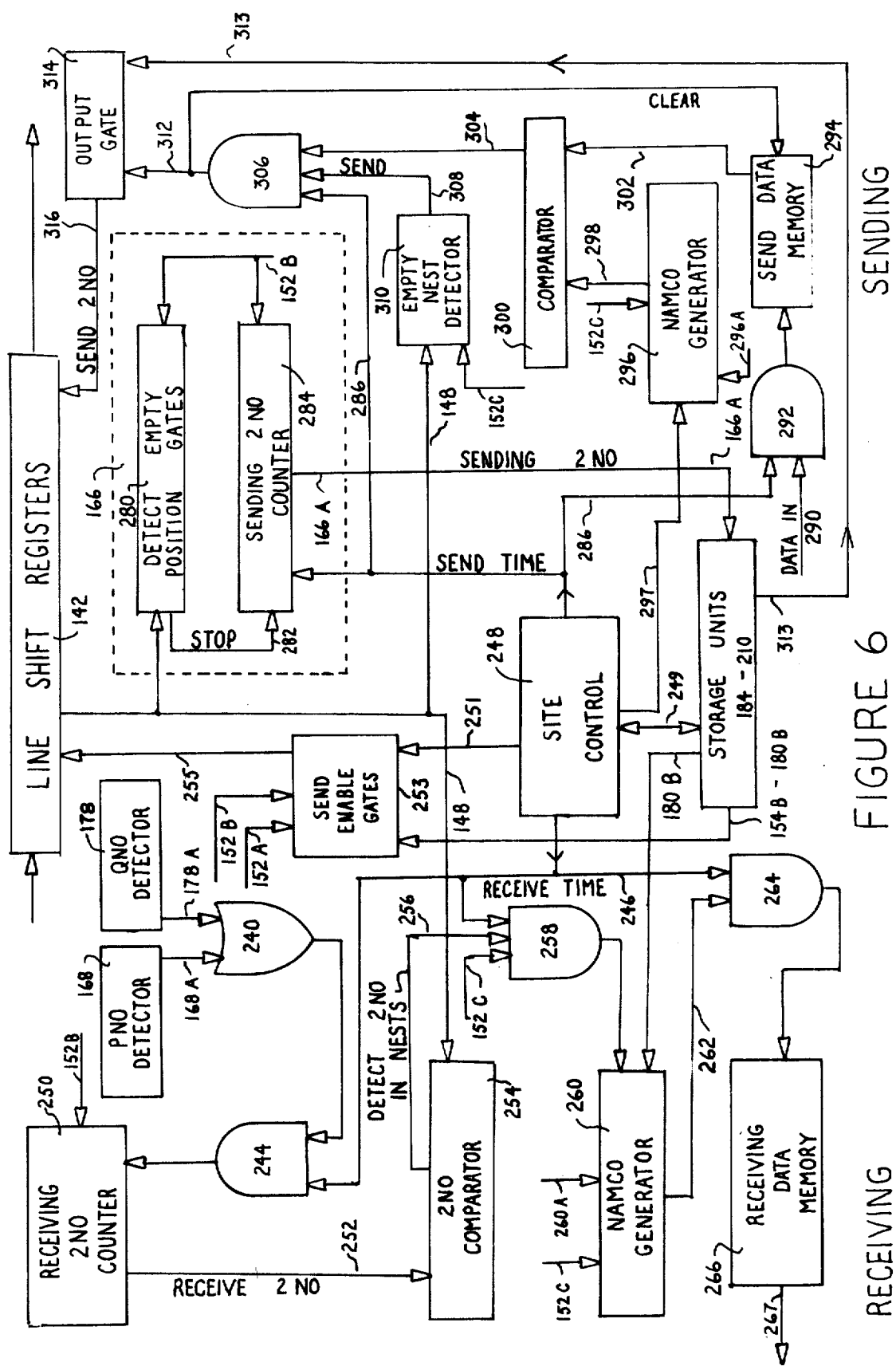
FIG. 6 is a functional block diagram of the sites showing additional details of the site circuitry shown in FIG. 5.

Referring to FIG. 6, there is shown a block diagram of some of the circuits at a site used for both sending and receiving data in the array nests. When a site is receiving transmission line data from a matrix, it detects its own P No. or Q No. in the specific data entry section 32 by means of detectors 168 and 178 and uses the position in which such detected P No. or Q No. is received as the 2 No. for received data. An OR gate 240 receives either the P No. from detector 168 or the Q No. from detector 178 and in turn provides a signal to an AND gate 244. Gate 244 is enabled during the receiving times of the site by a signal on line 246 from a site control unit 248 which provides the basic control signals, such as send and receive time signals, in response to input commands. The site control 248 is interconnected with the storage units 184–210 via lines 249 for entering in and receiving data from such units. Site control 248 also provides enable signals on lines 251 to send enable gates 253 for entering determinator data from lines 154B–180B into the line shift registers via lines 255. Gates 253 also receives determinator data on line 257 from a storage and logic control 641 shown in FIG. 22A and FIG. 26. During the receive time, wnhen either the Q No. or the P No. have been detected, the gate 244 provides a signal to a receiving 2 No. counter 250 which also receives timing signals on lines 152B from the specific data counter 146B. Upon receipt of the signal from gate 244, the 2 No. counter 250 is stopped and held for the duration of the matrix and provides the received 2 No. on output line 252. Line 252 is connected to a 2 No. comparator 254 which is connected to the incoming data line 148 and also receives array nest timing signals on lines 152C from the array counter 146C. Essentially, the 2 No. comparator 254 detects the presence of the site's 2 No. in the nests of the array section of the matrix and in turn provides an output line 256 a signal which is gated through an AND gate 258 to a NAMCO generator 260. The gate 258 receives both the nest timing information on line 152C from the array counter 146C as well as enable signal on line 246 from the control unit 248 during the site's receive time. Thus, during the array time when the site is set to receive data, the gate 258 will pass a signal, upon the detection of the 2 No., on to the NAMCO generator 260. Generator 260 also receives the nest assigned meaning code (NAMCO) number on line 180B for generating the particular code set. When the 2 No. is detected in a nest, the resulting signal on line 256 enables the NAMCO generator 260 to produce the data code or character being received by the site and present it on output line 262 for passage via a gate 264 into a received data memory 266. Memory 266 provides data output on lines 267. Gate 264 is enabled by the receive enable line 246 discussed above. In this fashion, a small 2 No., such as 3 bits, is all that is needed to be transmitted in order to communicate data in the nest array to another site. Different types and embodiments of the systems for generating the data codes, such as the NAMCO will be discussed hereinafter.

Referring again to FIG. 6, when a site wishes to send data, it detects an available position in the specific data entry section 32 and sends the appropriate data therein. The seized position is derived by the available matrix position detector 166 which provides the on line 166A the 2 No. used for sending data. This 2 No, is inserted by such site into selected nests of the same matrix for communication to one or more other sites. Specifically, the available matrix position detector 166 includes gates 280 which receive the specific data timing signals on lines 152B together with the incoming data on line 148. When a position is available, the gates 280 provide a stop signal on line 282 to a sending 2 No. counter 284 for stopping the count. Counter 284 is activated during the sending time of the site by a send enable signal on line 286 from the site control 248. Counter 284 also is connected to the timing lines 152b. When the counter 284 is stopped, it provides the 2 No. an output signal on line 166a leading out of the available matrix position detector 166 and into the respective device in storage units 184–210. The 2 No. to be used for sending in the array section of the matrix is now stored. When data is to be sent on the transmission line in the array section 12 of the matrix, it is entered by the site via line 290 and a gate 292 into a send data memory 294. Site control 248 provides a send enable signal on line 286 to the gate 292. A NAMCO generator 296 provides the set of codes used by the site as determined by the NAMCO number fed via line 297 into the generator. It is noted that the NAMCO generator 296 can be the same one as, or separate from the NAMCO generator 260 used for receiving data, with the separate data code sets being determined from the different NAMCO numbers used for sending and receiving when those functions occur simultaneously at a site. Generator 296 provides the output codes, representing the data carried by the nests, on line 298 to a comparator 300 which compares the codes with the data on output line 302 from the send data memory 294. When a match occurs, a comparator output signal is provided on line 304 to a send data gate 306. Gate 306 is an AND gate which also receives a signal on line 308 from an empty nest detector 310 which senses an empty nest on the data lines 148 and with the timing provided on lines 152c. When the match signal appears on line 304, the empty nest signal appears on line 308, and a send enable signal is provided on line 286, the gate 306 provides an ouput enable signal on line 312 to an ouput gate 314. At this time, gate 314 is enabled to pass the 2 No. from line 313 onto lines 316 for entry in the line shift registers 142 for sending on the transmisson path. The output enable signal on line 312 is fed back on such line 312 to the send data memory 294 to clear the character that was sent.

When a site is finished entering data into the system, it enters its Q No. into one of the delete sections 74a, b, etc. of the postscript section 14. This delete is read by the bookkeeping section of the system which in turn enters the deleted Q No. into one of the sections 56a, 46b, etc. of a matrix for use by another site. The bookkeeping section keeps track of who enters and leaves the system and notes the time and the matrix identification. These and other items are used by the index and cross-index, as will be described hereinafter. Alternately, the 2 No. can be entered into the delete sections 74a, b, etc., of the postscript section 14 so as to signify the end of its use and also the end of a message. The decoding hardware for carrying this out is provided in FIGS. 5 and 6, with the postscript timing on lines 152d from postscript counter 146d being used with the Q No. and 2 No. detectors.

From the above it should be apparent that the secondary number and the described matrix are employed in a special manner and have a distinct relationship in the operation of the system. While the secondary number has been described as a 2 No., it is noted that there are other forms or variations of the secondary number. The secondary number can take the form of what will be referred to herein as a 2 No., 3 No., 4 No., 5 No., 6 No., etc. Each succeeding number denotes a development of the 2 No. and/or its use. It is the developement of the 2 No. into higher secondary numbers that make possible more efficient computer and communications systems which employ fewer bits per word than alternate systems and can also provide secret and secure communications. The effect on the computer is even more significant in that a whole new series of operations, operators, sorting, collating, correlating means, processing, programs and programming possible and practical. The use of the secondary number, the nest group and the matrix all involve the principle of mass action, or mass behavior which provide a basis for the systems to become truly self-organizing. The described technique makes it possible for as many users as desirable to enter and use the system simultaneously, as long as the bandwidth permits.

From the above embodiment, there has been shown a matrix wherein the nest arrays have assigned meanings selected by the NAMCO number which defines a set of characters produced by a NAMCO generator. The use of the secondary number in the nests acts as a nest or nest group selector together with the NAMCO. The number of symbol which comprise the NAMCO character set, i.e. the number of characters used, bares no relationship to the 2 No. The 2 No. is the same size regardless of whether 5 bit, 8 bit or 10 bit words are used. The size of the 2 No. is determined solely by the number of users in a martrix.

The Nest Group Array

Referring to FIG. 7, there is shown a nest group which is a multiplicity of nests that function together such that each nest group occupies a position in the array in the same manner as the nests. The nest group has a NAMCO meaning for each user that enters the group. The nest group shown in FIG. 7 is designed to simultaneously accommodate eight users which enter the sections 340, 342, 344, 346, 348, 350, 352 and 354. In these sections, the numbers 2, 3, 4, and 5 refer to the number of bits in the users 2 No. that can be accommodated by each nest group section that is, section 340 accommodates a 3 bit 2 No., section 342 accommodates a 4 bit 2 No., section 344 accommodates a 2 bit 2 No., and so on. This type of nest group can be modified to have any number of users and any number of bits in their secondary numbers. The advantage of using the nest groups of FIG. 7 can be illustrated by the following example. Assume that there are 31 users in a particular matrix. Ordinarily, this would require 5 bits to represent and store each 2 No. Therefore, the eight users in the matrix would require 8 times 5 or 40 bits.

Now the following occurs. The first user takes 2 No. of 1. The second user takes 2 No. of 2. The third users takes 2 No. of 3, etc. The user enters the first vacant location. This means the first 2 No. tends to always exist. Now, the 2 No. of 1 is written 00001, but can be written 01. The 2 No. of 2 is written 00010, but can be written 10. The 2 No. of 3 is written 00011, but can be written 11. The 2 No. of 4 is written 00100, but can be written 100, etc. In other words, the "zeros" in front of the "one" can be removed without altering the binary value. When these zeros are removed, we can fit into the nest group 2 — two-bit 2 Nos., 2 — three-bit 2 Nos., 2 — four-bit 2 Nos., and 2 — five-bit 2 Nos. Thus, the nest group of FIG. 7 can store eight 2 Nos. in 28 bits. Normally, 40 bits would have been needed to store eight 2 Nos. The nest group effects a savings of 12 bits or 30%. In other words, the use of this nest-group results in the ability to store on and one-half times as much data in the same space.

TABLE I

| Binary | Number | Binary | Inverted | Number | Inverted Number |
|---|---|---|---|---|---|
| 0000 | 0 | 1000 | 0111 | 8 | 7 |
| 0001 | 1 | 1001 | 0110 | 9 | 6 |
| 0010 | 2 | 1010 | 0101 | 10 | 5 |
| 0011 | 3 | 1011 | 0100 | 11 | 4 |
| 0100 | 4 | 1100 | 0011 | 12 | 3 |
| 0101 | 5 | 1101 | 0010 | 13 | 2 |
| 0110 | 6 | 1110 | 0001 | 14 | 1 |
| 0111 | 7 | 1111 | 0000 | 15 | 0 |

Table I illustrates that the binary number from 0 to 7 can be written with a maximum of three symbols since the zeros before the ones do not mean anything. The table also shows that the binary numbers from 8 to 15, when inverted, are the same as the numbers from 7 to 0, but inverted in counting order. Now, FIG. 7 shows there are two of each code length words in the nest-group. Each square is the location of one bit. There are two, 2 bit words, two, 3 bit words, two, 4 bit words, and two 5 bit words. Each of these words has a distinctive location within the nest group. Because each word has a distinctive and unique position one can use the two similar number of bits e.g. x-bit words, distinctively and without any possibility of producing confusion. One can select one word of each length and insert its inverted form into another section of the nest group. By doing this and throwing away the initial zero bit, one can store six bit long words in the nest-group of FIG. 7. One can also save 8 bits in doing this, or one bit per each of the eight nest group sections.

One can also use the same technique for transmission when 3 Nos. and other higher secondary numbers are sent. Every other slot can carry the inverted binary while the slots between carry the direct binary number. The initial zero is removed. The number of bits for a five bit word is reduced to a four bit word or even less. The reduction is a 20% savings of bits. The saving in bits when this technique is used in the nest-group will vary from 10 to 20%.

Transmission of Standard Codes

The above described matrix and systems using the same can employ standard character codes, such as Baudot and ASCII, inserted in the nests or slots of the matrix shown in FIGS. 1 and 2. In this embodiment, specific ones or groups of nests or slots 52 in the array section 12 are associated with specific 2 No. positions seized by the user in the specific data section 32. Codes are entered in the general data section 16 in the manner described above, with the mode code in section 40 indicating the types of code permissible in the array and the nest code in section 54 indicating the size of the code in the nests. The system shown in FIG. 4 is employed to send and receive the standard character codes in the nests 52 of the array 122. As a result, the user's data can appear in one column of the array provided that the encoder/decoder devices 120A through 120G and the record and playback heads 124a–124g are equal to the number of 2 No. positions in the specific data section 32.

Codes Using 3 No. and Secrecy

The 3 No. mode of entering code is a modified form of the 2 No. mode previously described. According to one form of the 3 No. mode data is entered into the determinator section 10 in the same manner described above, with the exception that the template index section 42a, b, etc. provides a code that notifies the site that the 3 No. mode is in use to store or transmit data. The NAMCO number is also transmitted in sections 44a, 44b, etc. for informing the sites of the NAMCO code set to be used. As described above, the template index section provides a code which indicates the mode or manner of interpretating data in the array section, such as a 3 No. code rather than a strict 2 No. code. As an example of the use of the 3 No., an originator site sends a NAMCO code number to the receptor or site. This enables both sites to have a reference set of symbols which are alike in kind and in number, and are ordered in the same sequence. The symbol set common to both sites is in the form of a loop. That is, the last symbol is tied back on itself so that it is just ahead of the first symbol. This is referred to as the NAMCO loop.

For the communicating sites, the NAMCO loop begins at a common zero position. Each successive array nest position can correspond with the order of the characters on the NAMCO loop. Every character on the NAMCO loop, except for the zero position, is some number of characters away from the zero position. The number of characters away from the zero position where a symbol is located is caled the template index distance.

Each time a new array nest position occurs, the character in the zero position changes. The template index (T.I.) distance usually also changes when the slot changes. Some template index distances are positive (+) and some negative (−) with respect to the zero position. The change in the zero position will be first taken to mean that the adjacent character moves into the zero position when the array nest or slot changes. This is not the only approach. The character in the zero position can change by a pseudo-random number of characters, or in some other fashion. The NAMCO code set consists of characters used to provide successive zero positions for the transmitted T.I. distance to refer to. Only the T.I. distance is transmitted in the nests or slots, whereas the NAMCO set is referenced at the sites and is not sent. Therefore, what is being transmitted in the nests or slots is simply a number representing a distance. According to this 3 No. embodiment, each 2 No. position in the specific data section 32 is associated with specific nests or slots in the array section 12 of the matrix. The slot template index T.I. distance is sent in the slot instead of the 2 No. numbers and the NAMCO set for use with the T.I. distances sent to the communicating users.

In order to transmit data, it is first necessary to know the template index distance of the character one wishes to send, as measured from the zero position. Once the template index (T.I.) distance is known, the slot T.I. can be generated and inserted into the user's 2 No. assigned slot in the array.

In its simplest form, the slot T.I. is the same as the T.I. distance. The slot T.I. is stated in binary form. Assume that the user wishes to send NOW IS THE TIME. The A is in the zero position and the T.I. distance to the N is 14 characters. Since the slot T.I. is the same as the T.I. distance, the slot T.I. is 01110. The B character would move into the zero position with next user's slot. The T.I. distance between the B and O character which is now to be transmitted is 14 characters. Therefore the slot T.I. is 14, or 01110. This T.I. is entered into the user's 2 No. slot. Next the C character is advanced into the zero position. The W which is to be sent is 20 characters away from the C. The T.I. distance and the slot T.I. are 10100. In tabular form the message sent in the user's nests or slots is shown in the middle column of Table II below.

TABLE II

| CHARACTERS TO BE SENT | T.I. DISTANCE (and SLOT T.I.) | CHARACTER IN ZERO POSITION |
|---|---|---|
| N | 14 – 01110 | A |
| O | 14 – 01110 | B |
| W | 20 – 10100 | C |
| space | 27 – 11011 | D |

TABLE II-continued

| CHARACTERS TO BE SENT | T.I. DISTANCE (and SLOT T.I.) | CHARACTER IN ZERO POSITION |
|---|---|---|
| I | 4 – 00100 | E |
| S | 13 – 01101 | F |
| space | 24 – 11000 | G |
| T | 12 – 01100 | H |
| H | 31 – 11111 | I |
| E | 27 – 11011 | J |
| space | 20 – 10100 | K |
| T | 8 – 01000 | L |
| I | 28 – 11100 | M |
| M | 1 – 00001 | N |
| E | 22 – 10110 | O |

It is noted that even this very simple encoding becomes hard to break if the outsider does not know the NAMCO or the synchronization point. Note that the same transmitted number represents different characters at different times. As the NAMCO becomes longer and more random, the effort to decode the message without knowing the NAMCO becomes increasingly greater. A mildly complex NAMCO requires a computer. Also, crypto random code generators can be used as the source of the NAMCO or the crypto code can select characters in the zero position. It is noted that this type of method for securing secrecy does not carry the reference or zero position code. This approach to privacy and security is both simple and inexpensive. The use of a five bit slot T.I. is not necessary. Fewer bits can be used at the price of having some slots empty. Empty slots would occur when the desired character is too far away. Also, it should be apparent that the receive process is the inverse of the sending process.

There are many ways of setting up a NAMCO loop. Almost any form of memory can be used. For slow speed operation, a punched tape device can be used. Also, disks with punched holes and driven by a stepping motor can be used. Magnetic tapes and disks can be employed. But, one of the easiest devices is an N character memory with the input tied back to the output.

One advantage provided by the 3 No. is that data can be easily moved from a given nest or slot to another nest or slot by simply adding or subtracting the new nest or slot distance from the original one. Thus, where two or more streams of data are to be folded together into a single stream, the interleaving of data streams is achieved by adding or subtracting the appropriate T.I. distance numbers to the nests or slots and thereby enabling the folding by simply counting techniques.

Figure 8:
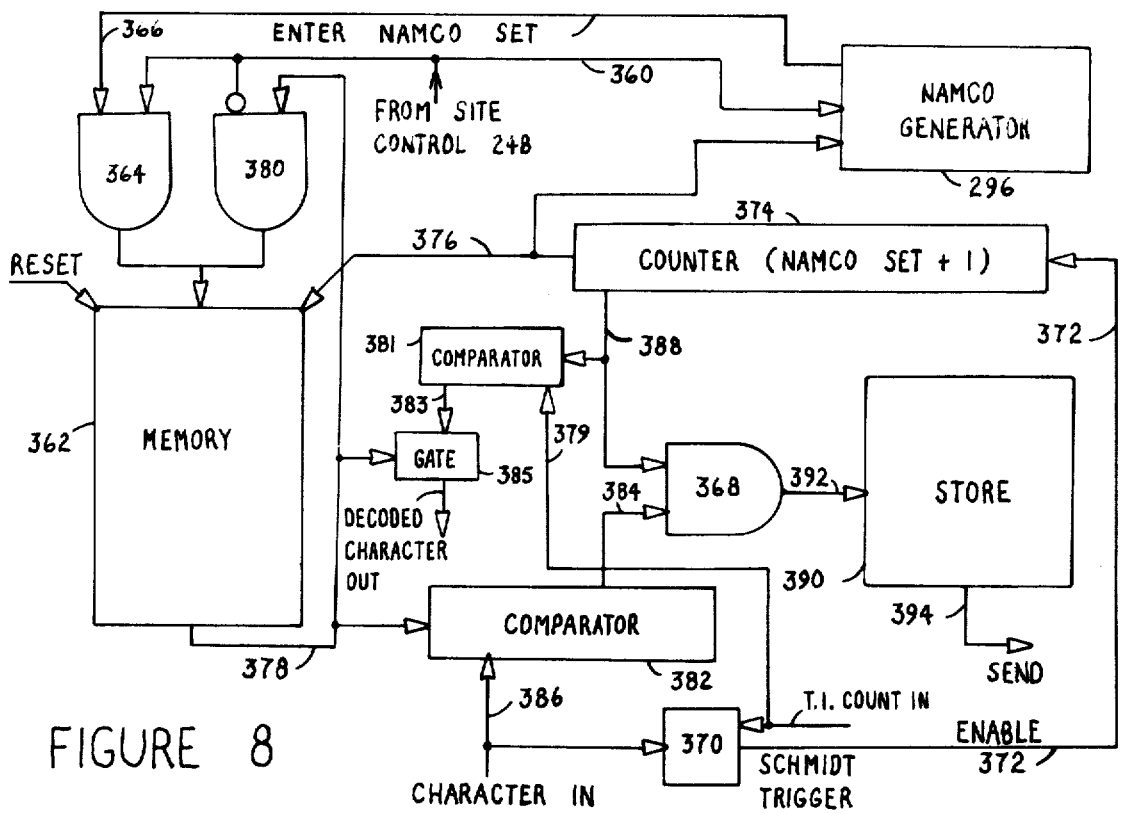
FIG. 8 is a block diagram of the circuit used with the 3 No. technique.

Referring to FIG. 8, there is shown the circuit used with the 3 No. technique. The NAMCO generator 296, also shown in FIG. 6, is enabled by a pulse on line 360 from the site control 248 prior to transmission. This loads the NAMCO set of characters into a circulating memory 362 via a gate 364 which is connected on line 366 to the output of NAMCO generator 296. When a character is presented for transmission on line 368 from the send data memory 394 shown in FIG. 6, it causes a Schmidt trigger 370 to generate a pulse on line 372 which starts a counter 374 which is set to count to the numer of NAMCO characters in a set plus one. Counter 374 is of a high speed nature and goes through its count in one character time or less. Counter 374 advances the NAMCO generator 296 and memory 362 at the counter rate via line 376 by the NAMCO set plus one, so that a complete set of NAMCO characters plus one appear successively one line 378 and are returned to the memory 362 through a gate 380. A comparator 382 compares the character on line 386 with the character on line 378 and, upon a match, generates a pulse on line 384 which enables a gate 368 to transfer the count on line 388 to a send store 390 via line 392. Send store 390 holds the count number at which the match occurred and makes it available on line 394 for entry at the correct time into line shift registers 142. The counter 374 always counts to the NAMCO set plus one for every enable pulse which arrives on line 372, so the memory 362 circulates the code set once plus one character. In this fashion, a site generates and sends the slot template indes (T.I.) distance on line 394 into the nest or slot of the array.

A site receives a 3 No. character count, in the form of a template index distance in a nest or slot, on receive line 379 to a comparator 381. Receive line 379 is connected to Schmidt trigger 370 to generate a pulse which starts the counter 374. Comparator 381 compares the received template index distance on line 379 with the output line 388 of counter 374 and, upon a match, generates a pulse on ouptut line 383 which enables a gate 385 to output the decoded character from memory line 378. In this fashion, the appropriate character is derived from the received T.I. distance.

Another embodiment of the 3 No. is the same as the embodiment described above except that a plurality of sequences of symbols in the NAMCO generator are selected by a compatible slot T.I. For example, where four sequences of symbols are available, a five bit T.I. is used in the nests or slots, with the first two bits as a selector of the T.I. distance. The sequences are generated and the T.I. distances sent in the nests or slots in the same manner as described in the prior embodiment. In both embodiments of the 3 No., the character to be communicated is fed into the comparator 382 and Schmidt trigger 370 which starts the counter 374. This causes the character in the character memory 362 to race through the comparator 382 while the counter 374 provides a count which indicates the number of characters away from the zero point that the desired character is located. This number becomes the T.I. distance.

Use of the 3 No. for Secrecy

The 3 No. technique can be used for both privacy and secrecy. This is a natural result occurring as the NAMCO set length is increased. The NAMCO set used with the 3 No. contains characters, each of which occur a multiplicity of times in a pseudo-random fashion. If the initial zero point is unknown to the user and the set is sufficiently long, both privacy and secrecy are obtained because the referenced NAMCO set is never transmitted. If a pseudo-random bit generator (KG unit) is employed in place of the NAMCO set and the bits are taken N at a time, then super encryption results. Here, N equals the number of bits in a character. As previously mentioned, the referenced code, now the code from the KG unit, is referenced and used to generate the 3 No. without itself being transmitted. The basic system for achieving secrecy is essentially the same as shown in the previously mentioned Figures. For example, in FIG. 8, the NAMCO generator 296 is replaced by a pseudo-random bit generator.

The 2½ Number

This case combines some of the 2 No. techniques with some of the 3 No. techniques. Since it is half 2 No. and half 3 No., it is referred to as the "2½ No". This technique uses the NAMCO generator in the same manner as described for other embodiments, with a pseudo-random symbol set which is identical at both receiving and transmitting sites. Data is entered into the determinator section 10 of the matrix in the manner previously described. A code sent in the format code section 30 indicates, among other things, that the matrix uses a 2½ No. In the specific data section, the template index (T.I.) 42a, b, etc. contains information which indicates which bits are used for the 2½ No. and many also state which NAMCO set is to be employed.

The 2 No. is transmitted as a part of the information entered into the array nest or slot. The slot data includes the slot template index (T.I.) distance as well as the 2 No. Both the T.I. distance and the 2 No. are used in the array nests or slots for the same functions as previously described for the 3 No. and the 2 No., respectively. Therefore, the 2½ No. states both the position seized by the user in the specific data section 32 as well as the distance that a character to be received is located away from the zero position. As will become apparent, the 2½ No. technique can be suitably combined with the 4 No., 5 No. and/or 6 No. to be described. Also, the 2½ No. and the 3 No. permit higher data rates for the users and higher frequency of entry into the matrices.

The 3½ Number — Co — Sharing 2 Nos.

In its simplest form, the 3½ No. has a 2 No. assigned to two users in the determinator section 10, the array section 12, as well as in the postscript section 14 of the matrix. Here, odd and even users are both assigned the same set of 2 Nos. with the odd and even positions serving to distinguish the two sets of users. This odd-even designation of the co-sharing users is employed in all sections of the matrix, namely the determinator 10, the array 12 and the postscript 14. For example, the users 1 and 2 are assigned 2 No. = 1; users 3 and 4 are assigned 2 No. = 2; users 5 and 6 are assigned 2 No. = 3, etc. The odd users enter their data in the odd nests or slots of the array and postscript while the even order users enter their data in the even nests or slots of the array and postscript. This technique can be extended to any number of sets of users, other than only odd and even sets. By this means, the number of bits in the 2 No. can be reduced. At the receiving site, the odd and even 2 No. are separated on the basis of their location or position within the matrix. The circuitry to be used is the same.

The 4 Number

Referring to FIG. 9, there is shown a one dimensional or linear nest group used by two or more members to co-share bits according to the 4 No. technique. Here, the 01 and 03 denote separate binary bits in nests 410 and 412 of the nest group. The X2 in nest 411 is the shared bit which is shared with the bit on both sides thereof.

Thus 01X2 is one character and X203 is another character. In this simple case, when X2 is a "one" then 01X2 cannot be 01 because that would be ambiguous. The 01X2 or X203 could be 00 which would produce the same result. When the X2 is a 0 then 01 or 03 can be either a 1 or 0 without any ambiguity. In the above example two out of eight possible cases is forbidden. However, it can be observed that two or more users can co-share certain bits in the nest group simultaneously and without ambiguity. It is possible for a multiplicity of users to co-share bits because the nest group exists as a configuration in space.

FIG. 10 shows two 5-bit characters sharing two bits, X$d$ and X$e$, in common. The first user entering the nest group determines the two prefix or suffix bits of the other. The 0$a$, 0$b$ and 0$c$ and the 0$f$, 0$g$ and 0$h$ bit can only be zeros when the X$d$ or X$e$ bit is a one, otherwise ambiguity results. Under this condition the nest section with all 0 as zeros is regarded as empty. When both X$d$ and X$e$ are zeros, there is no ambiguity. There are three forbidden cases for each character or 3 out of 32 possibilities are forbidden for each character.

FIG. 11 illustrates part of the nest group with space for many characters, indicated by the symbols 0 and X, where X represents the co-shared bits. The 4 No. is mostly important for what it leads to rather than for what it is. It illustrates the basic concept of co-shared bits. One major application for the 4 No. is in concealment codes.

The 5 No. — The 2 Dimensional Case

The 5 No. extends the concept of co-shared bits into the 2 dimensional (2-D) space. The 5 No. can be more useful than the 4 No. The basic 5 No. configuration is shown in FIG. 12. More elaborate configurations and more useful configurations can be developed from this simple figure.

The configuration of FIG. 12 can either be read two ways or four ways. In the two way method, there are two, three-bit characters with the center bit X$c$ shared in common. The two characters are 01X$c$0$r$ and 0$t$X$c$0$b$. According to the four way method, there are four characters, 01X$c$, 0$r$X$c$, 0$t$X$c$, and 0$b$X$c$. In this case we read toward the center. The result is four, 2-bit symbols.

Figure 14A:
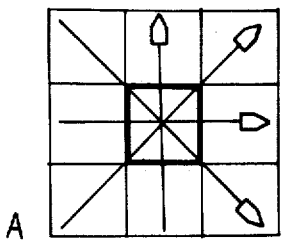
FIGS. 14A and 14B show ways of reading the nest group shown in FIG. 13.

FIG. 13 is an expansion of the basic technique of FIG. 12 and includes diagonals which were not previously employed. There are two ways of reading these nest groups, indicated in FIGS. 14A and 14B by the groups of arrows.

Figure 14B:
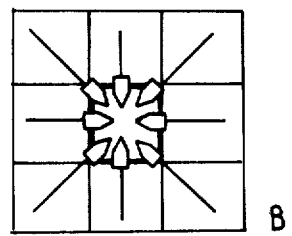
Figure 15:
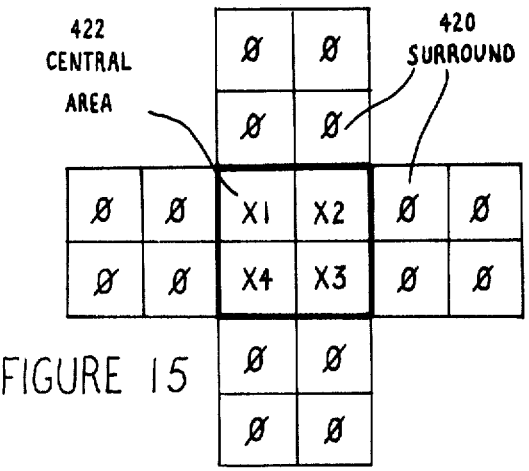
FIG. 15 shows an expanded, two dimensional nest group for the 5 No.

In the FIG. 14B, one bit terminates all eight symbols. Each of these symbols has three states with the fourth state being an ambiguous or forbidden state. With this nest group we can have 3×8=24 states while using 9 bits, where 8 states can occur simultaneously. FIG. 15 developes the concept further wherein the nest groups can be read in eight ways as shown by the arrows in FIG. 16. This configuration permits eight, four-bit characters. The bits X1, X2, X3 and X4 in FIG. 15 comprise the central area. These bits are read from four directions shown by the arrows in FIG. 16. If the bits are selected to form a central area with the two vertical bits X1X4 being ones and the bits X2, X3 being zeros, or vice versa, or the two horizontal bits X1, X2 being the same state and the bits X3X4 being the other state, then all possible combinations of two bits are available and any four bit word can be entered into such a 5 No. nest group. It is noted that for the 5 No. configurations of FIGS. 15 and 16, the bits indicated by 0 occupy the surround area 420 while the X bits occupy the central area 422. If both surround bits in a given four bit word are zero, then no data is being transmitted or stored for that word. As shown by the arrows in FIG. 16, the first two bits of each 4 bit word are the surround bits. It should be understood that the central area or surround area of FIGS. 15 and 16 can be increased in bit size to accommodate longer words.

Figure 16:
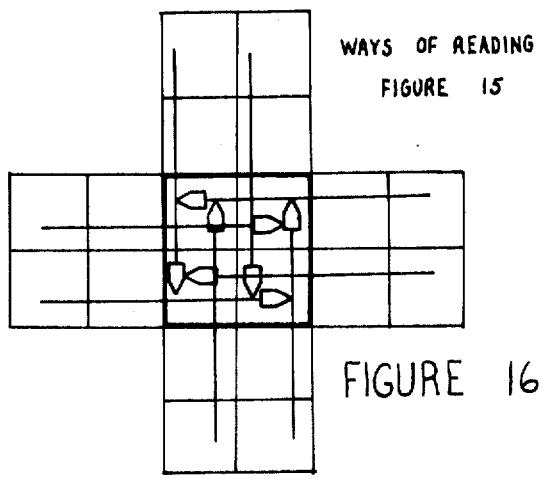
FIG. 16 shows some ways of reading the nest group of FIG. 15.
Figure 18:
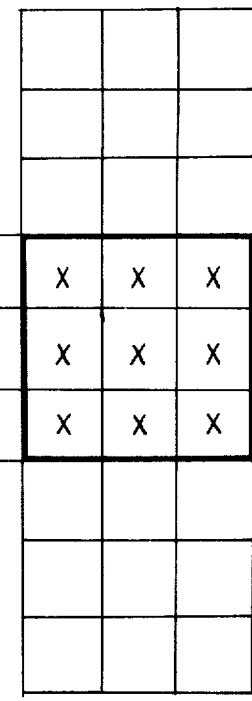
FIG. 18 is a further expansion of the basic 5 No. configuration.

The nest group of FIGS. 15 and 16 can store eight, 4 bit words and contains 20 bits. Since eight, 4 bit symbols normally require 32 bits to store this information, the described 5 No. technique permits storage in 20/32 or 5/8 of this space. The nest group can be enlarged as shown in FIG. 18 which provides a 3×3 bit central area and room for 12 entries. The entries are shown for six, 6 bit symbols and six, 5 bit symbols.

FIG. 17 is similar to FIG. 15, the main difference being that the corners of the nest group are now used. The result is the diagonals can be used. The # symbols are the bits which can be used to form another diagonal and or used as an inverting sign, i.e. to invert all the bits of the set of symbols with which they are associated. The # symbols can also be used with any row, column or diagonal in some understood manner. Also, the # symbols can indicate that a row, column or diagonal is associated also with a template index when mixed 2 Nos. are stored in a common 5 No. nest group.

The central area of the 5 No. can have either transmitted values or empty central areas. The central area can have either code bits entered therein or be empty with the information about the central area bit configuration being conveyed by a template index (T.I.) code in the determinator section of the matrix. The information relating to the central areas, when these are empty, must be available from a storage source to regenerate the symbols and to initially create the 5 No. data.

FIG. 19 shows a method of assigning values to the surround area 432. Two sets of bits in each corner are shown as having central area values which are not in the central area 430. In this configuration, 28 values can be assigned to the surround area 432 as indicated by the numerals 1 through 28 with suffixes A, B, and C associated with each set of 3 bits. For example, nests 1A, 1B and 1C constitute one word, nests 2A, 2B and 2C constitute another word, and so on through nests 28A, 28B and 28C. The surround 432 is the area around the central area 430 wherein data is entered. The three nested bits of each word are entries into the 5 No. nest group. These entries can be words, symbols or parts of symbols, as required and can be of any required length. An example of a word which is associated with an in line value of the central area is the 2½ No. A 2 No. is assigned to each set of three nest bits shown. This assignment is made by the template index code in sections 42A, B, 62A, B, C, D, E of determinator 10 of the matrix so that a user of the matrix knows which nest bits in the surround area are for his use. Thus, having made the assignment in the determinator, the user need not transmit or store any data bits in the central area 430 since the user assignment of the surround area nest bits is derived from the template index code. Also, the numbers 1-28 representing the 28 nest groups can convey any desired data, such as NAMCO characters or standard code characters. Thus, according to this example, the central area 430 need not be physically used for transmission or storage of 5 No. data, but could be employed to store other data. It is noted that according to another embodiment of the FIG. 19 nest group, the reverse functions can be used wherein the template index code in the determinator 10 can make any type of assignment of the nest bits in the surround, and the 2 No. or other data can be inserted therein.

The 6 No. — 3 Dimensions

The 2 dimensional 5 No. has height and width. The 3 dimensional 6 No. has height, width and depth. It is a cube of data, or a cubic array. The cubic array contains a cubic central area embedded in a cubic surround. A cube has six faces and each face can have an assignd meaning. This statement which is true for the surround is also true for the central area. Such a nest group has 13 unique assigned meanings, one of which the nest group provides by its own assigned meaning. The 3 dimensional 6 No. has a central area which has a face of HxW or $N^2$ bits where N is the number of bits on a cube surface. Its depth is the same. From any face it has W rows and H columns. Since there are six faces and each face is D columns deep, each face can make D 5 Nos. such as shown in FIG. 19. In total, there are 6xD 5 Nos. in one 6 No. The concept of going from one, to two, to three dimensions ca be similarly extended to four and five dimensional figures.

The 7 No. — Partial Codes

A partial code is the combination of a code and an intercipher, i.e. the combination of a 2 No. with a code such as Baudot or ASCII. Certain bits in a character or symbol are assigned the 2 No. function and the others are assigned the code function. For illustrative purposes there is assumed a six bit word or symbol where the first three bits are the 2 No. section and the last three bits are the code section. The three code bits can assume any one of eight states. A set of eight nests are used with each nest being assigned a code meaning, one for each possible code. In order to store data, a nest or nest group with an assigned code meaning the same as the code section of the word is entered. The 2 No. section of the word is entered into the nest. The NAMCO character for the nest conveys this data. In the transmission matrix, one can repeat this process by eight code meanings to every set of eight sucessive slots. In the slot which has the same code assignment as the code section of the word to be entered, there is entered the 2 No. section of the word.

The One Bit Characters

In a nest which has an assigned meaning which is the user's identity, one bit is all that is needed to make an indication of entry. A nest group can consist of one bit size areas where the location of each bit is assigned to each 2 No. user. That is, each bit, because of its physical location in the nest group is known to be associated with a particular 2 No. user. In a 5 No., the particular 2 No. user can be stated in the central area. If the bit is a zero, it indicates there has been no entry. If the bit is a one, then that 2 No. user has made an entry into that nest group. Each nest group may have an assigned meaning selected by the NAMCO. The user's assigned location in nest group can be selected by the nest code, T.I. or other part of the specific data section 32. The locations can be selected by assigning to each 2 No. a fixed location. In a 5 No., the central area size and value assignment is selected by the template index. The nest groups normally allow three variables. If more than three variables are needed, as is often the case, then a 6 No. may be used.

Sorting and Related Techniques

Figure 20:
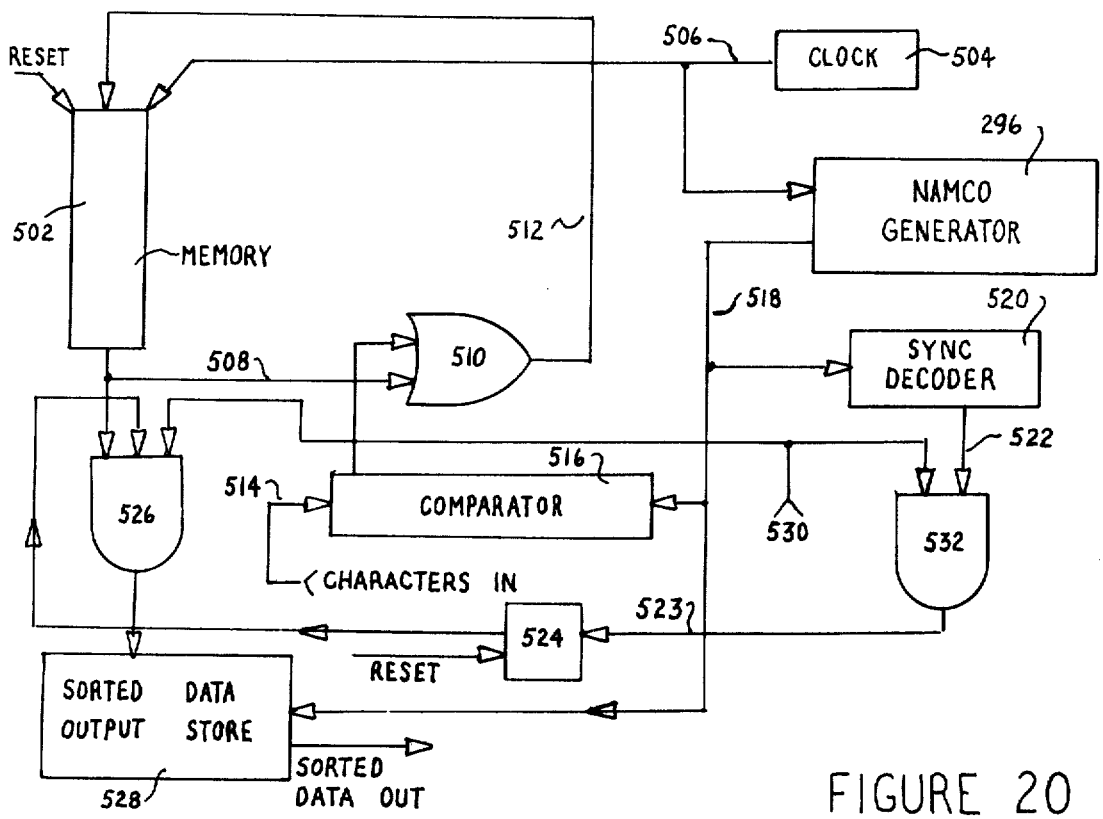
FIG. 20 is a block diagram of a circuit for sorting data.

The above described matrix can be advantageuously employed to convey data to a sorting location in a computer system. Referring to FIG. 20, there is shown a sorting site used either on a communications line or in the processing loop of a data processing system to be described. The basic sorting technique to be described uses a one bit wide, circulating memory 502. Each bit in memory 502 represents a character. The total number of characters that can be stored in memory 502 is equal to te size of the NAMCO set in the NAMCO generator 296, plus one additional memory storage position for the sync used in the NAMCO generator 296. A clock 504 provides timing on line 506 for advancing both the one bit memory 502 and the NAMCO generator 296 in synchronism. The output of memory 502 is fed back to its input via output line 508, an OR gate 510 and input memory line 512. The characters to be sorted are fed into the sorting system on line 514 to comparator 516 which also receives the output of the NAMCO generator 296 on line 518. The characters on line 514 can be derived from the array a matrix or otherwise obtained by the user. Line 518 is also connected to a sync decoder 520 which provides a sync pulse on line 522 to lock a flip flop 524 into a state which enables an AND gate 526 to enter characters from NAMCO generator 196, in correspondence with the bits from the output memory line 508, into a sorted data output store 528. Flip flop 524 can only be set when a control level on line 530 enables gate 526 and also enables an AND gate 532 to permit the sync pulse on line 522 to pass thru, and on to line 523 to set the flip flop 524. The control signal on line 530 occurs only after all of the characters have been sorted.

In operation, the memory 502 is advanced by one bit each time that the NAMCO generator 296 puts out a character. During the time each character to be sorted is presented on line 514, the NAMCO generator 296 produces a complete set of characters plus a sync which are compared in comparator 516 with the input character on line 514. Initially, before the comparison operation begins for any character, the memory 502 is reset to all zeros and the flip flop 524 is also reset. When a match occurs, the comparator 516 changes the bit in memory line 508 to a one by signaling the OR gate 510, thereby entering a one on line 512 into the top of memory 502. For each character presented on line 514, a complete circulation of the memory 502 and the NAMCO set occurs. When the total number of nonredundant characters have been sorted in this manner, the one bit memory 502 will contain a plurality of ones and zeros with the ones arranged in corresponding positions with the matched characters of the NAMCO set in generator 296. At this time, when it is desired to extract the sorted data, a control signal is provided on line 530 to both the AND gate 526 and the gate 532 which enables such gate 532 to cause flip flop 524 to set. AND gate 526 becomes enabled to enter those NAMCO characters corresponding with the one bit positions in 502, into the sorted data output store 528. The sorted data output store 528 is loaded in a burst, and its contents are removed at some desired rate by conventional methods. In this fashion, the random characters fed into the sorting system on line 514 are sorted in correspondence with the NAMCO set supplied.

The sequential order of the NAMCO set determines the "sorting sequence" of the output characters or symbols. In this system, it is therefore necessary to supply NAMCO sets in with symbols in the order in which the final sorting is to be ordered.

Figure 21:
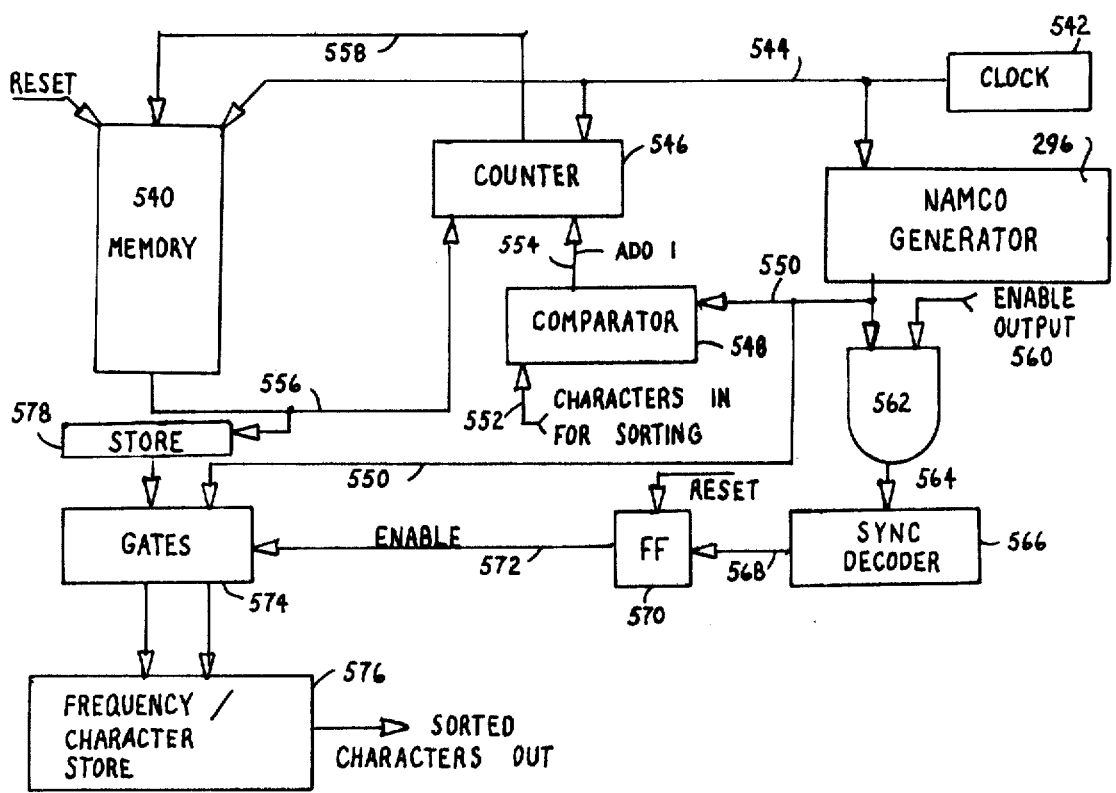
FIG. 21 is a block diagram of a circuit for sorting data and counting frequency of occurrence.

Referring to FIG. 21, there is shown a sorting site similar to the site in FIG. 20, usedfor both sorting and obtaining the frequency of occurrence of input characters. A circulating memory 540 stores the character counts and comprises a bit width sufficient to count the maximum desired number of occurrences or frequency of each character entered into the sorting site. Each position in memory 540 represents a NAMCO character and its occurrence by virtue of the fact that each character in the NAMCO set selected from the NAMCO generator 296 is advanced by a clock 542 simultaneously with the advancement of memory 540 via line 544. The total number of positions in memory 540 is equal to the size of the selected NAMCO set plus the sync character in the NAMCO generator 296 minus the character stored in a counter 546. Thus, the memory 540 and the NAMCO generator 296 are phase locked. The counter 546 is driven by clock 542. A comparator 548 is connected on line 550 to the output of NAMCO generator 296 and compares the NAMCO set with the input character presented on line 552 for sorting and/or determination of frequency of occurrence. The output line 556 of memory 540 is connected to counter 546, the output of which is returned via line 558 to the input of memory 540. Prior to the presentation of characters for sorting, the memory 540 is reset to all zero condition. When a character is presented for sorting on line 552, the NAMCO set occurs exactly once perinput character presentations as in the site shown in FIG. 20. As each character in the NAMCO set is being presented to the comparator 548, its corresponding position in memory is stored in the counter 546. When a match occurs, the number stored in counter 546 is increased by one count via a pulse on line 554 from comparator 548. In this fashion, as the characters are presented on line 552, their number or frequency of occurrence is counted for each character in the counter 546 and each number is stored in its correct position in memory 540. In addition, the input characters are sorted in accordance with the desired order as determined by the selected NAMCO set.

When th total number of characters has been presented on line 552, the results stored in memory 540 can be obtained by providing an enable output on line 560 to AND gate 562. When the sync signal appears on line 550 from NAMCO generator 296 at the input to gate 562, a sync decoder 566 detects the sync on line 564 and puts out a pulse on line 568 to set a flip flop 570 which was previously in reset. Flip flop 570 then provides an enable signal on line 572 for gates 574. When enabled, gates 574 pass all of the contents of the memory 540 into a frequency-character store 576 after being stored for one NAMCO character time in a store 578. Store 578 brings the input to the gates 574 into synchronism with the NAMCO character arriving on line 550 into the gates 574. The frequency character store 576 in a memory which stores the frequency or number of occurrences of each character, provided by memory 540, together with the actual character provided by the NAMCO generator 296. The frequency character store 576 is loaded in a burst, and its contents are taken out at some desired rate by methods known to the art.

Referring again to FIGS. 20 and 21, it is to be pointed out that while sorting sites have been shown and described for sorting and/or determining the frequency or number of occurrences for a single set of input characters at a given time, two or more sets of input characters can be operated on in a similar manner using one or more sets of NAMCO characters. This would by accomplished by using two or more circulating memories, two or more comparators which control two or more counters feeding into the memories. Thus, it should be apparent that the sorting sites can provide correlated and other multi-valued outputs for a multiplicity of processes. These results are achieved without the use of complex arithmetic and logic devices. The sorting sites and their operation employ the techniques and systems described above for the transmission and storage of data.

The Simultaneous Multi-Processing Computer

Figure 22A:
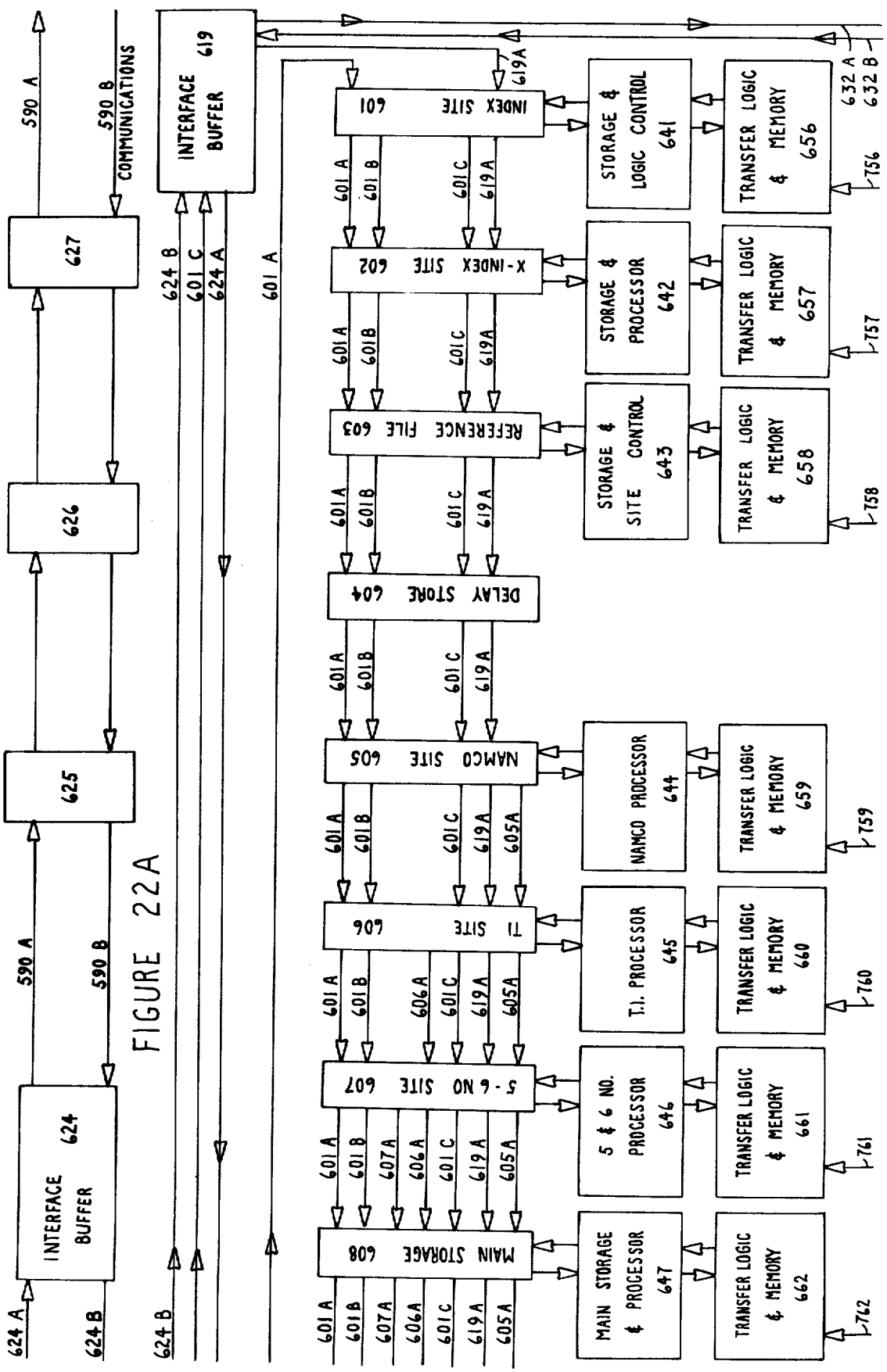
FIGS. 22A, B, C and D show a block diagram of a communication and computer system.

FIGS. 22A, B, C and D shows a system block diagram of a communications and computer system in accordance with the present invention. FIG. 23 shows the interrelationships between FIGS. 22A, B, C and D. The general communications network includes communications sites 625, 626 and 627 connected via lines 590A and 590B to an interface buffer 624, and communications sites 633 through 640 connected via lines 590C and 590D to an inerface buffer 632. Interface buffers 624 and 632 comprise essentially a switching and timing mechanism for receiving incoming binary data at a first bit rate, and sending such data out at a different bit rate. Buffers are provided in the interface buffers 624 and 632 for storing the incoming data for the correct duration until the appropriate release time. The interface buffers 624 and 632 include logic and timing circuits for passing incoming data from selected matrices onto certain output lines while data from other incoming lines are directed onto other lines. For example, interface buffer 624 receives communications matrices on communications line 590B, and receives both communication data in certain matrices and computer data in other matrices on incoming communications line 624A. The interface buffer 624 has logic and switching circuits which detect the route codes in the route section 20 of each matrix and switches the incoming matrix onto either of outgoing lines 624B and 590A. The computer matrices that arrive on line 624A are turned around by interface buffer 624 and returned on line 624B to the computer sites. However, those matrices having communication, as opposed to computer, data on line 624A are slowed down to a lower bit rate before being transmitted on communications line 590A. The communications lines 590A and B may contain data at a bit rate of one half the bit rate in lines 624A and B where lines 624A and B carry twice as much data. This might occur when lines 624A and B have alternate computer and communications matrices while lines 590A and B have only communications matrices. The buffer timing is controlled by two clocks, both of which are derived from the general communications data stream. One clock operates at the general communications rate while the other clock operates at the computer rate.

It is pointed out that the interface buffers 624 and 632 are disclosed merely to set up a theoretical boundary for the computer shown in FIGS. 22A, B, D and D. However, the computer is unlimited in the geographical area and locations it may occupy. Also, such buffers 624 and 632 are not necessary to the system, but are included to facilitate the understanding of the system. Interface buffer 632 is the same as interface 624 and receives and sends out communications matrices on lines 590D and 590C, and receives and sends out both communications and computer matrices on lines 632A and 632B. The computer matrices that are received on line 632A are returned on line 632B to the computer/communications sites.

A plurality of computer/communications sites 620, 621, 622 and 623 are connected to lines 624A and 624B, and computer/communications sites 628, 629, 630 and 631 are connected to lines 632A and 632B. It is to be pointed out that while only a few computer/communications sites are shown, any number of either or both computer or communications sites can be actually employed. Each of the sites essentially comprise the circuits shown and described with reference to FIGS. 3, 5 and 6 and operate generally with the matrices shown in FIGS. 1 and 2.

Interface buffers 619 feeds the computer matrices from the sites 620–623 and 628–631 into a plurality of computer sites 601 through 616 to be described in detail hereinafter.

FIG. 24 shows a functional block diagram of the interface buffer 619. Line 601C contains computer matrices from computer sites 601 through 616. Each matrice contains a route code which is detected by a route detector, timing and switching circuit 619B and sent out on either line 619C to buffers and switching circuit 619D or on line 619E to buffers and switching circuit 619F. A route detector, timing and switching circuit 619G is connected to lines 624B and 632B to receive computer and/or communications matrices on both such lines and in turn to route all incoming computer matrices onto line 619A. The communications matrices received on line 624B is routed by circuit 619G onto line 619H leading into buffers and switching circuit 619F. The communications matrices received on line 632B is routed by circuit 619G onto line 619I leading into the buffer and circuit 619D. Circuit 619D folds the communications matrices on line 619I with the computer matrices on line 619C and presents the re-timed matrices on output line 624A connected to the sites 620 through 627. Similarly, the circuit 619F folds the communications matrices on line 619E and presents the re-timed matrices on output line 632A connected to the sites 628–640. The interface buffer 619 is provided to illustrate one manner of interfacing the computer sites with the communications sites. In the embodiment described, each of the communications matrices are of equal bit length as the computer matrices.

Each of the computer sites 601–616 is comprised of essentially the same hardware as the other sites shown and described with reference to FIGS. 1 through 6. The differences will become apparent from the description to follow. For small computers, the computer sites 601–616 can employ the same hardware as the sites previously described, but medium and large scale computers are more suitably built with the site hardware to be described at sites 601–616. All matrices sent in the system generally contain NAMCO sets, template indices (T.I.), and 5 Nos. or 6 Nos. for interpreting the matrice data. As mentioned previously, the NAMCO sets can be generated at the computer/communications sites 620–623 or 628–631 by NAMCO generators. Alternately, in accordance with the embodiment of FIGS. 22A–D, all of the NAMCO sets which are used by the sites 620–623, and 628–631 are stored in a main NAMCO processor 644 which detects each NAMCO code in the matrices arriving on line 619A and provides the corresponding translation of each symbol in the nests or slots of the matrices. The main NAMCO processor 644 is connected to a main NAMCO site 605 which receives data from down line on lines 601A, 601B, 601C and 619A and provides on output line 605A the corresponding translation synchronized with the array symbols received on line 619A from all the sites 620–623, and 628–631.

The Index

The index is essentially a memory which stores the determinator section 10 of each matrix and logs the location of each matrix in its storage banks. The index hardware includes an index site 601 which comprises the site hardware shown and described with reference to FIGS. 5 and 6, such as shift registers for the reception and transmisson of data, detectors and timing for detecting all data in the determinator section 10 of each matrix, means for detecting information directed to the index site 601, and means for responding to other sites. The index also includes a storage and logic control 641 connected to index site 601 for storing all received determinator sections 10, cataloging algorithms, mini-tutors, etc., derived from the determinator sections 10, and supplying all information requested for sending by the index site 601 on line 601C. Storage and logic control 641 also reads the postscript section 14 of the matrix and responds to requests by sites to delete their own matrix data. The index also includes a transfer logic and memory 656 which receives processing information from the memories in storage and logic control 641 and transfers it to, and takes it from, a plurality of ports in the processing loops to be described.

The index site 601 is connected by lines 601A and 601B in a feedback path with the other computer sites 602–616. Feedback line 601A may include peripheral devices. When one or more computer sites 602–616, or peripherals on the loop line 601A requests information or other data from any of such sites, a request is sent out using the P No., R No. and other relevant determinator data which is received on either line 601A or 601B. Line 601B is connected to a delay unit 617 which provides the necessary delay for bringing the matrices out of the last site 616 into phase with the first site 601. The use of the two lines 601A and 601B eliminates the requirement for a closed loop since line 601A terminates at site 616. Line 601C is the transmission line for connecting all the sites 601–616 with sites 620–623 and 628–632 via interface buffer 619.

All matrices which arrive on line 619A at index site 601 have their determinator sections 10 stored in the index storage and logic control 641. When a user makes a request in the postscript section 14 for the alteration or removal of data in the determinator section 10, the storage and logic control 641 detects the request and causes a corresponding charge in the data stored in the index memory of control 641. The index site 601 has an address (P No) for receiving and sending data. All determinator data addressed to any of computer sites 601–616 is read off of line 619A, without deleting it, and stored in the storage and logic control 641. Any data relating to the requesting user which is in storage may be obtained on demand. Additional data required in the determinator section 10 for the purposes of the index includes a set of statements in sections 58A, 58B, 60A, etc., relating to the type and characteristics of tutorials, raw data, etc. Thus the index compiles catalogs of mini-tutorials, algorithms, NAMCO code numbers, and related information found in the determinator section 10. The index can serve as a permanent file of selected kinds of information which can be corrected and added to as desired.

Figure 25:
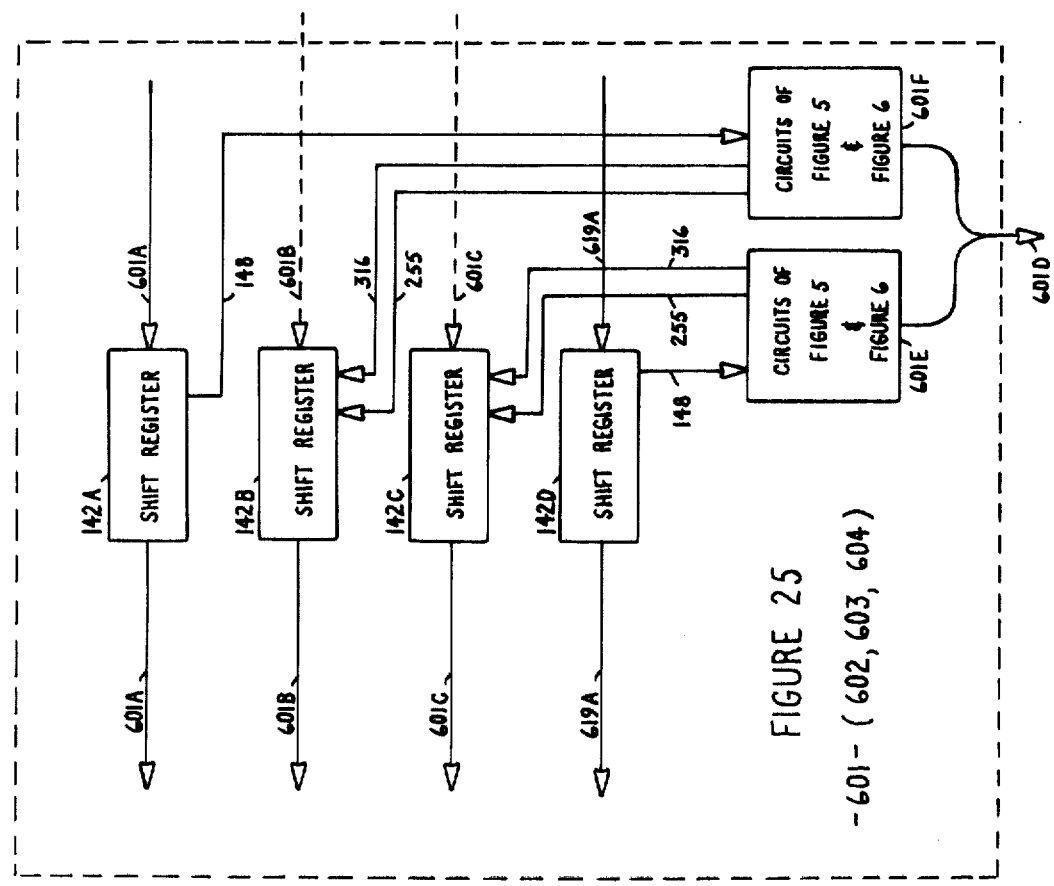
FIG. 25 shows a block diagram of site 601.

Referring to FIG. 25, there is shown a more detailed diagram of the index site 601. As previously mentioned, the index site 601 includes the circuits of both FIGS. 5 and 6, such circuits being indicated by the two blocks 601E and 601F labelled "Circuits of FIGS. 5 and 6" to show that two pairs of these circuits are provided at the index site 601. The line shift registers 142 shown in FIGS. 5 and 6 are shown in FIG. 25 as being comprised of parts 142A, 142B, 142C and 142D which are connected as shown to the lines 148, 255 and 316 described in FIGS. 5 and 6, and also shown therein. Path line 601A is a continuous transmission line which is interrupted by shift register 142A. Line 619A from the interface buffers 619 is a continuous transmission line through the shift register 142D. Data can be entered for transmission into the matrices at the index site 601 via the lines 316 and 255 into shift registers 142B and 142C. The shift registers 142B and 142C don not include transmission line inputs since such shift registers only initiate data at the site 601. Shift register 142A passes data which could have originated at any of sites 601–616, as well as providing data to the site 601 via line 148. Shift register 142D enables reception of data from line 619A. The circuits of FIGS. 5 and 6 in the index site 601 provides several output lines or connections, indicated in FIG. 25 by numeral 601D, to the storage and logic control 641. Lines 601D comprise lines 152A, 152B, 152C, 152D, 148, 154A–180A, 252, 257, 262, 267, 290 and 298, from the FIGS. 5 and 6, which are connected to the storage and logic control 641 shown in detail in FIG. 26.

Referring to FIG. 26, there is shown a block diagram of the storage and logic control 641. All determinator and postscript data arrives from index site 601 over lines 154B to 180B to a memory entry unit 641C containing scanning, gating and writing circuits for entering such data into an index storage 641D. Lines 641E connect the index storage 641D with entry unit 641C.

It is to be understood that labelling of lines which interconnect the various units will not be used in many instances where the description of the function and operation of the components of the system render the labelling as apparent and obvious. Also, where a single line is shown, it may be representative of a plurality of lines, and the use of a bi-directional input line represents lines which permit signal flow in both directions. These conventions are to be understood to apply to all Figures of the subject specification. A postscript decoder 641F receives timing on line 152D, NAMCO data on line 262 and the received information on line 148 and supplies, to a delete unit 641G, information for deleting selected data from the index storage 641D as well as supplying information to the entry unit 641C for entering data into the index storage 641D. The delete unit 641G also receives tutors ( instructions ) from an array decoder 641H concerning the deletions which are not directly available from the postscript section 14.

Data requests for determinator and postscript information stored in index storage 641D will arrive at index site 601 by addressing such site by inserting its P No. in section 34A, B, of the matrix. This automatically provides a 2 No. for the user which is used in the array for communicating the specific data request. The P No., R No. and other determinator data is received from site 601 on lines 148 into a specific data re-arranger 641I, which also receives the 2 No. on line 252 as well as timing and other determinator data on lines 152A and B and 154B–180B. The specific data re-arranger 641I re-arranges the received determinator data from each site in such a manner that it becomes the determinator data for the outgoing matrices as a reply from the storage and logic control 641 to the respective requesting users. The specific data re-arranger 641I supplies to the array decoder 641H the identity of each user or site requesting information residing in the index storage 641D. The array decoder 641H receives, simultaneously with the identity information from the specific data re-arranger 641I, the actual data request on line 267 derived in site 601 by the receiving data memory 266. Array decoder 641H also receives array timing on line 152C. Array decoder 641H decodes the information request into a suitable form for withdrawing information from the information storage 641D via a scan unit 641J scans the index storage 641D for the information required by array decoder 641H and, upon locating the required data, enables a temporary store 641K to receive information on line 641L from the index storage 641D. The requested information in the temporary store 641K is sent via a gate 641M and a send unit 641N for sending as data on line 290 to the site 601. The array data on line 290 is preceded in the matrix by the determinator data derived by the specific data re-arranger 641I and sent to the send unit 641N for outputting on line 257.

Storage and logic control 641 also includes a mini-tutor decoder 641O which is connected to receive the input data line 148 and the specific data counter output line 152B. Decoder 641O extracts the selected items which appear in matrix sections 56A, 58A, 60, etc., such as mini-tutors and algorithms. These items are sent on line 641P to the transfer logic and memory 656 where it will be sent to an index/reference loop, to be described, for processing into a tutor catalog which will subsequently be returned to the storage and logic control 641 for entry by an entry unit 641Q into the index storage 641D. Thus, the mini-tutor decoder 641O derives the basic tutor and algorithm information which is processed by the index/reference loop for forming catalogs, algorithms, mini-tutors, etc., of the data in the index storage 641D.

Referring again to FIG. 26, as mentioned previously, the index site 601 includes a pair of combined circuits of FIGS. 5 and 6, indicated in FIG. 25 by numerals 601E and 601F. The several lines represented by numeral 601D in FIG. 25 from circuit 601E are connected to the circuit shown in the dotted line block 641B shown in FIG. 26. Similarly, the circuit 601F in FIG. 25 has its lines 601D connected to a second circuit 601R comprising all the elements included under block 641D. In the same manner, a circuit block 601S includes all of the circuit elements shown in the dotted line block 641B, except that the input and output lines 641T, generally identified in circuit 641B by numeral 601D, connect with the transfer logic and memory 656 and the ports in the index/reference loop as will be described in connection with FIG. 27.

Index storage 641D connects with circuit 641R, circuit 641S, a delete unit 641GG, an entry unit 641Q, a scan unit 641JJ and a temporary store 641CC. Delete unit 641GG contains the same hardware as delete unit 641G, and scan unit 641JJ and temporary store 641CC contain the same hardware as their respective scan unit 641J and temporary store 641K and operate in the same manner.

As mentioned above, the index storage 641D maintains a catalog of mini-tutors, algorithms, etc. Sorting, collating and correlating take place on the index/reference file loop 730 shown in FIG. 22C. Storage and logic control 641 shown in FIG. 26 includes the memory entry unit 641Q which receives data on line 641U from the loop 730 via transfer logic and memory 656 for the entry of catalog data held in the index storage 641D. A postscript decoder in transfer logic and memory 656 provides delete instructions on line 641V to delete unit 641GG. The catalog scan unit 641JJ and temporary store 641CC operate as explained previously, with the scan unit 641JJ receiving scan instructions from either the site 601 via array decoder 641H or from steering circuits on line 641W from the transfer logic and memory 656. These scan instructions are fed into a switch 641X to operate the scan unit 641JJ. A store (not shown) is included in the switch 641X to hold the data if both port and site should request service simultaneously. Another switch 641XX is also controlled by the port via steering line for removing the data from the temporary store 641CC and switching it onto either line 641Y to the ports via the transfer logic and memory 656 or onto line 641Z to the site 601 via the gate 641M. Lines 641U, V, W and Y are shown as one line in FIG. 22C and respectively are associated with ports 703 and 671.

Referring to FIG. 27, there is shown a block diagram of the relationships between the transfer logic and memory 656 and the processor, referred to as the storage and logic control 641, and the ports. The transfer logic and memory 656 transfers tutor information between the processor 641 and the port, such as for steering or scanning data on line 641W in the index storage 641D shown in FIG. 26, or for deleting data on line 641V from the index storage 641D. Circuit 656 also receives tutor data from the processor 641, such as for indicating the completion of a request. The transfer logic and memory 656 also presents data from the port for processing by processor 641, such as data for entry via line 641U into the index storage 641D. Processed data from processor 641 is transferred by the transfer logic and memory 656 to the port via lines 641P and 641Y in processor 641. The transfer logic and memory 656 comprises the state of the art storage and data transfer circuits for transferring and holding data from one location to another and, therefore, will not be described in further detail. The transfer logic and memory 656 is essentially identical in both operation and hardware as the other transfer logic and memory units 657-670 shown in FIGS. 22A-D. Also, each of the processors, shown as storage and logic control units 641-655 operate as processors for their associated sites 601-616 and ports.

The Processing Loops

Referring again to FIGS. 22A, B, C and D, the index, crossindex and reference file are connected to processing loops via their respective transfer logic and memory circuits 656, 657 and 658. Specifically, lines 756, 757 and 758 connect the transfer logic and memory circuits 656, 657 and 658 to respective ports 671 672 and 673 connected in series on communications line 730 in an index/reference loop. Ports 671, 672 and 673 are entry ports to enable data to be entered or removed from the loop and sent to its associated transfer logic and memory circuit 658, 657 and 656. Each port 671, 672 and 673 comprises essentially the same hardware shown and described with respect to FIGS. 3 through 6, with the exception that there is a uni-direction flow of data through the port accomplished by two line shift registers which are serially entered from the transmission line through input gates and the data is serially shifted onto the transmission line through output gates. The ports operate off the index reference loop 730 with a matrix, herein referred to as a "procession". Processions are clocked at relatively high rates compared with the communications network. The ports employ a shift register to hold a procession for processing while another shift register permits other processions to pass through. A port is busy when one procession is stationary and being processed. Data ( processions ) to be processed can be held in the circulating storage until the processor at the port is ready to accept them.

Figure 22C:
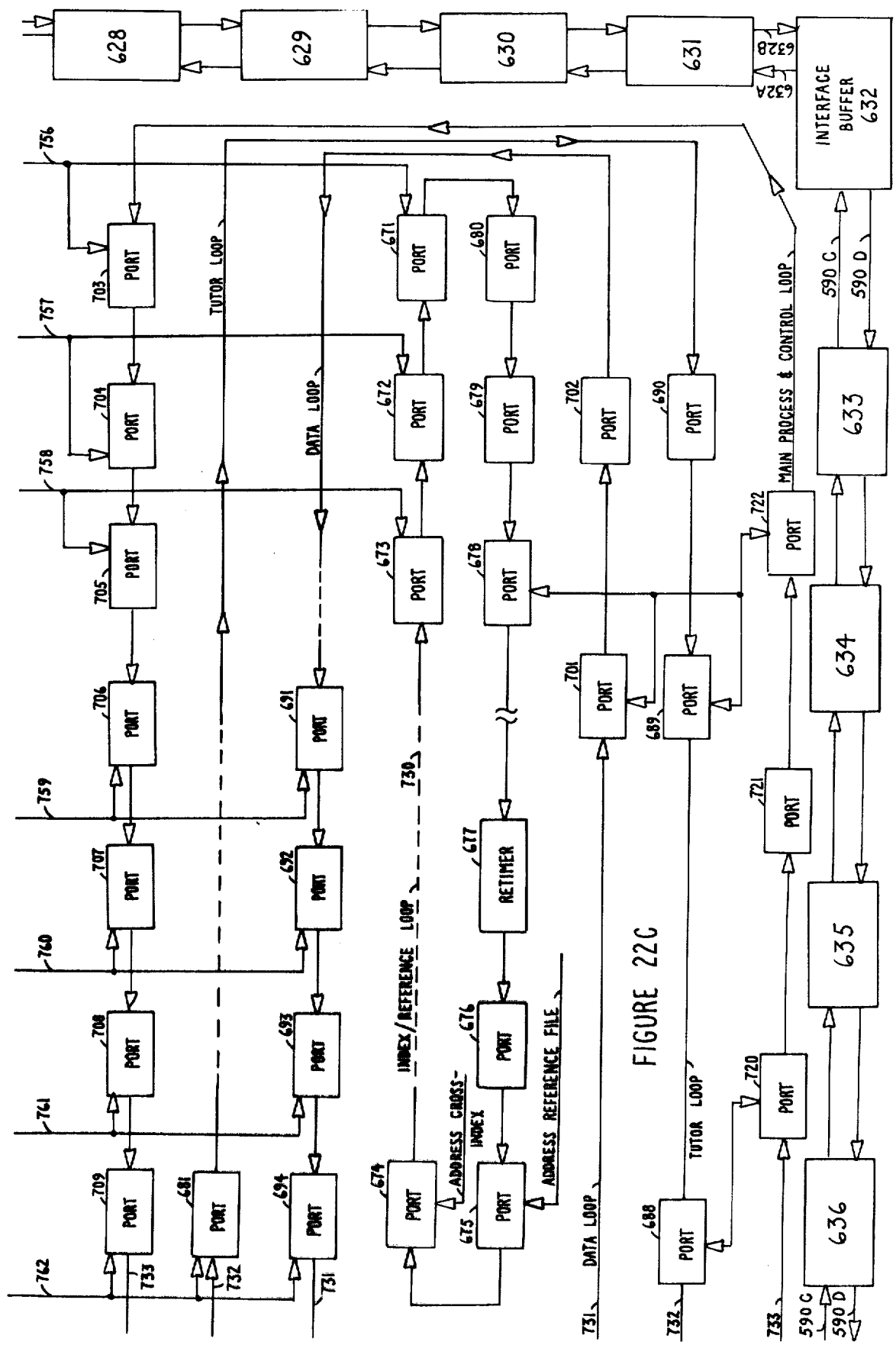

Referring to FIG. 28, there is shown a general functional block diagram of the operations associated with each port shown in FIGS. 22C and D. At each port location there is a port having shift registers and gates for storing a procession received from the processing loop and for closing the loop when a procession is received. Also included at each port location is a transfer logic and memory circuit for transferring and holding data between the port and the associated port processor. Again, the transfer logic and memory circuit is essentially the same as the transfer logic and memory circuits 656-670 shown in FIGS. 22A and B and comprises state of the art storage and transfer circuits. Also, at each port location there is included a port processor which performs any function which may be required of any type of computer, such as mathematical functions, sorting, hybrid analogue-digital functions, logic and memory.

Figure 29:
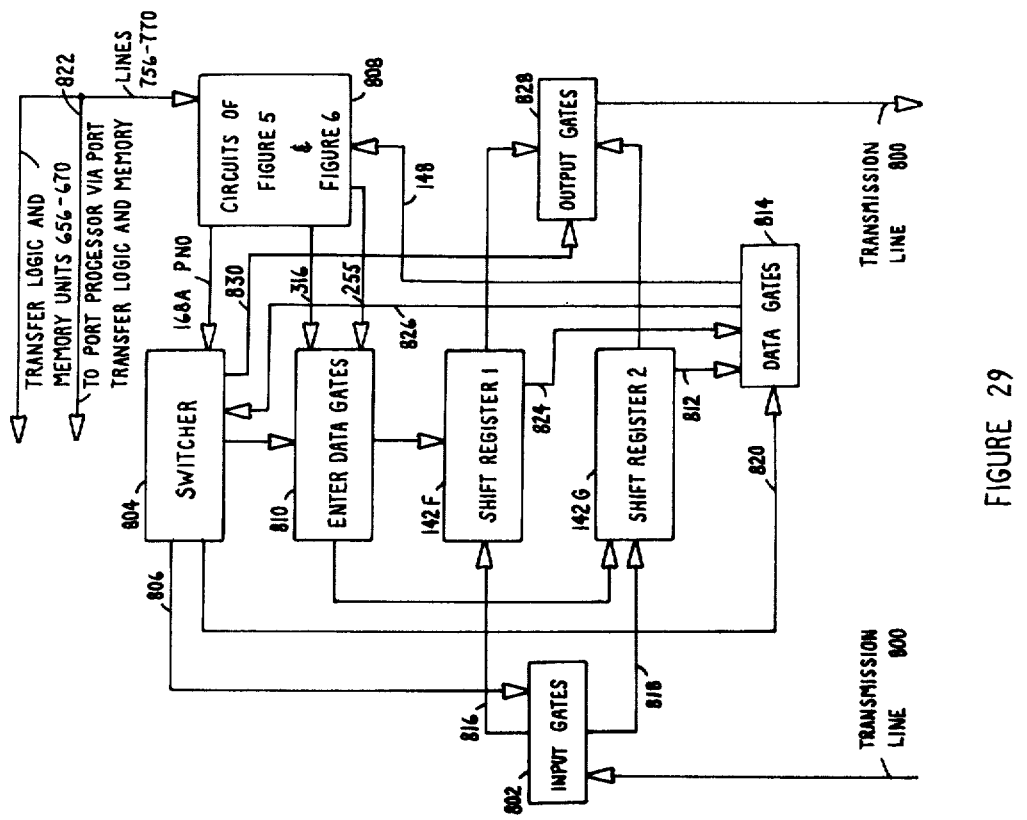
FIG. 29 shows a block diagram of a typical port.

Referring to FIG. 29, there is shown a block diagram of a typical port. The port hardware is generally the same as the hardware at each site 601-616 shown and described with reference to FIG. 25 with the differences to be described below. The procession arrives at the port on loop transmission line 800 at the input gates 802 which are controlled by a switcher 804 via line 806 which steers the procession to either a shift register 142F or G. Shift registers 142F and G are essentially the same as line shift registers 142 shown in FIGS. 5 and 6 and the shift registers 142A-D shown in FIG. 25. If the P No. of the port is received in the procession, a signal appears on line 168A out of the circuits of FIGS. 5 and 6, indicated by block 808. Block 808 comprises the circuits of FIGS. 5 and 6 and provides the same input and output lines described and indicated by numerals 148, 168A, 255, 316, and all the other circuits and lines previously described. Line 168A is connected from block 808 to the switcher 804. Determinator data line 255 and data line 316 are outputted from block 808 to enter data gates 810. Data received in shift register 142G is received by read data gates 814 and passed on incoming data line 148 to the block 808. The switcher 804 synchronously opens the input gates 802 via line 806 which steers the procession from line 800 into either shift register 142F or 142G via line 816 or 818, respectively. When the switcher 804 steers the procession through the shift register 142G, it simultaneously opens the read data gates 814 via a signal on line 820 so that the read data is received on incoming data line 148 by the circuit block 808. The circuit block 808 takes the data received on line 148, decodes it and passes it on line 822 on to the port processor via the transfer logic and memory, as shown in FIG. 28. The read data gates 814 are also connected via line 824 to the shift register 142F. The read data gates 814 receive data from both shift registers 142F and 142G and provides on line 826 the data contents of both shift registers. In turn, the switcher 804 enables data to be read out of one shift register 142F or G by an enable signal on line 820 while such switcher 804 provides a signal on line 806 to enable the input gates 802 to pass the data from line 800 into the other shift register 142F or G. After new or processed data is returned to the port over lines 822, it is then sent by the block 808 over lines 255 and 316 to the enter data gates 810 where it is transferred to the shift register 142F or G for transmission when the switcher 804 opens output gates 828 via line 830. Data is entered from gates 810 into one shift register when an empty procession is in the other shift register or when a procession with information for processing is in the other shift register. The switcher 804 operates from input P No. signals received on line 168A from theprocession or from the shift register data received on line 826 from the read data gates 814.

The Procession Used in the Processing Loops

The procession is the term referred to herein as the matrix used in the processing loops 730, 731, 732 and 733. The procession is almost identical with the matrix used in the computer/communications network described above, with the differences between the procession and the matrix to be described below.

Referring to FIG. 1, the matrix sections 62A–64E are not used in the procession since the Q No. is not employed in the processing loops. Additional sections in the specific data section 32 and identical with sections 34A–46A and 56A–60A, with the exception of sections 46A, 46B and 46C, can be employed to carry additional tutor data instead of Q No. data.

In FIG. 30, a typical specific data section 32 of a procession is shown. It is to be noted that in the sections 34A–C and 36A–C which in the FIG. 1 matrix hold the prime number ( P No. ) and receptor number ( R No. ), respectively, the procession uses such sections instead for the insertion of the addresses of ports on the loop, such addresses being referred to as "one numbers", 1 No.A and 1 No.B, or R No. The 1 No.A, the 1 No.B, and the R No. are used in the procession sections 34B, 36B, 34C and 36C in a manner similar to the matrix of FIGS. 1 and 2, with the change in names made to clarify the description. Sections 46A, B and C, which hold the Q No. in the FIG. 1 and 2 matrices, holds the tutors in the procession of FIG. 30. A 1 No. is a port location in the processing loops 730–733 and acts in the same manner as does the P No. and R No. in the communications network 624A, 624B, 590A, 590B, 619A, 601A, 601B, 601C, 605A, 606A, 607A, 632A, 632B, 590C and 590D. The 1 No.A is equivalent to a P No. and the 1 No.B is equivalent to an R No. Where the 1 No.A and 1 No.B are substituted for the P No., this is done in name only since the basic functions are identical. Consequently, the P No. detector 168 shown in FIG. 5 is used by the ports for detecting the 1 No.A, and the R No. detector 170 is used for detecting the 1 No.B. Detectors 168 and 170 are used to detect the ports in the processing loops in the same manner that they are used to detect the sites in the computer/communications network. Similarly, the Q No. detector 178 shown in FIG. 5 is used by the ports in the processing loops to detect special tutors. Thus, the hardware employed at the ports includes, as shown by the block 808 in FIG. 29, the same hardware as shown in FIGS. 5 and 6.

Typically, processions are initiated at the ports 703–717, 681–685, 691–698 and 671–673 which operate with sites 601–616, although this is not a rule since processions may be initiated at any port. When a procession is initiated at a port, it may contain data which is being processed for computer/communications sites 620–623 or 628–631. Such processions have an R No. in section 36C for returning data back to sites on the computer/communications network. Processions which do not have data for the computer/communications sites, such as control, monitoring, and operational assisting processions, either have a 1 No. or nothing in section 36C. This 1 No. is the prime number of the ultimate user or port on the processing loops. The ports associated with sites 601–616 processions which carry data for processing by the ports in the loop and whose ultimate user is given by the R No. in section 36C. Such processions are loaded with determinator 10, array 12 and postscript 14 data at the initiating site. The 1 No. is the locations of specific processes and the array carries data for the processor to operate upon or with.

Thus, the 1 Nos., by virtue of the processing function of the ports to which they are directed, are the operations to be performed, and the 2 Nos. provides the data upon which the operations are to be performed. In other words, generally, the 1 Nos. act as tutors and the 2 Nos. act as data. The 2 No./1 No. relationship is that of data/tutors ( D/T ).

The initiating ports generally insert all the 1 No.A, 1 No.B and/or R No. in sections 34A, 34B, 34C, 36A, 36B, etc. The first processing location receives a 1 No.A in section 34A. After processing, the port deletes its own address from section 34A and the procession continues on to the site defined in section 34B. The procession continues to each port for processing in the order of the occurrence of the 1 Nos. until the procession reaches the last port. Here a 1 No.B or an R No. is in section 36C. This 1 No.B or R No. in section 36C together with some of the tutor data in the determinator 10 provides instructions as to the disposition of the processed data in the procession.

Ports enter data into processions in the same manner that sites enter data into matrices. The guide number ( G No. ) is used to assist in selecting special processing sites from among several ports performing the same function and having the same 1 No.A or address. For example, ports identified by a 1 No.A equal to seven may all be multipliers, each differing in the number of digits they can handle. The G No. selects a port employing the correct number of digits. The processing loop has units called assemblers. These devices perform the basic function of combining data procession and tutor procession into a composite data/tutor procession. Assemblers can be also used to perform converting functions, such as compiling software.

Port and Processor Loop Operation

A procession is admitted to shift registers 142F or 142G through the input gates 802 which steer the procession to a shift register under the direction of the switcher 804. Once in the shift register, the 1 No.A is read by the P No. decoder 168. If the 1 No.A is correct, the procession is held in the shift register. For purposes of this discussion, assume the procession is received in shift register 142F. Data in shift register 142G is sent out in place of the received procession. If shift register 142G is empty, then zeros will be sent out. If the arriving procession has a 1 No. which is not the address of the port, the procession is allowed to pass, without interruption and unaltered. Once the procession is recognized, by having the same 1 No. as the port, the following things occur: (1) The leading 1 No. is deleted; (2) The procession tutors are read and the instructions executed in the port processor; (3) If the tutor orders the procession deleted, it is deleted by the port transfer logic and memory, otherwise, it is left to be sent on to another port; (4) The data in the procession is not altered, unless the procession is deleted or the tutor instructs that other action be taken; (5) The arrival of the next procession with more data may be required before processing can be completed; and (6) The processed data may be entered into the array section of the procession in place of the original received data in accordance with the received tutors, or into a different location in the procession.

Each port has selected data in the procession array upon which it operates. Upon completing its operation, a port inserts the results into the array section. Tutors, associated with the 1 No. for a given port, direct the placement into the procession of the processed results so that the results can be used by other ports as a port of their material required for processing. The other ports, in turn, receive tutors which direct their activities with the data in the received procession.

Thus, the processing loop is a major structure in the system architecture and comprises a closed ring structure connecting the ports in series with a re-timer completing the ring. The ports may be of the processing type which include processors, or may be user ports as indicated in FIGS. 22A, B, C and D by numerals 703–717, 681–685, 692–696 and 671–673. These user ports are connected directly with the transfer logic and memory units 656–670 and receive data and tutor information from the sites 601–616 and units 641–655. The user ports do not include the processors and transfer logic and memory units shown in FIG. 28.

Each port has an address. The user ports have unique addresses, but the processing ports may or may not have unique addresses. Several processing ports may have a common address and thereby perform the same function, such as add, multiply, divide. Since each processor has an address, then each address of the processor ports is a function. Thus, if two words to be processed in two processions are sent to a given address, the processor will perform its function ( addition, multiplication, etc. ) upon such words. The words to be processed are the data in the procession array. The procession consists of a set of addresses in a given order plus data and tutors. The addresses are ordered in accordance with the order and function of the required operations. The tutor provides instructions regarding the use and disposition of data.

From the above, it should be apparent that the procession is sent from the user ports to the processing ports as a completely self-contained entity. It is used, sent on, deleted, and/or modified and, if returned to the source port, is usually deleted after the new data is extracted. As a consequence of the above the processions in the processing loop are being constantly created, modified and finally deleted. At any one time, there may exist more processions in the loop than there are ports. The loop, which includes the shift registers of the ports, is also a storage bank. In fact, data can be stored in the loop shift registers for subsequent use. When a desired port is busy the procession keeps circulating until the port is free to accept the procession. A number of users in the system can demand and receive simultaneous service. This number is determined in part by the matrix users, the number of matrices interlaced into the computer, and the size and configuration of the main storage. A reasonable number of user sites demanding and receiving simultaneous service may be from 100 to 1000 for a medium size machine.

Most of the math and logic processors are digital devices. Analog processors can be placed at any port if an A to D and D to A converter is available. When high digital precision is not required, analog machines can be used advantageously. The mixture of analog, associative logics, and digital machines for processing can be easily implemented in the processing loops. There is no need for these types of hardware to interact in the subject system. When a particular port and its processor have more demand for service than it can handle, that port and processor can be simply connected in the loop, without any other modification of the system other than, possibly, the adjustment of the loop re-timer. Alternately, a port can have two or more processors of the same type associated with it. A processing loop is never complete. New processors can readily be used to replace older devices, and new ports and new types of processors can be added as required.

The Cross-Index

The cross-index contains catalogs of selected determinator data in the determinator section 10, which catalogs are generated by the cross-index by sorting, correlating, collating and other techniques. Also, the cross-index reads the postscript 14 for proper maintenance of its files by noting changes and deletions. While data in the index exists in the order it was entered, i.e. the determinator of the first matrices were entered first, and the second determinator entered after the first, and so on. The cross-index brings related items together, such as catalogs of originators (P Nos.), catalogs of receptors (R Nos.), groups of data from certain segments of programs, catalogs of selected segments of data tutors to be described hereinafter, and other data grouped according to physical location and-/or software relationships.

In the determinator section 10 of each matrix, and therefore in the index, it can be observed that, from matrix to matrix, the users and their requirements vary, the Q Nos. are deleted and re-assigned to different users, the template indexes vary with the different users unpredictably, and the NAMCO numbers used by each user can vary. As a result of the above, determinator and postscript data is quite variable and, therefore the index tables formed from this data is likewise variable. This leaves much to be desired of the index since the users and their information appears in random order. Since the index is subject to additions, deletions and alterations, the cross-index is also subject to changes from these sources. The index memory in the storage and logic control 641 is basically passive. That is, data is moved only when new data is entered at a previously existing location or deleted therefrom. There is no movement of data for the purposes of processing. By contrast, in the cross-index, matters are entirely different. New entries are always taking place in the cross-index since the index is being constantly scanned by the cross-index. In turn, the cross-index is constantly being scanned by the reference file, to be described hereinafter.

The cross-index comprises a cross-index site 602 connected to receive the output lines 601A, 601B, 601C and 619A from index site 601. Cross-index site 602 comprises the identical hardware as the index site 601 shown in FIG. 25. Input lines 601B and 601C are connected from index site 601 into the inputs of shift registers 142B and 142C, respectively. The cross-index site 602 as well as the computer sites 601 and 603–616 comprises the hardware shown and described with reference to FIGS. 5 and 6, including means for detecting information and requests directed to the cross-index site 602 and means for responding to the other sites. The cross-index also includes a storage and processor 642 connected to the cross-index site 602 for sorting, collating, correlating and cataloging the determinator and postscript data, and filing such data in the correct locations in the cross-index memory in the storage and processor 642. Storage and processor 642 provides the logic for retrieving data by first locating the matrix or matrices in which it exists, examining the matrices for the specific information, and supplying the information to the requesting source. The cross-index also includes the transfer logic and memory 657 which receives information from the storage and processor 642 and transfers it to, and receives information from, the communications/computer sites and the ports in the processing loops.

Figure 31:
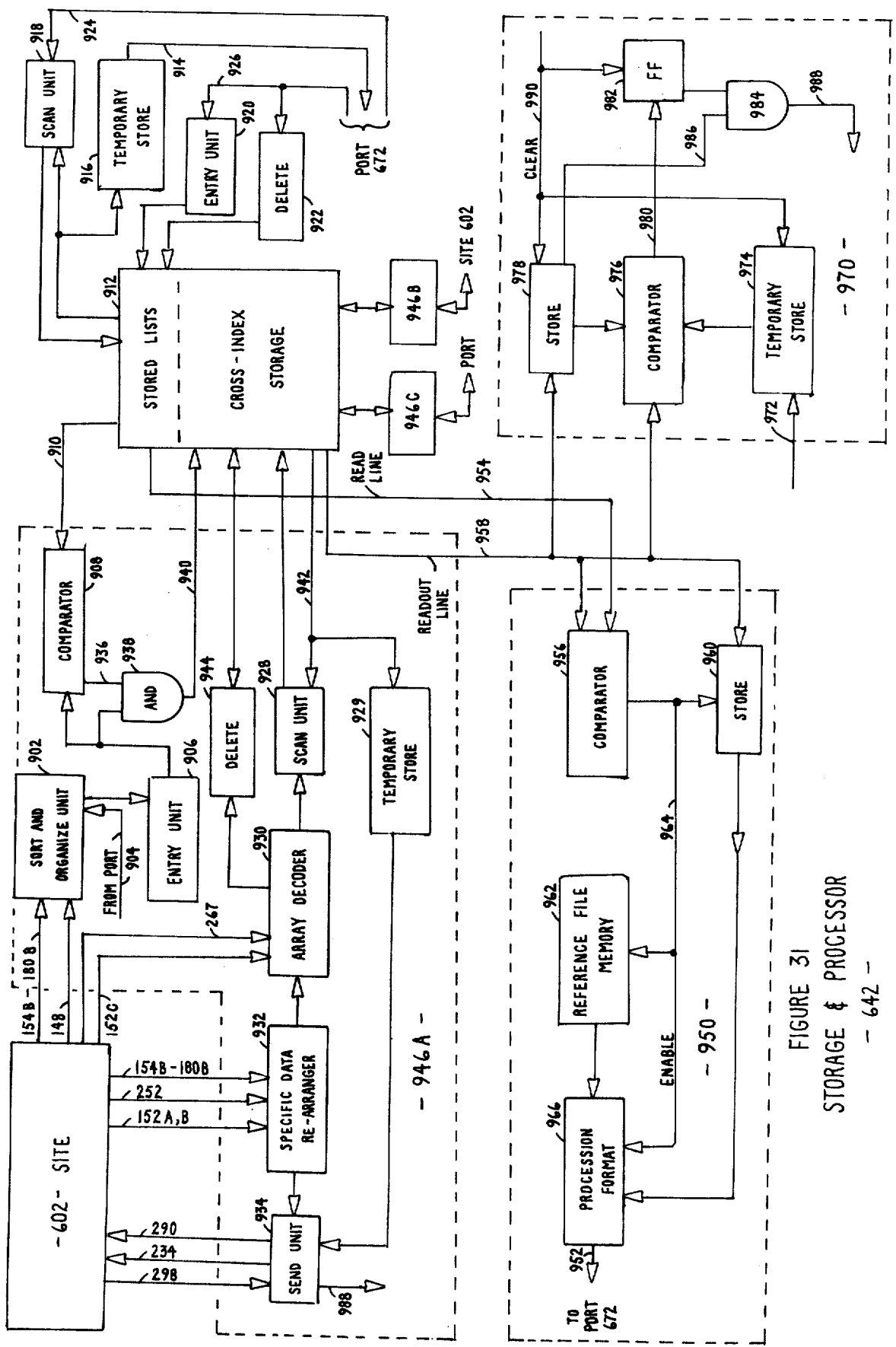
FIG. 31 shows a functional block diagram for the storage and processor 642.

The storage and processor 642 for the cross-index is shown in functional block diagram in FIG. 31. The lines 148, 152A, B and C, 154B–180B, 252, 234, 267, 290 and 298 are connected between the FIG. 5 and 6 circuitry in the cross-index site 602 and the storage and processor 642, as shown in FIG. 31. Selected determinator 10 data and postscript 14 data are organized into catalogs in the cross-index by the storage and processor 642. This selected data on lines 154B–180B is fed a sort and organize unit 902. Also fed into the sort and organize unit 902 is line 148 which has selected data received over line 601B from site 601 or from the index/reference loop 730 via line 904. In either case, the index data is received from the index storage 641D, shown in FIG. 26. The data is sorted, collated, correlated and otherwise organized by internal logic an memories in the sort and organize unit 902. The data includes a catalog position which is sent to an entry unit 906 where it is compared by comparator 908 with stored catalog lists of data arriving on line 910 from a cross-index storage 912. The stored catalog lists generally are changed only by a port 674 on the index/reference loop 730. When such a change is produced by port 674, it arrives at the port 672 on the same processing loop and is entered into the cross-index over lines 757 via the transfer logic and memory 657 in the manner previously explained. Any part of the stored lists in storage 912 can be read out on line 914 from a temporary store 916 and transferred via device 657 to port 672.

After the incoming index data from the index site or the ports has been sorted and organized in the unit 902 and passed into entry unit 906, when comparator 908 detects a match of the catalog position 910 of the sorted data from unit 902 with catalog position 910 from the cross-index storage 912, then it provides a signal on line 936 to AND gate 938 to permit the sorted data to be entered via line 940 into the correct position in the cross-index storage 912.

The scan unit 918, temporary store 916, an entry unit 920 and a delete unit 922 are connected between the cross-index storage 912 and the port 672 via the lines 924, 914 and 926 leading into the transfer logic and memory 657. Device 657 is shown in FIG. 22C as connecting via multicable line 757 into port 672. The scan unit 918, temporary store 916, entry unit 920 and delete unit 922 comprise the same hardware and operate in the same manner as the identically named devices in the storage and logic control 641 shown in FIG. 26. The same applies for the entry unit 906, a scan unit 928, a temporary store 929, an array decoder 930, a specific data re-arranger 932 and a send unit 934. The specific data re-arranger 932 receives the determinator information on lines 154B–180B and re-arranges the determinator by its gating circuits to provide a determinator for sending out via send unit 934. In this connection, re-arranger 932 interchanges the P No. 34A and R No. 36A such that the received determinator data becomes the determinator data for the outgoing matrices as a reply from the storage and processor 642 to the requesting users, ports or sites. The re-arranger 932 also receives 2 No. information on line 252 and timing information on line 152A, B and supplies the identity of the particular user or site requesting information in the cross-index storage 912. The specific data re-arranger 932 supplies the identity of each user or site requesting information from the cross-index storage 912. The array decoder 930 receives the identity information from re-arranger 932, the specific data request on line 267 derived in cross-index site 602 by its receiving data memory 266, and array timing on line 152C and decodes the data request for the scan unit 928 for scanning the cross-index storage 912 and receiving data via line 942 in the temporary store 929 for placing via send unit 934 on the output line 234.

The output of the array decoder 930 is also connected to a delete unit 944 for providing information for deleting slected data from the cross-index storage 912.

The circuitry included within the dotted block 946A is essentially identical to the block circuits 946B and 946C. The circuit of dotted block 946A is connected by the several lines shown to one of the FIG. 5 and 6 blocks, such as the block 601E shown in FIG. 25, the circuit of block 946B is similarly connected to another FIG. 5 and 6 block 601F at the site 602, and the circuit of the block 946C is connected to a port (FIG. 5 and 6 circuitry) at the circuit block 808 shown in FIG. 29.

The reference file storage and site control 643 requires selected combinations of data from the cross-index. This is obtained in the dotted block 950 circuitry of storage and processor 642 shown in FIG. 31 and sent on line 952 for eventual transmittal via transfer logic and memory 657 and port 672 to the reference file. More particularly, data in the form of lists, stored in the cross-index storage 912 is sent on line 954 to the comparator 956 where it is compared with the cataloged data available on readout line 958. When a comparison occurs, a signal from the comparator 956 enables a store 960 to store the information on the readout line 958. Comparator 956 also enables a reference file memory 962 which is a read only memory containing determinator 10 data for the reference file storage and site control 643. The enable on line 964 permits both the store 960 and the reference file memory 962 to enter their data into a procession format unit 966 which then sends the data on line 952 through the transfer logic and memory 657 to the port 672 for transmission to the reference file storage and site control 643 via the index/reference loop 730.

Requests for retrieved information which arrive from cross-index site 602 are partly processed in blocked circuit area 970. In operation, information and requests arriving at the array decoder 930 are transmitted on line 972 to a temporary store 974. The data in the temporary store 974 is compared to the cataloged data on line 958 by comparators 976. The comparators 976 generate a signal when a match occurs which enables a store 978 via line 980. This causes the data on readout line 958 to be placed in store 978. After the storage has occurred, a flip-flop 982 is triggered by the signal on comparator line 980 to enable a gate 984 via line 986. Gate 984 reads out the required data on line 988 which is connected to the send unit 934 which causes the data to be sent to the user as previously explained. After the requested data is read out of the cross-index storage 912 and sent via the gate 984 and line 988 into the send unit 934, the send unit 934 provides a clear signal on line 990 for clearing the stores 974 and 978, and the flip-flop 982.

From the above discussion of FIG. 31, it is to be understood that an important function of the cross-index storage and processor 642 is to supply the reference file storage and site control 643 with selected information. Another important function of unit 642 is to sort and organize the data received from the sites on the communications/computer network, the index and the ports. The transfer of information between the index, the cross-index and the reference file is accomplished mainly through the transfer logic and memory devices 656, 657 and 658, and the ports in the index/reference loop 730. It is noted that while one or a few ports have been shown and described in the loops 730–733 for simplifying the description, it should be apparent that any number of ports can be used in accordance with the needs of the system. Also, it should be apparent that the data which is stored in the index and the cross-index is primarily for the purpose of bookkeeping and control of the system. The users do not commonly use or access the index and cross-index unless they have a special need for catalogued information. Rather, the users operate with information stored at the user sites, or in other parts of the system, as described. Also the many sites and ports are accessible to the users via the communications network and such sites and ports can provide many peripheral functions both directly and indirectly to the users.

The cross-index is an active memory that constantly scans its own data banks and updates its memory in accordance with tutors. Another control for the cross-index is the reference file which guides and monitors the entire system as well as the cross-index. The index and cross-index greatly reduce the time required to locate specific information. In a well designed system, the index and the cross-index are searched. By virtue of the fact that the matrix employed in the communications, specifically the use of the determinator section 10 and postscript section 14 of the matrix, carries tutorial and bookkeeping information in a unique form which is ideal for both direct and indirect control of the computer, as well as for cataloging and information retrieval, the index and cross-index are able to quickly and efficiently process and supply information to the reference file, as well as quickly retrieve information for all users. It should be apparent at this point that the primary source of information is the user entering data into the matrices, and that the matrices directly and indirectly control the indexes and other computer sites. The index data is used to supply information to the reference file which can react to this data in a software fashion. This technology inherently operates with the user directly providing a portion of the software by way of the matrix. Also, it should be apparent and will become further apparent that the users and the computer/communications sites are physically a part of the computer because all computer sites operate by means of communications. This is contrasted with conventional computers wherein the parts, such as the CPU and its immediate files, are physically intimately associated and the users are external and divorced from the computer by the interposition of controlled interface devices which control the entry of users into the computer.

The Reference File

The reference file is the master file of the system, and monitors and directs certain operations of the system. The reference file stores and uses the master tutorials for the system and the cross-index data (as software) to perform its functions. It directly or indirectly directs the activity of the computer sites 601–616, if and when any control is needed. The reference file includes a reference file site 603 connected to receive the output lines 601A, 601B, 601C and 619A from cross-index site 602. The reference file site 603 is shown in FIG. 25 and includes the transmission lines 601B and C into shift registers 142B and C. Included in the standard site hardware, the site 603 contains address detectors for detecting data addressed to it. These circuits are the FIG. 5 and 6 circuits shown as blocks 601E and 601F in FIG. 25.

Referring to FIG. 32, a storage and site control 643 is connected to the reference file site 603 and includes a reference file storage 1000 for storage of master tutors for governing the reference file logic located in the storage and site control 643. These master tutors direct the reaction of the storage and site control 643 to information provided by the cross-index site 642.

Specifically referring to FIG. 32, the reference file receives the correlated data from the cross-index via the index/reference loop 730 through port 673. Storage and site control 643 also receives correlated data from the cross-index through site 603 via shift register 142A and talks to others via shift register 142B shown in FIG. 25. The site 603 is used when the index/reference loop 730 is very busy. The preferred path is through the index/reference loop, such as from port 672 associated with the cross-index and port 673 which is the reference file's associated port.

The reference file storage and site control 643 receives correlated and catalogued data from the cross-index on line 1002 where it enters an array decoder 1004. Line 1002 essentially comprises data produced in the port from the processions, namely, the decoded array data on line 267, the 2 No. data on line 252, and the array timing on line 152C. The array decoder 1004 sends data to a store 1006 over line 1008 from which it is sent to a comparator 1010 for comparison with the catalog readout data on the catalog line 1012 from the reference file storage 1000. When a match occurs between the data in store 1006 and the data on the catalog readout line 1012, a signal is sent from the comparator 1010 to a read actions unit 1014 over line 1016 which enables storage of the command or actions data present on a readout action line 1018 from the reference file storage 1000. This data on line 1018 is in phase with data on line 1012 so that for every item of data on line 1012 there is a command or action on line 1018. The actions or commands which correspond with the correlated or catalogued input data from the cross-index is fed out on line 1020 to a send unit 1022 where it is held until sent to port 705 via line 1024 to transfer device 658 and line 758. A specific data re-arranger 1026 receives the determinator data on line 1020 and places it in proper format on line 1028 for sending. In this fashion, the cross-index sends catalog data via port 673 through array decoder 1004, store 1006 and comparator 1010 to locate the identical catalog data in the reference file storage 1000 and obtain the required command or action to be taken. This located action is read out of the reference file storage 1000 by read actions unit 1014 and transmitted by send unit 1022 through port 705 to other parts of the computer system.

In the same manner that correlated data is received essentially from the cross-index on line 1002 from the port 673 for obtaining the required action from the reference file storage 1000, correlated data is received on line 1030 from the reference file site 603 (FIG. 25). Site 603 (FIG. 25) generally directs information to the other computer sites and computer/communications sites and also provides correlated and catalogued data from its matrices, namely, the decoded array data on line 267, the 2 No. data on line 252 and the array timing on line 152C. This correlated data comes essentially from the cross-index and is received in array decoder 1032, held in store 1034, and compared by comparator 1036 with the data on line 1012 to locate the identical catalog data in the reference file storage 1000 and thereby obtain on line 1018 the required action to be taken. Similarly, a read actions unit 1038 provides the actions or commands, as well as the locations where they are to be executed, on line 1040 to a send unit 1042. A specific data re-arranger 1044 forms the determinator data for sending in a matrix with action data from send unit 1042 on line 1046 to the site 603. Line 1046 operatively connects with both the incoming data line 290 which carries the action data and the data entry line 234 into the storage units 184–210 at the site 603. The reference file site 603 in turn transmits the data to the other sites.

Data must be entered and deleted to update the reference file storage 1000 and also to read the contents of the reference file storage. This access is from port 675 on the index/reference loop 730 via the port 673. This port is accessible only to select personnel since the data in the reference file storage and site control 643 is sensitive to alterations. The site 674 acts in a similar fashion for the cross-index storage and processor 642 and is accessible by few for the same reasons.

Alterations and examination of the reference file storage H are conducted from port 675 via the port 673. The requests arrive over line 1050 to the array decoder 1052 which interprets the input and sends the tutors to the proper units. A delete command tutor directs the data to a delete store 1054 from the array decoder 1052. The data to be deleted arrives at the delete store 1054 over line 1056. The data in the delete store 1054 is compared in comparator 1058 with the catalog data on line 1012 from the reference file storage 1000. When a match occurs, comparator 1058 causes a signal to appear on line 1060 which enables a delete signal to enter the reference file storage 1000 through entry units 1062 and 1064. The delete signals are provided on lines 1066 and 1068 into the reference file storage 1000 to cause the deletion of both selected catalog and action data. When new data is to be entered, the array decoder 1052 sends such data to an entry store 1070 over line 1072. The appropriate code and action data is also provided on lines 1074 and 1076 from the array decoder 1052 to enable gates 1078. When a comparison occurs, such as an empty in the entry store 1070, then a comparator 1080 sends a signal on line 1082 to the enable gates 1078 and permits the new data on lines 1074 and 1076 to appear on lines 1084 and 1086 and be placed in the entry units 1062 and 1064. In this fashion, new data is entered from the port 675, via port 673, into the reference file storage 1000.

Directly, it is the cross-index which determines what information, functions, processes and other operations are to be made available to both the reference file and to the users. Since the information is monitored and controlled by the reference file storage and site control 643, it is the latter which in the final analysis determines these items. As one example of a reference file capability, matrices in the main storage 608 may be placed on line and transmitted to the user sites. This may be accomplished at the users' request or at the discretion of the reference file. A matrix not fully used would be one reason for transmitting a matrix to the users sites. This matrix would be sent out from the computer sites and returned, i.e. recirculated. The returned matrix would contain new users, data changes and deletions. Data for the reference file's operation would be available as a result of its monitoring the output of the cross-index.

Thus, there has been described the manner by which the reference file uses data supplied by the cross-index to issue tutorials and other orders to various sites over either the processing loop lines or the computer/communications network. It should be apparent that the reference file performs a limited set of functions which relate to the guidance and control of the system. The reference file does not interfere with or perform the functions or processing of the other sites, as contrasted with the operation of conventional systems.

In general summary of the index, cross-index and reference file, both the index and cross-index contain catalogs of items. The index contains the determinator data in its memories as its main components while the cross-index has catalogs based on software, i.e. mentors and directives from the reference file. For example, the data in the index may indicate that a given operation or directives are stored in various places, such as the main memory, dead storage, algorithm unit, etc. The reference file can cause all appropriate data to be moved into the algorithm units. The source from which they were taken enters an address to indicate the new source for the information. The algorithm data would now be available to all users and the list of algorithms would be available from the index on request. Thus, it is to be pointed out that the index, cross-index and reference file are all active memory systems, as well as the main storage and processor 647, the tutor storage and processor 648 and the data storage and processor 649.

Also, some of the ports and sites may have active memories.

The size and design of each of these active memories will vary not only with the function but with the system size and the software. The main items for carrying out the tutorial functions for the system exist in the form of: (1) The data in the determinator section 10; (2) The address, P No. or the 1 No.; (3) Strings of tutors (tutorials) in nest and slot arrays; (4) Tutors and directives in various locations; and (5) Matrices from the sites containing data, tutors, data/tutor, etc.

1. The data in the determinator 10 is of two basic forms (a) general data 16 and (b) specific data 32. The general data 16 contains information of interest to all the users such as the matrix number, date, time, etc. The specific data 32 contains information relating to each individual user's entry. A user can enter several locations. The data here includes (or may include) items such as function (i.e. sorting, logic), first number in a numbered series, code name of part of a program, and such other information as may aid indexing, the cross-index, the reference file or any other computer site.

As was mentioned previously, the data in the determinator 10 should be as extensive as possible to provide the maximum information for both indexes and the reference file to work with. Information which can be derived from related data may or may not be sent.

2. The address or P No. in the computer/communications network and the 1 No. in the processing loops are a type of tutorial. By selecting an address or a 1 No., one is generally selecting a function. Thus, by addressing the index one can request some type of data. By addressing the index in another way, one can request other data.

3. Strings of tutors (tutorials) in nest and slot arrays are stored in the computer/communications network, the main storage and processor 647 and the tutor storage and processor 648. Tutorials in the form of a series of tutors can also be entered directly into the processing loop.

4. Tutors occur in many locations. When the tutors occur in a short series, they can be considered as micro-tutorials and mini-tutorials. Tutors occur as isolated instructions at various places in the system. For example, they may occur at the end of a procession and can modify the behavior of the ports and of the procession itself. Also, the tutors can have long term effects. The template index (T.I.), NAMCO, and other data in the determinator section 10 are also a form of tutors. Directives are tutors and/or tutorials sent out for the purpose of causing some specific or special action to occur. Directives have several sources, such as software, assembly processions of data, congruency of data, wired logic, and directly communicated data. Tutors and directives are terms usually associated with the index, cross-index and reference file. In very large systems they may be associated with related units.

NAMCO Site

Referring to FIG. 33, there is a block diagram of the NAMCO site 605. Site 605 comprises most of the identical hardware as the other sites 601–604 shown in FIG. 25 and, therefore, the same numerals identify the identical parts. Specifically, the shift registers 142A, B, C and D receive the site lines 601A, B and C and 619A, respectively, and receive lines 148 are connected from shift register 142A to the FIG. 5 and 6 circuits indicated by block 605AA, and from shift register 142D to additional FIG. 5 and 6 circuits indicated by circuit block 605BB. Output lines 255 and 316 are connected from each of the circuits 605AA and 605BB to the respective outgoing shift registers 142B and 142C. Circuit blocks 605AA and 605BB are connected via their respective group of lines 605DD and 605EE with the NAMCO processor 644, shown in FIG. 34, which responds to requests for the entry of new NAMCO character sets, the deletion of designated NAMCO character sets, and requests for the receipt of indicated NAMCO character sets from a main NAMCO stor 1100 in such processor 644. The NAMCO shift register 142E receives on input line 605EE the actual text characters from a scratch pad memory 1102 in the NAMCO processor 644. The NAMCO shift register 142E sends the text characters on the NAMCO transmission line 605A to other sites. Thus, the NAMCO site 605 is similar to the other sites 601–604 insofar as the transmission and reception of data on the transmission lines 601A, B, C and 619A are concerned, except that it provides a NAMCO shift register and NAMCO line on which the actual text characters are sent out simultaneous with the corresponding array slots or nests for each site or user.

NAMCO Processor

Figure 34:
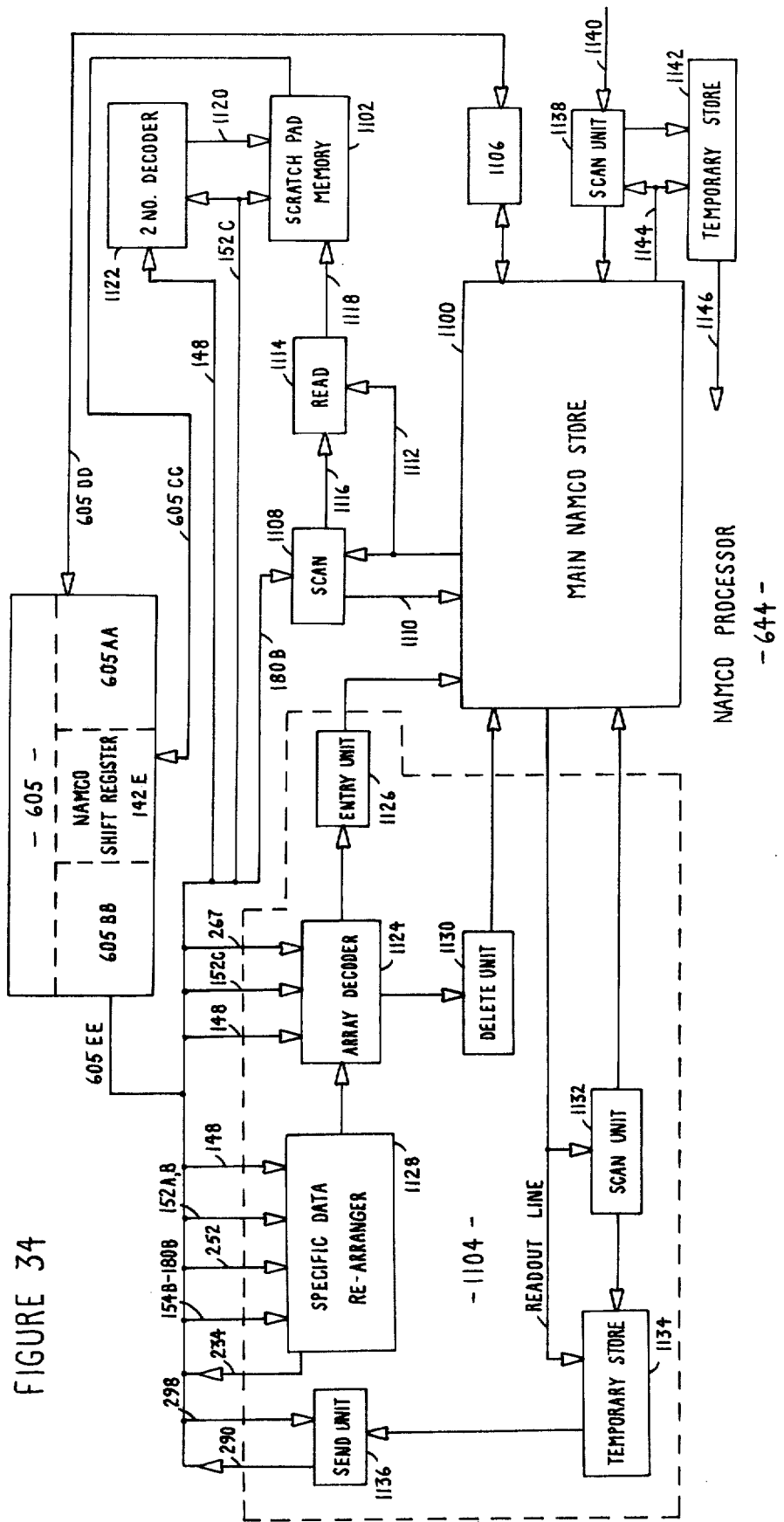
FIG. 34 shows a functional block diagram of the NAMCO processor 644.

Referring to FIG. 34, there is shown a circuit block diagram of the NAMCO processor 644. The group of lines 605DD and 605EE each include a plurality of lines 148, 152A, B, C, 154B–180B, 234, 252, 267, 290 and 298 previously described in connection with FIGS. 5 and 6, which are connected as shown to circuitry in two identical NAMCO entry, delete and send units 1104 and 1106. Unit 1104 is indicated inclusively in the dotted line block 1104 and the unit 1106 contains the identical circuitry.

The main function of the NAMCO processor 644 is to enter data on the NAMCO transmission line 605A in such manner that in each given array nest or slot, in the matrices arriving on the transmission line 619A, wherein a 2 No. exists, the text character provided by the main NAMCO store 1100 will be entered into a simultaneous and corresponding slot on the NAMCO line 605A. In this manner, the 2 No. on line 619A and the text character on NAMCO line 605A will be in time phase. In FIG. 34, during the determinator 10 time, the NAMCO codes can arrive in matrix sections 44A, 44B, 64A, 64B, 64C, 64D and 64E. These NAMCOS are sent from the NAMCO site 605 via line 180B to a scan unit 1108. The scan unit 1108 scans the main NAMCO storage 1100 over line 1110. When the required data appears on a readout line 1112, the scan unit 1108 enables a read unit 1114 over line 1116. The read unit 1114 enters the NAMCO character set into the scratch pad memory 1102 over line 1118. scratch pad memory 1102 stores all the NAMCO character sets in the matrix. Each of the characters in the NAMCO sets are advanced simultaneously by the signals on timing line 152C. The NAMCO characters are entered in order of their occurrence and can be stored in the scratch pad memory 1102 in their 2 No. positions. Since the NAMCO sets are advanced in synchronism with the array nests or slots and the sets are arranged in the 2 No. order, the 2 No. in the corresponding slot can cause the proper NAMCO character to appear on the output line 605CC of the scratch pad memory 1102 as each 2 No. is presented over incoming line 1120 from a 2 No. decoder 1122. The 2 No. decoder 1122 operates off lines 148 and 152C, using their data to select the 2 No. It is to be understood that many of the system elements shown in FIG. 34 are used in other circuits previously described, such as the 2 No. decoder 1122, and therefore will not be re-described in detail at this time. The output from the scratch pad memory 1102 goes directly to the NAMCO shift register 142E via line 605CC. The text characters provided by the scratch pad memory 1102 are derived from the NAMCO set from the main NAMCO store 1100 and are a select code known to all sites 606–616. This output on line 605CC is placed on the NAMCO transmission line 605A which goes to all computer sites 606–616.

The NAMCO processor 644 also receives and sends NAMCO character sets to and from the main NAMCO store 1100 to the computer/communications sites, 620–623 and 628–631. The NAMCO processor 644 can receive new NAMCO character sets, codes which identify such sets, and requests for NAMCO codes and sets held in the main NAMCO storage 1100 via an array decoder 1124 and an entry unit 1126. A specific data re-arranger 1128, a delete unit 1130 and a scan unit 1132 are connected to the main NAMCO store 1100 and operate as described in the other control and processor units. The NAMCO processor 644 replies to requests for data by sending the required data to the requesting party via a temporary store 1134 and a send unit 1136.

One function of the NAMCO processor 644 is to receive in the processions data in a set of known codes, such as ASCII, Baudot or common NAMCO sets and converting the received array characters into the specified equivalent characters in the NAMCO set designated in the determinator section 10. Such processions, after processing, will return to their correct ports and be stored or transmitted by their respective sites. Referring to FIGS. 22A–D, data to be so processed may arrive on the data loop 731 and be received by the port 691 for the NAMCO processor 644. The data on line 759 from the port 691 is transferred by the transfer logic and memory 659 to the NAMCO processor 644. The NAMCO code in the determinator section 10 is sent to a scan unit 1138 from line 180B in the port 691 via the transfer logic and memory 659 where it arrives on line 1140. The scan unit 1138 enables a temporary store 1142 to receive the data when it appears on a readout line 1144. The requested NAMCO set is sent to the procession from the temporary store 1142 via line 1146. The NAMCO set on line 1146 is either inserted by unit 659 into a procession array for transmission to another port or is inserted at port 691 into its local NAMCO generator 296. Using the NAMCO sets received from the NAMCO processor 644, the port 691 can translate any received data into any NAMCO characters. For example, such translation can be achieved by taking received data from the procession which appears as a code on line 267, shown in FIG. 6, and then having the transfer logic and memory 659 return this data to the port's data input line 290. The data will then enter the procession in a 2 No. form with a new NAMCO. In this manner, either the data can be translated locally to a new NAMCO, or a NAMCO set can be sent to another site for its use.

Template Index Site and Processor

The template index site 606 and template index processor 645 receive template index tutors in the determinator 10, translates them into common text characters and sends them out on line 606A in a manner similar to that of the NAMCO site 605 and NAMCO processor 644. Since the hardware and operation are essentially the same as site 605 and processor 644 previously described, further details will not be repeated herein. The template index transfer logic and memory 660 sends and receives template index data to and from the ports via line 760.

5 and 6 No. Site and Processor

The 5 and 6 No. site 607 processor 646 receives 5 and 6 No. tutors in the determinator 10, translates them into common text characters and sends them out on line 607A in a manner similar to that of the NAMCO site 605 and NAMCO processor 644. Again, since their hardware and operation are essentially the same as the site 605 and processor 644 previously described, further details will not be repeated herein. The 5 and 6 No. transfer logic and memory 661 sends and receives 5 and 6 No. data to and from the ports via line 761.

Computer Sites

Referring to FIG. 35, there is shown a block diagram of the hardware at any one of the computer sites 608–613. Shift registers 1152 and 1154 receive and pass data on lines 601A and 601B, respectively. A 5 and 6 No. shift register 1156 passes 5 and 6 No. data on line 607A and permits the readout of data on line 1170 through readout gates 1172. A template index (T.I.) shift register 1158 passes template index data on line 606A and permits the readout of such data on line 1174 through readout gates 1176. A NAMCO shift register 1160 passes the NAMCO characters on line 605A and permits the readout of such characters on line 1178 through readout gates 1180. The circuits shown in FIGS. 5 and 6 are indicated by the blocks 1166 and 1168 and receive, encode, decode, generate and send data in the same manner described with respect to FIGS. 5 and 6 and the other sites containing the same. Circuit 1166 receives data on line 148 from shift register 1164 and sends data on lines 255 and 316 through shift register 1162. Circuit 1168 receives data on line 148 from shift register 1152 and sends data on lines 255 and 316 through shift register 1154. It is to be understood that the line shift registers 1152–1164, as well as any other line shift registers used in this system, include the conventional modems or digital equipment for driving the transmission lines over the required distances. The input and output lines 1166Aa and 1168AA for respective circuits 1166 and 1168 are the same lines shown and described with reference to the FIGS. 25, 26, 29, 31, 32 and 33 and operate in connection with their associated main storage and processor 647, tutor storage and processor 648, data storage and processor 649, matrix procession logic 650, storage and logic control 651, and algorithm memory and logic 652, as shown generally in FIGS. 22A and B. Readout gates 1172, 1176, and 1180 receive timing on lines 152A, B, C and D from circuit 1166, and provide their respective shift register readouts through an output OR gate 1182 which provides either 5 or 6 No. data, T.I. data or NAMCO data on output line 1184 to a unit 647–652 associated with the site. Gate 1182 receives data from only one of readout gates 1172, 1176 or 1180 at any given time.

Main Storage and Processor

Referring to FIG. 36, there is shown the main storage and processor 647 which includes two main stores 1202 and 1204 units which operate independently of each other. As shown also in FIGS. 22A and 22C, data can be entered into a sort unit 1206 from either the tutor port 681, the data port 694 or the site 608, via the lines 154B–180B, 267 and 1184 previously described. In the sort unit 1206, the data is sorted into catagories and then sent to the entry unit 1208 for entry into the main store 1202. Data in the main store 1202 can be deleted after processing by either or both a signal from the reference file storage and site control 643 arriving at the port 709 via the main process and control loop 733 or from the main storage site 608. Tutor data regarding deletion appears on line 178B of port 709 to a switch 1211. The data to be deleted, and timing, appear on lines 148, 252 and 152D out of port 709 to a postscript decoder 1213 which provides the delete data to the switch 1211. The delete data signals are switched by switches 1211 and 1212 onto output lines 1215 and 1217, respectively, and passed through an OR gate 1210. Switches 1211 and 1212 also switch the delete data signals onto lines 1219 and 1221, respectively, connected to OR gate 1223. The lines 178B out of port 709 and site 608 provide tutor directional information as to whether the switches 1211 and 1212 should direct deletions into the main store 1202 or 1204. The delete data and tutor information are passed from the OR gates 1210 and 1223, respectively, to delete units 1225 and 1227 which scans the main stores 1202 and 1204 and deletes the appropriate information therefrom.

Delete signals can also be provided by data passing through a retrieve unit 1214. The retrieve unit 1214 comprises gating circuits for separating the output into three types, tutor, raw data and tutor-data, the latter including a statement of the location of the raw data. These are selected by a data control signal on line 1216 which originated at the reference file storage and control site 643 via port 709. The signal on line 1216 also selects the data that is to be retrieved. The retrieved tutors appear on output line 1218 and the data-tutors appear on line 1220. These signals are gated together by a gate 1226 and sent to a switch 1228 for transfer to the tutor port 681. The processions from port 681 will be entered on the tutor loop 732 for further processing. Raw data and tutor data appear on lines 1222 and 1224, respectively. After being gated together in gate 1230, the data is sent to a switch 1232 and then to the data port 694. Port 694 enters the data on the data processing loop 731. In the data processing loop 731, the data is further processed by the ports associated with this loop.

Data which has been processed in the tutor loop 732 is returned to the main storage and processor 647 via the port 681 and, after going through a selector unit 1234, is sent via a sort unit 1236 and an entry unit 1238 into the main store 1204. In a similar manner, processed data from the data loop 731 is entered via the data port 694, a selector unit 1240, the sort unit 1236 and the entry unit 1238 as processed data into the main store 1204. In this manner, main store 1204 contains only processed data.

Data in main store 1204 is continuously scanned, sorted, collated and correlated by a sort, correlate, collate unit 1242 and a scan unit 1244. Main store 1204 is also continuously monitored by the reference file storage and site control 643 via the port 709 which sends data to such storage and site control 643 over the main process and control loop 733. The port 709 sends correlated, sorted, collated and otherwise catalogued data to the storage and site control 643 over the loop 733. The main store 1204 provides data on readout line 1246 to the sort, collate and correlate unit 1242 which catalogs and presents the data to a compare unit 1248 for matching against the data in a data file 1250. When a comparison occurs, an enable pulse appears on line 1252 at the inputs to gates 1254, 1256 and 1258. The outputs of these gates are respectively control signals on line 1260, port select signals on line 1262 and catalog data signals on line 1264. The catalog data signals on line 1264 enter the scan unit 1244 which enables a read unit 1266 via line 1268. The read unit 1266 then sends the processed data over a send line 1270 to send unit 1272. Send unit 1272 is connected to a specific data re-arranger 1274 which operates in the manner previously described to arrange the determinator 10 section for transmission to the users. At the same time, the scan unit 1244 sends an enable signal on line 1268 to the send unit 1272 which permits the determinator data from the specific data re-arranger 1274 to be simultaneously sent. Some of the data on line 1270 is used to generate the determinator data for the outgoing matrix. It is noted that since the description of several units and ports in FIG. 36 have been previously described in other Figures, including the FIG. 5 and 6 lines having numerals below 300, they will not be repeated here.

The output of the gates 1254, 1256 and 1258 connect via lines 1260, 1262 and 1264 to a switch 1276. The port select signal on line 1262 from gate 1256 is used to direct the addressing of the switch 1276 to the appropriate ports. The switch 1276 output lines 1278, 1280 and 1282 connect to respective switches 1284, 1232 and 1228 for connecting such lines with ports 709, 694 and 681, respectively. Switches 1284, 1232 and 1228 operate essentially as OR gates. That is, switch 1284 sequentially connects the catalog data on line 1264 and the line 1278 to provide data on input line 290 to the port 709. Switch 1232 sequentially switches the data out of gate 1230 and the data on line 1280 onto line 290 into the port 694. Similarly, switch 1228 sequentially switches the data on line 1282 and the data out of gate 1226 onto line 290 in to the port 681.

It is noted that the dotted block 1290 in FIG. 36 can be considered as part of the transfer logic and memory 662 for switching and storage of data between the main storage and processor 647 and the ports 681, 694 and 709. The block 1290 is included in FIG. 36 to assist in understanding the operation of the main stores 1202 and 1204 with respect to the ports.

Data from the main storage and processor 647 appears on the tutor loop 732 and the data loop 731 in two basic forms. The first form of data has the main store 1202 as its source. This data generally appears as either tutor or data which is sent to the assemblers on the processing loops 730–733 for either assembly into the final data/tutor form or an intermediary form which will ultimately become a data/tutor. The data/tutor either directly processed or is stored in main store 1204, for either processing or transmission to the user (R No.). The disposition of the data may be directly stated in the determinator section 10 or may be indirectly obtained by the reference file storage and site control 643 from data supplied by the cross-index storage and processor 642 and sent to the site control 643 over the processing loop 730.

In summary, the main storage and processor 647 shown in FIG. 36 receives data from a multiplicity of sites for immediate or delayed processing by the ports on the processing loops 731–733. The incoming data is read into the main store 1202 as either data or tutors to be complied or assembled under the direction of main storage and processor 647 and the reference file storage and site control 643. Data and tutors are read out of main store 1202 simultaneously in associated data and tutor groups and delivered to the processing loops 731–733 where they are assembled into data/tutors. A group of data processions and a group of tutor processions which are related to a given user are released by the main storage and processor 647 over a short burst of processions for the purpose of being assembled into data/tutor processions composed of related data/tutors which can be processed by the various processing ports. In a similar manner, strings of tutors (tutorials) can be complied into a form of software. After being assembled in the processing loops, the data/tutors are returned to the main storage and processor in main storage 1204 where they are forwarded on to computer/communications sites, or sent to the processing loops for completion into a resultant and then forwarded on to the user. In this connection, it is noted that resultant data/tutors can be combined with other data/tutors in the processing loops to obtain further resultants.

Assembler Ports

Some ports on the processing loops 730–733 are used as assemblers. Assembler ports combine two processions into one procession and (generally) discard the other procession. For example, tutor and data processions can be made into data/tutor (D/T) processions where the tutors are represented in the specific data section 32 of the procession and the data is represented by the location of the 2 Nos. in the array section 12 assigned to the appropriate tutors. This is possible because the 1 Nos.A serve to identify functions in the processing loop 730–733, such as add, square, divide, and also because of the nature of the specific data format of the processions, as described and shown in FIGS. 1 and 30. A data/tutor procession can have a 1 No.A in the last position in the specific data section where the 1 No.A is the location of the assembler. In this case, the procession goes to the various sites in the loop and finally returns to the assembler port.

Figure 22D:
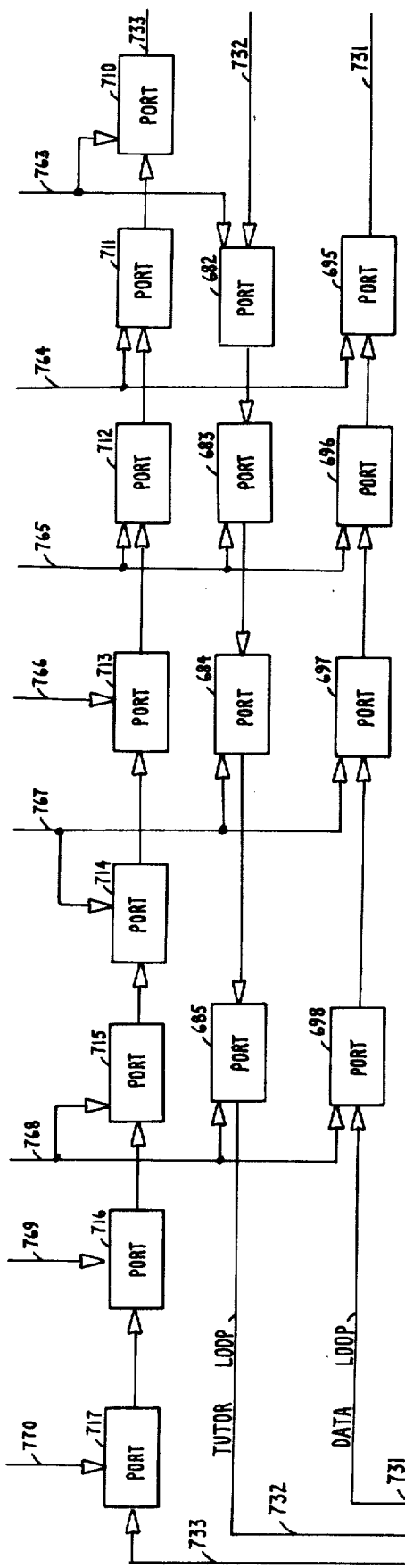

Referring to FIG. 37, there is shown a block diagram of an assembly port for forming data/tutor processions from tutor processions and data processions. The particular assembler of FIG. 37 uses two ports 686 and 699 to receive data, one from the data loop 731 and the other port from the tutor loop 732. These ports 686 and 699 are referred to as the data port and the tutor port respectively and are shown in FIG. 22D in the processing loops.

An idle assembler can receive a tutor procession addressed to it on tutor loop 732. The incoming procession from port 699 has its determinator 10 and postscript section 14 stored in a determinator and postscript store 1302 and its array section 12 stored in an array store 1304. A specific data modifier unit 1306 deletes the 1 No.A (address) of port 699. The relevant tutors in the determinator 10 are sent to a data selector 1308 over line 1310. The array section of this procession carries tutors for guiding the assembly of data from the data procession. The array section also has the matrix identification code(s) of the data procession(s) from which raw data for the data/tutor processions can be obtained. Most of the tutors in the arrays indicate the specific locations in the data processions from which data must be taken to form a new data/tutor procession. The tutors for this new data/tutor procession exist in the determinator 10 of the tutor procession arriving at tutor port 699.

The tutor array data arrives at the array store 1304 over line 267 from the port 699. The matrix identification code of the procession which contains the raw data required for the assembly of a data/tutor procession is sent from the tutor array store 1304 over line 1312 to a matrix identification code number decoder 1314. The matrix number is sent to a comparator 1316 to find the data procession with the same matrix identification code. Processions passing through the shift registers of data port 686 have their matrix identification code sections 26 read and sent to the comparator 1316 over line 160B. When the comparator 1316 detects a match, an enable signal is sent on line 1318 to enable gates 1320, to a counter 1322 and to the site control 248 in data port 686 to cause the matched procession to be seized by the data port 686. The signal from the comparator 1316 opens the enable gates 1320 and allows the procession data to be stored via lines 1324 in a procession store 1326. After data is entered in store 1326, it is deleted by a signal sent on line 1318 from the comparator 1316 to the site control 248 in data port 686 to cause deletion of the procession. Array data arriving on line 267 from the data port 686 is entered into an array store 1330 via enable gates 1320 and line 1328. The data in the array store 1330 is sent on line 1332 to the data selector 1380 for selection in accord with the tutors arriving over lines 1310 and 1334 from the determinator and postscript store 1302 and the array store 1304, respectively. This selected data is sent to an assembler 1336 over line 1338 for assembly into a data/tutor procession. The assembler, using data from the determinator and postscript store 1302 arriving on line 1340 and data from the data selector 1308 over line 1338, generates a new procession which is sent over lines 234 and 290 in the tutor port 697 for transmission over the tutor loop 732.

A postscript decoder 1342 receives timing data from port line 152D and the incoming data on line 148, decodes the postscript section 80A, B, C, etc. of the procession, and sends a count on line 1344 to the counter 1322. Counter 1322 increases the received count by one upon receiving a signal on line 1318 from the comparator 1316. This count is sent on line 1346 to the procession store 1326 for entry into section 80A in the postscript 14. This count is also sent to a comparator 1348 over lines 1346. A tutor in procession section 46A is also sent to the comparator 1348 over line 1350 from the procession store 1326. If the output from comparator 1348 indicates a match which means that the data procession has served its function, a signal on output line 1352 is provided to a send inhibit unit 1354 to thereby inhibit the unit 1354 from sending processions from store 1326 out onto lines 234 and 290 in the data port 686. When an inhibit signal occurs on line 1352, it is not sent, but rather is dumped. Otherwise, the procession is returned over lines 234 and 290 to the port 686 for sending out on data loop 731.

The assembler shown in FIG. 37 is of the type used for assembling raw data from one or more processions with tutors from one or more other tutor processions to form data/tutor processions which can be processed by the various processing ports. Other types of assemblers can bring new data to these processed data/tutor processions for further assembly into data/tutor processions to continue the solution of problems. Some assemblers can be designed to form data/tutor processions used for software.

The Tutor Site and Data Site

The tutor site 609, its associated tutor storage and processor 648, and the data site 610 and its data storage and processor 649 are shown in FIG. 22B. The raw data to be operated upon is sent to the data site 610 for storage and/or processing in data storage processor 649. The data is sent in one or more matrices as follows. First, the P No. of the data site 610 is entered into the specific data section in 34A or B and the part of the raw data sent is specified in 56, 58, or 60. The R No. (36A or B) specifies where the final data or the raw data is to be returned. If this is to be destroyed after use, this must be stated in the matrix, such as at location 61A (not shown). The other locations 34-60 are entered as before. Second, the array (12) is entered with raw data starting with No.XXT and continuing to XXZ. The numbers for the raw data are not sent since the raw data is sent in consecutive order. The number for the first raw datum appears in the determinator 10 and the number of the last data appears in the postscript section 14. Thus, the raw data is entirely identified.

This process is repeated for the tutorials. The P No.34 is sent to the tutor site 609. The section of the tutorial is stated in 56, 58 or 60 along with related information. The other determinator section 10 is standard. The tutor is written in the array. For example thus: add, No.XXT, XXV, XXW, multiply sum of addition by XXZ, etc. The R No. is the site where the results are to be held or used. The final disposition of the material is stated in the matrix such as in a section 59, (not shown). The data/tutors which result are stored and later destroyed as stated in matrix section 61, (not shown).

The matrices, upon arriving at the computer sites, pass through the index 601, cross-index 602, etc., before arriving at their destination sites, such as data site 610 and tutor site 609. They continue on to the Q No. site 616 after which they are dumped. At the cross-index site 602, the matrices are cataloged by correlation, sorting, etc. The fact that compatible data and tutors are in storage at the data site 610 and tutor site 609 is derived by the cross-index from its data. This fact is transmitted to the reference file storage and logic control 643 via the index/reference loop or the sites 601, 602, 603. The reference file consults its memory for the required action. The reference file instructs the data site 610 and the tutor site 609 to send the required data and tutors to the assembler ports on the processing loop. At the assemblers, the data and tutors are assembled into data/tutors. Thus, the tutors are entered into processions and sent to the assemblers. The tutors may read "add Nos. XXV-XXZ etc." The raw data is likewise sent out as processions. The data numbers are stated in the general data section of the procession as items such as "XXB to XXZ". Both data and tutor processions have other data, such as originator and tutorial section number.

The data from both porcessions are compared at the assembly ports. If a match occurs between the held tutor procession sent to the port and the data procession passing through the port, then the data procession is seized by the port and its data assembled into data/tutors. The data/tutors may be sent to the main storage 608, the real time site 611 for return to the user or such data/tutors may be processed in the processing loops. In the event the data/tutors are processed in the processing loop, the results may be stored at the main storage 608 or sent back to the user via the real time site 611. The destiny of the data/tutor is determined by either tutors arriving in the matrices or tutors issued by the reference file via the processing loop.

The data/tutors can be stored in nest groups as assembled information so that they are readily available for both storage and processing.

The reference file site 603 is connected to the reference file storage and site control 643 which contains tutors for controlling its activities. These activities consist of control tutors sent over the main processor and control loop 733, such control tutors consisting of instructions to the various computer sites. Examples of tutors are: 1. (to data site) send XXT to XXZ of user No.BTYRNO out for assembly. 2. (to tutor site) send users No.BTYRNO tutors XXT to XXZ to be assembled into data/tutor. 3. (to main storage) prepare to receive and store users BTYRNO data/tutors No.XXT to XXX. The above instructions are issued when, in one case, the reference file receives correlated data from the cross-index. The cross-index states that user BTYRNO has both raw data and tutors from the same section of the user's tutorial which are to be processed with priority number 3. When the reference file receives this data, it consults its memory and comes up with the above control tutors which it sends out over the processing loop. In summary, the data site 608 reads data in the specific data section 12 of the matrix, such as in the sections 56, 58 and 60. If data is being sent, the data site 610 transfers it from the incoming matrix to a procession. Transfer logic and memory 664 is used to effect the transfer. The data site 608 is under the control of the reference file 603 and its storage and site control 643, and can also be used for raw data storage. The tutor site 609 reads data in specific data section 12 of the matrix and in sections 56, 58 and 60. If tutors are being sent, the tutor site transfers the data from the array section 12 on the incoming line to the processing loop via a port, and the transfer logic and memory 648 is used to effect the transfer. The tutor site 609 is under the control of the reference file 603 and its storage and site control 643, and can be used for tutor storage. Some of the storage functions of the main storage site 608 and its associated main storage and processor 647 can be handled by the data site 608 and tutor site 609.

The Real Time Site-Transfer of Data between Matrix and Procession

A user may wish to obtain immediate service from the processing loop (s). This can be accomplished by a direct and simple method. The amount of equipment used to enter the proper matrix data into appropriate locations in the processions can be minimal. This is also true for the transfer of data from the processions to the matrices for the return of processed data to the requesting user. The illustrative method employs the presence of both data and tutor, i.e. data/tutors, in the matrix array section 12. Here the originator site generates the data/tutors although other sites can serve as the source for data/tutors.

FIG. 38 shows data transfer from a matrix to a procession. A matrix 1600 is shown at the top of the figure. The matrix 1600 represents data addressed by its P No. to the real time site 611. Site 611 is aided by the matrix-procession logic 650, the transfer logic and memory 666, and ports 712, 683, and 696 which operate to transfer data between matrix and procession, and thereby provide real time service. Immediately below matrix 1600, a procession 1602 is shown. Data is transferred from matrix 1600 to procession 1602. For simplification of the description, the matrix 1600 is not shown completely, part of the specific data section 32, array section 14 and all of the postscript 14 being omitted in FIG. 38. Also, part of the procession 1602, array section 12 and the postscript 14 have also been omitted. In the FIGS. 38 and 39, the numerals indicating the various code sections are identical to their counterparts in the matrix shown in FIG. 1.

In matrix 1600, the sync 18, route code 20, matrix length code 22, time code 24, matrix identification code 26, mode code 28, format code 30 and nest code 54, i.e. the general data section 16 are transferred from the matrix 1600 to the procession 1602 into corresponding slots as shown by the arrow 1604. Part of the specific data section 32, i.e. the R No. 36A, U.I.C. 38, G No. 40A, T.I. 42A, NAMCO 44A, Q No. 46A, and tutors 56A, 58A, 60A are transferred as shown by the arrow 1606 from matrix 1600 to procession 1602. These tutors 36A–60A are taken from and entered into corresponding locations. The 3 No. in the array of matrix 1600 marked by an asterisk (*) are addresses. These 3 No.* addresses are transferred from the array 12 of the matrix 1600 to the specific data section 32 of the procession 1602 as shown by the arrows 1608, 1610, 1612, 1614 and 1616. The 3 No.* are entered as tutor address sets shown as 1 No.* in the specific data section 12 of the procession 1602. It is to be understood that both the 3 No.* and 1 No.* are a series of tutors 34B–46B, 56B–60B, C, D, etc. Only the 34B, C, D, and E are shown. As shown, a 3 No.* in the array 12 of matrix 1600 becomes the 1 No.* in the specific data section 32 of the procession 1602. After the last 1 No.A is entered, the 1 No.B of the real time site is entered as in section 36.

In the array section 12 of the matrix, each 3 No.* is followed by data in the form of 3 Nos. These 3 Nos. and the 3 No.* preceding them form a data/tutor in the matrix 1600. These 3 No. are transferred to the array section 12 of the procession 1602 as shown by arrows 1618 to 1634. The transferred 3 No. is shown as a 2 No.+ a T.I. distance and, thus, a 3 No.A appears as 1+T.I. for those 3 No. associated with the first position and as 2+T.I. for those T.I. associated with the second position, as 3+T.I., 4+T.I. and 5+T.I. for those 3 No. associated with the third, fourth and fifth position, respectively. In this manner, the 3 No. in the array 12 become data/tutors with their respective 1 No.* tutors in section 30 of procession 1402.

In FIG. 39, procession 1640 is shown above a matrix 1642. Data is transferred from the procession 1640 to the matrix 1642 as shown by the arrows 1644, 1646, 1648 and 1650. Data in the general data section 16 of procession 1640 is transferred to its corresponding locations in section 16 of the matrix 1642 as shown by arrow 1644. Data from section 32 of procession 1640 is transferred to its corresponding location in section 32 of the matrix 1642 as shown by arrow 1646. The R No. 36A in the procession 1640 becomes the P No. 34A in the matrix 1642. A R No. 1652 of the real time site is inserted into section 36A of the matrix 1642. The 3 No. in the procession 1640 is the resultant after the procession has carried the data to all its 1 No.A sites and returned the data to the R No. in section 36N which is the address of the real time site. This resultant 3 No. 1650 is transferred to the matrix 1642 as shown.

Referring to FIG. 40, there is shown the matrix-procession logic 650. Here, data arrives from the real time site 611 shown in FIG. 22B. The site 611 is shown in more detail in FIG. 35. As each matrix arrives at the real time site 611, the general data 16 is stored in the general data transfer and store unit 1662, the specific data store and transfer unit 1664, the 3 No.* store and transfer unit 1666 and the 3 No. store and transfer unit 1668. Data for these units arrive over lines 152A, B, and C. 154B–180B, 1184, and 148. An enable signal on line 1670 causes the data in units 1622, 1664, and 1668 to be transferred to their corresponding procession entry units 1672, 1674, and 1676, these being the procession general data entry unit 1672, the procession specific data entry unit 1674, and the procession array entry unit 1676, respectively. General data is transferred from unit 1662 to unit 1672, unaltered. The specific data in unit 1664 transfers all the specific data except the site 611 address, i.e. the P No. The procession specific data entry unit 1674 receives data from the specific data store and transfer unit 1664 and also from the 3 No.* store and transfer unit 1666. Unit 1672 assemblies the data into specific data 32 for the procession. Data from the 3 No. store and transfer unit 1668 goes to the procession array entry unit 1676. The data from units 1672, 1674 and 1676 are sent to the transfer logic and memory 665 for assembly into processions.

Data from the ports arrive via the transfer logic and memory 665. This data is entered into the procession general data transfer and store unit 1678, the procession specific data transfer and store 1680, and the array data transfer and store unit 1682. The data from the units 1678, 1680 and 1682 is entered into the general data entry unit 1684, the specific data entry unit 1686 and the array store and entry unit 1688, respectively. The specific data has the R No. of the real time site 611 added from the R No. source 1690. A signal from the new entry line 1692 prepares the units 1684, 1686 and 1688 to receive new data. Data is entered for sending the resultants of processing to the users over lines 152A, B and C, 234 and 290.

In this fashion, when data/tutors are being sent, the real time site transfers the data from the matrix to a procession on one of the processing loops 731–733, and transfer takes place via the matrix-procession logic 650 and the transfer logic and memory 665. The array section 14 of the communications matrix carries data in such form that it can be transferred directly out of the matrix and form a procession. This data states the function to be performed, the tutor indicating where the processed results are to be placed, as well as other required actions, followed by the numbers and/or other relevant data which is to be operated upon by the above mentioned function. This is repeated for as many functions, tutors and data as are necessary to complete a processing operation. One or more matrices and processions may be required to complete a master tutorial. An example of a real time matrix array section for a purely mathematical operation for a given user is shown below in Table III.

TABLE III

| REAL TIME ARRAY SECTION OF MATRIX | | | |
|---|---|---|---|
| (a) | 1 No.A1 | Tutor 1 | Numbers |
| (b) | 1 No.A2 | Tutor 2 | Numbers |
| (c) | 1 No.A3 | Tutor 3 | Numbers |
| (d) | 1 No. An, R No. | Tutor n | Resultant |

Referring to Table III, the form in which data arrives in the array section is shown for a purely mathematical operation. The 1 No.A stated in each row represents the function to be performed on the numbers which follow in the respective rows. The tutor in each row indicates where the processed result is to be placed. In the row (d), the 1 No.An represents the address of the real time site, the R No. is the address of the originator to which the resultant is to be sent as directed by the tutor n.

Other Computer Sites (FIG. 22B)

The dead storage site 612 holds data which has been or will be processed, i.e. data, tutors, data/tutors, solutions, which may later be fed back over line 601A into the other computer sites for reuse as if such data had first arrived at the index site 601 for processing. Users may recall data from this site. The storage and logic control 651 contains the storage units.

The algorithm site 613 stores algorithms and makes them generally available. It checks for new algorithms by monitoring the incoming specific data sections 56, 58, 60 of the incoming matrix on line 619A for the algorithm code. The new algorithm is checked against the existing algorithms held in the algorithm memory and logic 652. If different, a new code number is assigned. If old an additional code number is temporarily assigned. When data is supplied from the users or the main storage and processor 647, the algorithm unit transfers data/tutors to the processing loops 731—733. The results may be sent to the real time site 611 through the transfer logic and memory 665 and matrix procession logic 650 to be returned to the users, or it may be sent to the main storage and processor 647 via the transfer logic and memory 662 for further processing.

The mini-tutor site 614 operates in the same manner as the algorithm site 613 and provides essentially the same functions for the mini-tutorials that the algorithm unit performs for the algorithms.

The traffic site 615 monitors the load on the system by observing the determinator section 10 of the matrix on line 619A. One manner of traffic control involves the inhibiting of sending of low priority type transmissions by inserting the appropriate priority codes in the general data section 16, such as after the section 54 shown in FIG. 1. The memory and logic 654 stores the read determinator information to determine how many users on the average are on line at a given interval of time, and relays this information to other parts of the system.

The Q No. site 616 assigns Q Nos. by entering them into the specific data sections 46A and B of the matrices on the outgoing line 601C. It also reads the postscript section 74 of the incoming matrix on line 619A to recover and reuse the deleted Q No. The matrix numbers wherein Q No. are inserted and deleted may also be noted. The matrix numbers wherein a Q No. is entered and deleted may be obtained by sorting. This data together with the P No. might be stored as a group for ready reference.

While preferred embodiments of the invention have been described, it will be apparent to those skilled in the art that various changes may be made without departing from the spirit and scope of the invention as described herein and defined in the claims.

What is claimed is:

1. Communication system for transferring data between a large number of sites over transmission line means wherein said sites can each be originating and/or receiving sites, comprising:

sync and counting means, at each site, for detecting a plurality of repetitive time or space oriented matrices on said transmission line means for conveying and/or storing data, each said matrix including a determinator section having a multiplicity of address positions for entry into addresses of those sites seizing an address position in a given matrix, and an array section having a plurality of nests for transmitting and receiving data, whereby the number of said address positions in a given matrix is much smaller than the size of the address set of the sites in the system;

an available address position detector, at each site, connected to said sync and counting means for detecting an available or empty address position in said determinator section;

address entry means, at each originating site, responsive to said available address position detector, for entering the address for an intended receiving site in said detected empty determinator address position to thereby seize said position;

address receiving means, at each receiving site, including an address detector for detecting its own address received in said determinator section;

secondary number generating means, at each originating site, responsive to said address entry means, for providing a secondary number that is used to identify and locate those nests of said array section wherein data from said originating site is entered;

a secondary number receiving means, at each receiving site, responsive to said address receiving means, for determining the same secondary number being used in a given matrix by its originating site so that those nests containing data for said receiving site can be identified and located;

array data location means, at the originating and receiving sites, responsive to said sync and counting means and said respective secondary number generating means and secondary number receiving means, for locating those array nests identified by a secondary number;

array data entry means, at the originating sites, responsive to said array data location means, for entering data in those located nests for communication to intended receiving sites;

array data receiving means, at each receiving site, responsive to said array data location means, for receiving said intended data sent by its respective originating site in said located nests; and address deletion means, at each receiving site, responsive to said array data receiving means, for deleting the address received by said site in said address position in the determinator section after data is received in the nests of the same matrix, thereby making said address position available to other sites desiring entry into said matrix; whereby said data entered and received in said array nests is communicated between an originating and receiving site by means of the secondary number for the duration of the matrix in which an address position has been seized 2. System as recited in claim 1, wherein said array data location means comprises timing means for counting the array nests and gating means for selecting ones of said counted array nests with counts equal to respective secondary numbers.

3. System as recited in claim 1, wherein said secondary number generating means includes a counter for counting successive address position in said determinator section and a gate connected to said available address position detector for stopping the count when an available address position is detected for use by an originator site, said stopped count being that site's secondary number, and said array data location means at each originating site comprises secondary number entry means for inserting said secondary number into selected array nests, thereby associating said selected array nests with the secondary number and its defined address position in said determinator.

4. System as recited in claim 1, wherein said array data location means comprises at each receiving site comparator means for comparing the secondary number used by a receiving site for a given matrix with data in the form of secondary numbers located in the nests of said array, whereby a match indicates that the nest data at the location of the matched secondary number is intended for said receiving site.

5. System as recited in claim 1, wherein said array data location means at each originating site comprises a data generator, said data generator producing a set of characters which are each indexed in time or space with the respective nests of an array, comparator means for comparing a character to be inserted in a matrix with the characters out of said data generator, said comparator means providing an output enable signal to said array data entry and receiving means for the entry of data in the nest which is indexed with the matched character out of said data generator.

6. System as recited in claim 5, wherein said array data entry and receiving means at each originating site is connected to receive the output of said secondary number generating means such that the secondary number is entered in the indexed nest.

7. System as recited in claim 1, wherein said determinator section includes locations for sites to enter tutor data relevant to the nature and use of data in said matrix, for governing the reaction by the sites to a matrix directed to said sites.

8. System as recited in claim 7, further comprising, at said sites, means for entering said tutor data into said determinator section, and means for detecting said tutor data in determinator sections.

9. System as recited in claim 8, further comprising, at the sites, means for storing said addresses, means for storing said tutor data, and means for entering in said determinator section an abbreviated number as a substitute for said stored addresses and tutor data.

10. System as recited in claim 1, wherein said determinator section includes a general data entry section containing information used in common by all users in a given matrix, and a specific data entry section containing information in subsections which is of interest only to users of the particular subsections.

11. System as recited in claim 10, wherein said general data entry section includes sync data and a matrix identification code.

12. System as recited in claim 10, further comprising, at the sites, means for generating and detecting format codes which state the modes of use permissible in a given matrix, said format codes being located in said general data entry section.

13. System as recited in claim 10, further comprising, at the sites, means for generating and detecting nest codes which state the manner by which a nest group is to function, said nest group comprising a plurality of nests which function together, said nest codes being located in said general data entry section.

14. System as recited in claim 10, further comprising, at the sites, wherein said specific data entry section contains nest assigned meaning codes which define the set of meanings used for encoding and decoding the data in the array section.

15. System as recited in claim 1, further comprising means for generating a template index code for entry into a template index position in said determinator, said template index code indicating the type of code being employed by one or more users in the array section of the same matrix.

16. System as recited in claim 1, further comprising at each site nest code logic means for deriving which nests are associated with a nest group, and the manner of reading the nest groups.

17. System as recited in claim 16, wherein said nest code logic means includes counter means for identifying within a nest group a plurality of nest group sections differing in bit length, each section of which accommodates the significant bits of a character, whereby the bit size of a given section is used to convey a character having the same number of significant bits.

18. System as recited in claim 1, further comprising a data generator at said sites, said data generator producing a set of characters which are each indexed in time or space with the respective nests of an array, and wherein said array data entry and receiving means enters a positional displacement signal in a given array nest which indicates the location of the array nest that is indexed with the desired character for transmittal.

19. System as recited in claim 18, wherein said array data entry and receiving means also enters the secondary number from said secondary number storage means in a given array nest.

20. System as recited in claim 18, wherein said data generator is a pseudo-random bit generator.

21. System as recited in claim 1, wherein sid array includes nests or slots which contain data bits that are shared by two or more characters.

22. System as recited in claim 1, wherein said array comprises two dimensional groups of nests including nests which co-share data bits.

23. System as recited in claim 1, wherein said array comprises three dimensional groups of array nests including nests which co-share data bits with each other.

24. System as recited in claim 1, wherein said determinator section includes route positions for entry and detection of route codes which direct the matrix to specified areas in the system.

25. System as recited in claim 1, further comprising, at one or more sites, means for generating a postscript section following said determinator and array sections in each of said matrices for entry of postscript data relating to data which has been previously transmitted in said determinator and array sections, whereby error checking, character counts and/or deletions of data and/or users can be communicated by said postscript section.

26. System as recited in claim 25, further comprising tutor generator means, responsive to said sites, for entry of tutors in said postscript section, said tutors governing the actions or response of the sites to data in the respective matrix.

27. System as recited in claim 1, wherein the array nests associated with each of said secondary numbers contains space for one or more bits of data, and further comprising a data generator at said sites for producing a set of characters which are each indexed in time or space with the respective array nests, and wherein said array data entry and receiving means enters one or more bits in a given array nest that is indexed with the desired character for transmittal, whereby one or more bits inserted in an array nest can convey a character selected from a large character set.

28. System as recited in claim 1, further comprising, at one or more sites, comparator means for comparing each input symbol to be sorted with the output of a data generator whereby said data generator outputs a repeating set of sorting symbols in their desired order, marking means responsive to said comparator means for marking those symbols in said sorting set when a match occurs, and data output means connected to said marking means and said data generator for extracting the sorted symbols.

29. System as recited in claim 1, wherein said plurality of nests in said array section constitute nest groups for storage of data in the form of both raw data and tutor data, and said array data entry and receiving means includes both means for entering and receiving raw data in said nest groups and means for entering and receiving tutor data in said nest groups, whereby said tutor data provides instructions as to the nature and use of said raw data for governing the reaction by the sites to said raw data.

30. System as recited in claim 29, further comprising nest code decoder means at the sites for interpreting said raw data and tutor data received in said nest groups.

31. System as recited in claim 29, further comprising, at the sites, means for storing both raw data and tutor data, and assembly means for removing selected, combined relevant raw data and tutor data from said storage means for entry into said matrix.

32. System as recited in claim 31, further comprising tutor generator and detection means for providing tutor data in said determinator section which indicates the nature and use of said raw data and tutor data in said nest groups.

33. System as recited in claim 1, wherein each of said address positions comprises a first address section containing the addresses identifying the sites whose data is entered into said matrix, and a second address section containing the addresses identifying the addresses of sites where said matrix is to be communicated for further entry or receipt of data therein.

34. System as recited in claim 1, wherein each originating site comprises said address entry means for seizing a plurality of address positions in one matrix, and said secondary number generating means includes means for storing a plurality of secondary numbers which respectively define the address positions seized by a given site, and said secondary number receiving means at each receiving site includes means for storing said secondary numbers also stored by its originating site, whereby a single site can communicate with a plurality of other sites at a given time, without causing ambiguity as to which communications are connected with which other sites.

35. System as recited in claim 1, wherein said array comprises a surround area of bits and a central area within said surround area, said central area having essentially no bits inserted therein, the omitted bits from said central area being conveyed by a code in the matrix.

36. Method of transferring data over transmission line means between a large number of sites in a communication system wherein each site can be a sending and/or receiving site for data, comprising:

generating a plurality of repetitive time or space oriented matrices for conveying and/or storing data, over said transmission line means, each said matrix including a determinator section having a general data section specifying control data regarding the nature and use of the matrix, a multiplicity of address positions for entry into of addresses of sites using the matrix, and an array section having a plurality of nests for transmitting and receiving data, whereby the number of said address positions in a given matrix is much smaller than the size of the address set of the sites in the system;

at each sending site, detecting an available or empty address position in said determinator section and entering an intended receiving site's address in a seized address position;

at each sending site, deriving a secondary number referencing the seized determinator address position internal to the matrix wherein said address is entered by said site said secondary number serving for identifying and locating certain array nests in the matrix and entering data in those located array nests; and at each receiving site, detecting its own address in said determinator section, deriving the secondary number associated with the address position, and using said secondary number to identify those array nests having data sent by a sending site for a given receiving site whereby said data entered and received in said array nests is communicated between a sending site and a receiving site using a common secondary number in said nests which has a smaller numerical set than the site address set in said determinator section.

37. Method as recited in claim 36, wherein said step of generating said general data section includes the generating of a route code section for the entry of a route code stating the communication path that the matrix is to follow in the system.

38. Method as recited in claim 36, further comprising at the sending and receiving sites, storing an abbreviated number as a substitute for the receiving site's address initially inserted in a seized address position.

39. Method as recited in claim 36, wherein said step of entering data in said located nests includes the entering of the derived secondary number in said nests.

40. Method as recited in claim 36, further comprising, at the sending sites, entering tutor data in said determinator and/or array section for governing the reaction of sites to data in said matrices.

41. Method as recited in claim 36, further comprising, generating in each matrix a postscript section following said determinator and array sections whereby postscript data can be entered after the data in the preceding sections has been entered.

42. Method of transferring data between a large number of sites in a communication system comprising;

generating a plurality of repetitive time or space oriented matrices on a communication path for conveying and/or storing data, each said matrix being detectible by the sites and including a determinator section having a multiplicity of address positions for entry of addresses of sites using the matrix, and an array section having a plurality of nests for transmitting and receiving data, whereby the number of address positions in a matrix is much smaller than the size of the address set of the sites;

at the sites desiring to send data, entering in an empty one of said determinator address positions the address of an intended receiving site, to thereby seize said position;

at those sending and receiving sites identified by said addresses entered in the determinator section of a given matrix, deriving a secondary number which is unique for each determinator address position internal to the matrix;

at any pair of sending and receiving sites that have set up communications with each other in a matrix by the sending and receiving of an identifying address in one of said address positions, storing at each of said pair of sites the same secondary number which is unique to their seized address position;

at said pair of sending and receiving sites, using said stored secondary number to mark or locate specific array nests in which data is entered by said sending site for receipt by said receiving site, said array nests being either explicitly marked by entering said stored secondary number therein or implicitly marked by counting out in a predetermined sequence the number of array nests up to the nest equal in number to said stored secondary number and thereupon using said nest for entering or receiving data;

at said pair of sending and receiving sites, entering data in those located array nests on said communication path; and after data has been received by a receiving site, deleting that receiving site's address from said determinator address position to make said address position available to other sites desiring entry into said matrix;

whereby said data entered and received in said array nests by every pair of communicating sending and receiving sites is marked for said pair by their unique secondary number for a given matrix.

43. Method as recited in claim 42, further comprising:

producing a symbol code set having symbols which are each indexed in time or space with a plurality of nests in an array section of a matrix whereby each symbol corresponds with one or more array nests;

generating a template index distance code for a given zero position nest whereby the time or space distance of a desired symbol nest from the zero position nest is derived; and entering in said zero position nest the generated template index distance code which indicates the location of the array nest that is indexed with the desired symbol for transmittal.

44. Method as recited in claim 43, further comprising at the sites, storing said secondary number derived for a given matrix, and entering said stored secondary number in said zero position nest together with the generated template index distance.

45. A data processing system having a plurality of computer sites for simultaneously handling data on a communications line, wherein each said computer site is identified by its own address, comprising:

sync and counting means at the computer sites for detecting a plurality of repetitive time or space oriented matrices for conveying and/or storing data via said communications line, each said matrix including a determinator section having a multiplicity of address positions for entry into of addresses identifying the sites seizing an address position in a given matrix, and tutor locations for the entry of data for guiding the response of the addressed sites to data in the matrix, and a data section including nest locations for the entry of data to be processed;

an empty address position detector, at each computer site, connected to said sync and counting means for detecting an available or empty address position in said determinator section;

address entry means, at each computer site responsive to said empty address position detector, for entering the address for another intended computer site in said detected empty determinator address position to thereby seize said position;

address receiving means, at each computer site, including an address detector for detecting its own address received in said determinator section;

a position indicating notation counter at each computer site, responsive to said address entry and address receiving means, for producing and storing a count number that is used to identify and locate those nests of said data section wherein data is entered or received for those sites; having their address in a seized address position in said determinator section;

at said computer sites, data entry and receiving means responsive to said position indicating notation counter for entering or receiving processed data from said sites in nest locations in said matrix identified by said stored position indication count for further processing at another computer site or return to a user site.

46. System as recited in claim 45, further comprising a processing loop on which a plurality of said computer sites are connected to permit circulation of said matrices on said processing loop.

47. System as recited in claim 45, wherein said computer sites includes an index site having an index memory for storing tutor and other selected data received in a determinator section of said matrices, thereby maintaining a catalog of tutor data relating to the type and usage of the data in respective matrices, said stored data being available to the sites of the system.

48. System as recited in claim 47, wherein said computer sites further includes a cross-index site having decoder means for receiving data from the matrices and means for receiving catalog data from said index memory, and means for cataloguing and storing said received matrice data and catalog data into selected catagories which enable rapid retrieval of selected data.

49. System as recited in claim 48, wherein said computer sites further includes a reference file site having means for generating control data from matrices received from said cross-index site, said control data serving to govern other sites in the system.

50. System as recited in claim 48, wherein said computer sites further include a reference file site having means for receiving said selected catalogues of data from said cross-index site, means for generating actions or directives from said received catalogues of data, and means for sending said actions or directives to the appropriate sites.

51. System as recited in claim 45, wherein said computer sites include a character set generator site, said character set generator site producing sets of characters which are each indexed in time or space with the respective nests of an array, means for detecting character set codes in tutor locations in the determinator section of incoming matrices, and character set selection means, responsive to said detecting means, for sending in a matrix the character sets identified by the detected character set codes.

52. System as recited in claim 51, wherein said character set generator site further includes means for reading nests which have been marked by computer sites, and means for associating said marked nests with their respective characters indexed in the selected character set, whereby the characters associated with said marked nests are sent out to computer sites.

53. System as recited in claim 45, wherein said computer sites include:
a main storage site for storing data from a plurality of matrices of the system, and sending means, responsive to control data from a reference file, for sending out selected matrix data for assembly into combined data and tutors, and means for receiving and storing said assembled data and tutor combinations.

54. System as recited in claim 45, wherein said computer sites include;
an algorithm site comprises an algorithm memory for storing a plurality of algorithms, and means for assembling data and tutor combinations in accordance with requested algorithms from said algorithm memory and sending said assembled data and tutor combinations in matrices to the appropriate sites.

55. System as recited in claim 45, further comprising on said communications line, an assembler including means for selecting data from one or more of said matrices, means for selecting tutors from on or more of said matrices, assembly means responsive to said data selection means and/or said tutor selection means for combining selected data and tutors into one or more new matrices, and means for sending said new matrices on said communications line to the appropriate sites, whereby the assembled matrices can be sent out to be processed or stored.

56. System as recited in claim 45, further comprising interface buffer means for interfacing said computer sites with communications sites, said interface buffer means including matrix detection means for detecting said matrices being received for either communications sites or computer sites, and matrix switching means for directing said received matrices out on said communications media for receipt by either said communications sites or said computer sites.

57. System as recited in claim 56, wherein said matrix detection means comprises a route code detector for detecting a route code in each incoming matrix and thereby routing each said matrix onto the appropriate lines.

58. System as recited in claim 56, wherein said matrix switching means comprises buffers for holding received matrices, and timing means for sending said held matrices out on said communications media at the appropriate times.

59. Communication system for transferring data between a large number of sites over transmission line means wherein said sites can each be sending and/or receiving sites, comprising:
sync and counting means, at each site for detecting a plurality of repetitive time or space oriented matrices on said transmission line means for conveying and/or storing data, each said matrix including a determinator section having a multiplicity of address positions for entry into of addresses of those sites seizing an address position in a given matrix and an array section having a plurality of nests for transmitting and receiving data, whereby the number of said address positions in a given matrix is much smaller than the size of the address set of the sites in the system;
an empty address position detector, at each sending site, connected to said sync and counting means for detecting an available or empty address position in said determinator section;
address entry means, at each sending site responsive to said empty address position detector, for entering the address for an intended receiving site in said detected empty determinator address position to thereby seize said position;
a first position indicating notation counter, at each sending site, connected to said sync and counting means and responsive to said empty address position detector for producing and storing a count indicative of said address position seized by the sending site in said determinator section;
address receiving means, at each receiving site, including an address detector for detecting its own address received in said determinator section;
a second position indicating notation counter, at each receiving site, connected to said sync and counting means and said address receiving means for producing and storing a count indicative of the address position in which its own address is received in said determinator, said stored position indicating count being identical to the count stored by the sending site which inserted said address;
nest identifying means at both sending and receiving sites, connected to said sync and counting means, for identifying the particular nest in said array section associated with the count stored in said first and second position indicating notation counter, respectively.
array data entry means at the sending sites, responsive to said nest identifying means, for entering data in said identified nest;
array data receiving means, at the receiving sites, responsive to said nest identifying means, for receiving data sent by said sending site in said identified nest; and address deletion means, at each receiving site, responsive to said array data receiving means, for deleting the address received by said site in said address position in the determinator section after data is received in the nests of the same matrix, thereby making said address position available to other sites desiring entry into said matrix;

whereby said data entered and received in said array nest is communicated between an originating and receiving site by means of the position indicating count for the duration of the matrix in which an address position has been seized.

60. Communication system for transferring data between a large number of sites over transmission line means wherein said sites can each be originating and/or receiving sites, comprising:

sync and counting means, at each site for generating detecting a plurality of repetitive time or space oriented matrices on said transmission line means for conveying and/or storing data, each said matrix including a determinator section having a multiplicity of address positions for entry into of addresses of those sites seizing an address position in a given matrix, and an array section having a plurality of nests for transmitting and receiving data, whereby the number of said address positions in a given matrix is much smaller than the size of the address set of the sites in the system;

an available address position detector, at each site, connected to said sync and counting means for detecting an available or empty address position in said determinator section;

address entry means, at each originating site, responsive to said available address position detector, for entering the address for an intended receiving site in said detected empty determinator address position to thereby seize said position;

address receiving means, at each receiving site, including an address detector for detecting its own address received in said determinator section;

secondary number generating means, at each originating site, responsive to said address entry means, for providing a secondary number that is used to identify and locate those nests of said array section wherein data from said originating site is entered;

secondary number receiving means, at each receiving site, responsive to said address receiving means, for determining the same secondary number being used in a given matrix by its originating site so that those nests containing data for said receiving site can be identified and located;

array data location means, at the originating and receiving sites, responsive to said sync and counting means and said respective secondary number generating means and secondary number receiving means, for locating those array nests identified by a secondary number, said array data location means including a data generator connected to said sync and counting means for producing a set of characters which are each indexed in time or space with the respective nests of an array, comparator means at each originating site for comparing a stored character to be communicated to a receiving site with the characters out of said data generator, said comparator means providing an output enable signal to said secondary number generating means to cause entry of the secondary number in the nest which is indexed with the matched character out of said data generator, and data generator enable means at each receiving site for comparing the nest in which said secondary number is received with its indexed character out of said data generator to thereby enable said indexed character to be stored at said receiving site;

whereby data is communicated between an originating and receiving site by means of the secondary number entered into the nest which is indexed to a character in said data generator for the duration of the matrix in which an address position has been seized.

* * * * *